(12) United States Patent
Freeman et al.

(10) Patent No.: US 12,516,167 B2
(45) Date of Patent: Jan. 6, 2026

(54) DILUTED ANTI-TACK FORMULATION AND METHOD OF USE OF DILUTED ANTI-TACK FORMULATION

(71) Applicant: Polymer Solutions Group, Cleveland, OH (US)

(72) Inventors: Gary M. Freeman, Macon, GA (US); Quang T. Do, Lawrenceville, GA (US); Joshua D. Sparks, Macon, GA (US)

(73) Assignee: Polymer Solutions Group, LLC, Cleveland, OH (US)

( * ) Notice: Subject to any disclaimer, the term of this patent is extended or adjusted under 35 U.S.C. 154(b) by 960 days.

(21) Appl. No.: 17/665,685

(22) Filed: Feb. 7, 2022

(65) Prior Publication Data
US 2022/0213287 A1 Jul. 7, 2022

Related U.S. Application Data

(63) Continuation-in-part of application No. 16/377,557, filed on Apr. 8, 2019, now Pat. No. 11,267,985.

(51) Int. Cl.
*C08J 7/04* (2020.01)
*C08K 3/34* (2006.01)
(Continued)

(52) U.S. Cl.
CPC ............ *C08J 7/0427* (2020.01); *C09D 5/021* (2013.01); *C09D 5/027* (2013.01); *C09D 5/028* (2013.01);
(Continued)

(58) Field of Classification Search
CPC .. C08J 7/0427; C08J 2321/00; C08J 2439/02; C08J 2463/00; C09D 5/021; C09D 5/027;
(Continued)

(56) References Cited

U.S. PATENT DOCUMENTS 2,147,312 A   2/1939  Patridge
3,765,911 A   10/1973 Knowles et al.
(Continued)

FOREIGN PATENT DOCUMENTS

CN   110372918   10/2019
EP   0 400 720   12/1990
(Continued)

OTHER PUBLICATIONS

Gillman et al., "Modification to the . . . Characteristics of Soils", Aust. J. Soil. Res., 1986, 24, 61-6.
(Continued)

*Primary Examiner* — Mark Eashoo
*Assistant Examiner* — Zhen Liu
(74) *Attorney, Agent, or Firm* — Ram W. Sabnis

(57) ABSTRACT

The present invention relates to an anti-tack formulation of high solids content that uses effective amounts of a fine particle size talc, a water soluble cationic polymer, one or more nonionic surfactants, and one or more alkali metal fatty acid soaps. The high solids content anti-tack formulation is capable of being easily shipped to a customer's location and is stable and easily pumped after shipment to a customer. The high solids content anti-tack formulation generates a micro-flocculated pigment dispersion that can be subsequently diluted to a low solids content formulation for use in anti-tack applications, particularly rubber slab dipping applications. The anti-tack formulation provides improved anti-tack performance when coating uncured rubber products.

32 Claims, 7 Drawing Sheets

Applied Slab Dip Coatings on a CVT Tire Sidewall Compound for Formulas V, Y & Z

(51) Int. Cl.
  *C08K 5/06* (2006.01)
  *C09D 5/02* (2006.01)
  *C09D 7/45* (2018.01)
  *C09D 7/61* (2018.01)
  *C09D 7/63* (2018.01)
  *C09D 139/02* (2006.01)

(52) U.S. Cl.
  CPC ............... *C09D 7/45* (2018.01); *C09D 7/61* (2018.01); *C09D 7/63* (2018.01); *C09D 139/02* (2013.01); *C08J 2321/00* (2013.01); *C08J 2439/02* (2013.01); *C08K 2003/343* (2013.01); *C08K 5/06* (2013.01)

(58) Field of Classification Search
  CPC . C09D 5/028; C09D 7/45; C09D 7/61; C09D 7/63; C09D 139/02; C09D 5/00; C09D 7/65; C09D 7/69; C09D 7/70; C08K 5/06; C08K 2003/343; C08K 3/22; C08K 3/26; C08K 5/098; C08K 2003/3045; C08K 2201/014; C08K 3/34; C08K 3/346; C08K 2201/005; C08F 126/02
  See application file for complete search history.

(56) References Cited

U.S. PATENT DOCUMENTS

| | | | |
|---|---|---|---|
| 3,935,124 A | 1/1976 | Thene et al. | |
| 4,354,001 A | 10/1982 | Kuan | |
| 4,450,095 A | 5/1984 | Finlayson | |
| 4,810,734 A | 3/1989 | Kawasumi et al. | |
| 5,013,709 A | 5/1991 | Ogawa et al. | |
| 5,178,676 A * | 1/1993 | Lackey | C08J 7/06 427/385.5 |
| 5,589,095 A * | 12/1996 | Yuan | C10M 173/02 508/168 |
| 5,700,319 A | 12/1997 | Bauer et al. | |
| 6,156,117 A | 12/2000 | Freeman et al. | |
| 6,228,902 B1 | 5/2001 | Brueggeman et al. | |
| 6,402,827 B1 | 6/2002 | Freeman et al. | |
| 6,495,163 B1 | 12/2002 | Jordan | |
| 6,811,599 B2 | 11/2004 | Fischer et al. | |
| 6,861,462 B2 | 3/2005 | Parker et al. | |
| 7,179,415 B2 | 2/2007 | Teoh et al. | |
| 8,637,091 B2 | 1/2014 | Pluta et al. | |
| 2004/0209082 A1 | 10/2004 | Lee et al. | |
| 2005/0014882 A1 | 1/2005 | Brungardt et al. | |
| 2005/0234214 A1* | 10/2005 | Weipert | C09D 7/45 106/401 |
| 2006/0249050 A1 | 11/2006 | Sharma et al. | |
| 2009/0229775 A1* | 9/2009 | Zhang | C08K 3/346 524/451 |
| 2015/0080515 A1* | 3/2015 | Daga | C08L 55/02 524/451 |
| 2017/0198146 A1 | 7/2017 | McCarthy et al. | |
| 2017/0253720 A1* | 9/2017 | Hopkins | C08K 3/34 |
| 2017/0362425 A1* | 12/2017 | Siddiqui | C09D 133/04 |

FOREIGN PATENT DOCUMENTS

| | | |
|---|---|---|
| EP | 3 434 719 | 1/2019 |
| JP | 49-18780 | 2/1974 |
| JP | 53-61639 | 6/1978 |
| JP | 55-112202 | 8/1980 |
| JP | S55112202 A | 8/1980 |
| JP | 56-47475 | 4/1981 |
| JP | 56-47476 | 4/1981 |
| JP | 61-293233 | 12/1986 |
| JP | 62-32127 | 2/1987 |
| JP | 62-132939 | 6/1987 |
| JP | 2001-348495 | 12/2001 |
| JP | 2002-363532 | 12/2002 |
| JP | 2009-249533 | 10/2009 |
| JP | 2010-247864 | 11/2010 |
| JP | 2011-144221 | 7/2011 |
| JP | 2013-001720 | 1/2013 |
| JP | 2013-124292 | 6/2013 |
| JP | 2013124292 A | 6/2013 |
| JP | 2014-095010 | 5/2014 |
| WO | 2018/207939 | 11/2018 |
| WO | 2017/164171 | 2/2019 |
| WO | 2019/044831 | 3/2019 |
| WO | 2019044831 A1 | 3/2019 |
| ZA | 692507 | 12/1969 |

OTHER PUBLICATIONS

Lee et al., "Anti-Tacking Properties of . . . Heat Treatment Process", World Journal of Textile Engineering and Technology, 2019, 5, 84-90.
Ketterings et al., Fact Sheet 22, Cation Exchange Capacity (CEC), Cornell University Cooperative Extension, Department of Crop and Soil Science, 2007.
Rytwo et al., "Adsorption of Monovalent . . . and Model Calcuations", Clays and Clay Minerals, vol. 46, No. 3, 340-348, 1998.
J.S. Gomer et al., "Copper Exchange Capacity . . . In Situ Copper Leaching", Report of Investigations 9396, United States Department of the Interior, 1992.
Gulcan et al., "An Experimental Study . . . Saribeyli, Kaolin Deposit", Mugla Journal of Science and Technology, Jun. 2017.
Dorothy Carroll, "Ion Exchange in Clays and Other Minerals", Bulletin of the Geological Society of America, vol. 70, pp. 749-780, Jun. 1959.
Grim, "Applied Clay Mineralogy", McGraw-Hill Book Company, 1962.
Wada et al., "Selective Adsorption of Zinc on Halloysite", Clays and Clay Minerals, vol. 28, No. 5, 321-327, 1980.
Stephen E. O'Rourke, "Polymer Additives for the Rubber Industry", Chemical Industry Digest, Oct. 2007.
Esteban F. Aglietti, "The effect of dry grinding on the structure of talc", Applied Clay Science 9 (1994) 139-147.
M. Alvarez-Silva et al., "Point of Zero Change, Isoelectric Point and Aggregation of Phyllosilicate Minerals", Canadian Metallurgical Quarterly, vol. 49, No. 4, Jul. 2010.
Ana Maria Carmona-Ribeiro et al., "Cationic Antimicrobial Polymers and Their Assemblies", International Journal of Molecular Sciences, 2013, 9906-9946.
Grim, Ralph E., "Clay Mineralogy", McGraw-Hill Book Company, $2^{nd}$ edition, 1968.
Breen, Christopher, "The characterization and use of polycation-exchanged bentonites", Applied Clay Science 15 (1999) 187-219.
Milicevic, S et al., "Differences in coating . . . the thermal analysis", Journal of Thermal Analysis and Calorimetry (2018) 134:1011-1019.
Product Data Sheet, Rubber, Mistron Vapor Mistron Vapor—a high performance, cost-effective alternative to carbon black in rubber, 2016, http://www.imerystalc.com/content/bu/Rubber/Products/Mistron Vapor/index.php?source=region.
Product Data Sheet, Mistron Vapor R, Imerys Talc, 2011.
Product Data Sheet, Mistron CB, Imerys Talc, 2011.
Product Data Sheet, Luzenac 2H, Imerys Talc, 2014.
Product Data Sheet, FlexTalc Series Talc Products, Cimbar Performance Materials, 2017.
Product Data Sheet, Microtalc U.S.P. Talcs, Specialty Minerals, 2006.
Product Data Sheet, ABT Antiblock Talcs for the plastic film industry, Specialty Min-erals, 2020.
JPS 55-112202, machine translation, JPO Japan Platform for Patent Information (J-PlatPat). (1980).
Lowrie Ed., "Tac-Table 9.19," SME Mining Reference Handbook, Society for Mining, Metallurgy, and Exploration (SME), pp. 187-188 (2002).
Ash et al., "Paestol® 18k" and Polyquarternium-6 Handbook of Rheology Modifiers, Synapse Information Resources, pp. 778-779, 1615 (2006).
JP 2013-124292, Machine translation, IP.com (2013).

* cited by examiner

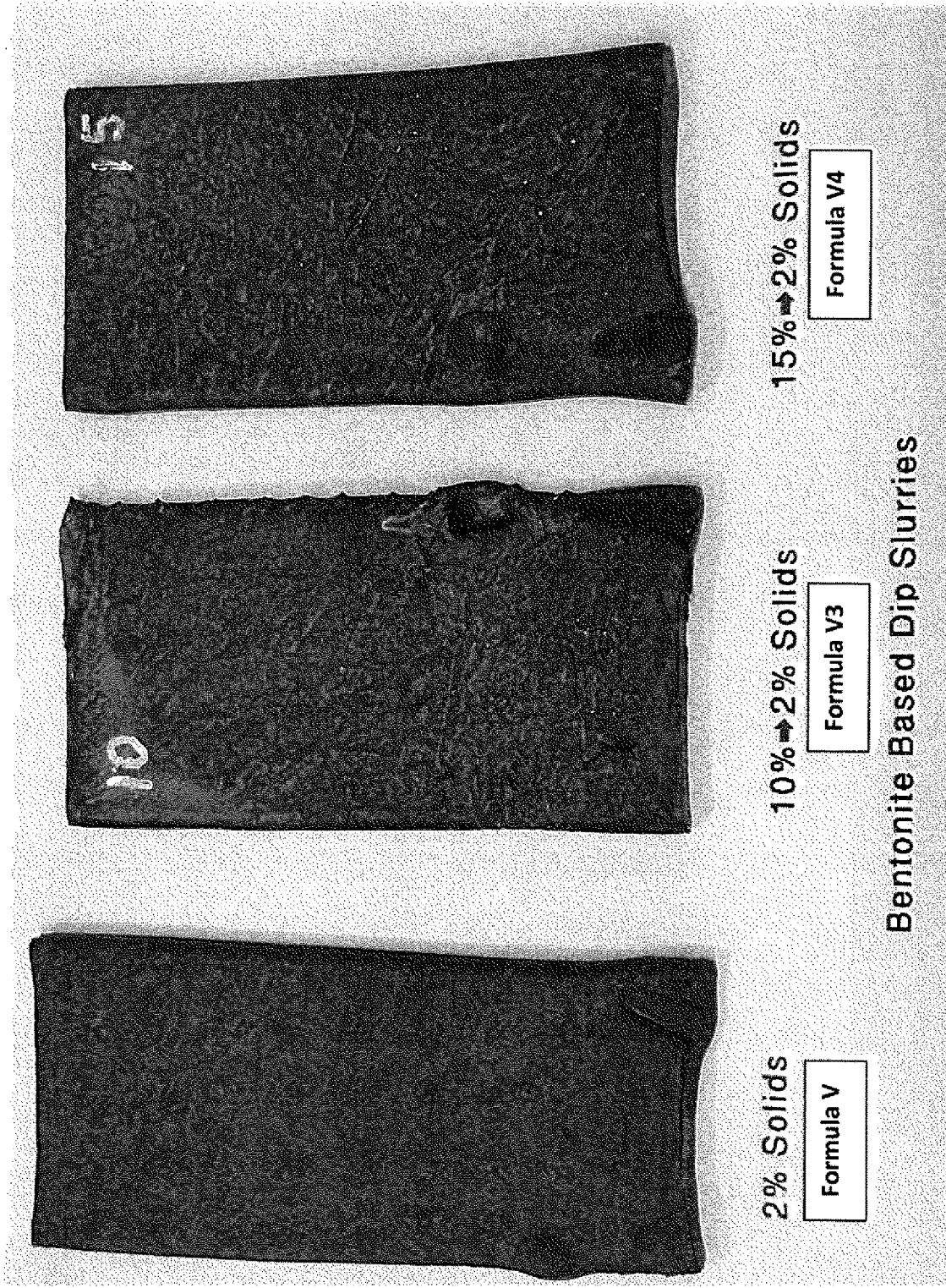
Figure 6: Applied Slab Dip Coatings on Tire Tread Compound for Formulas V, V3 & V4

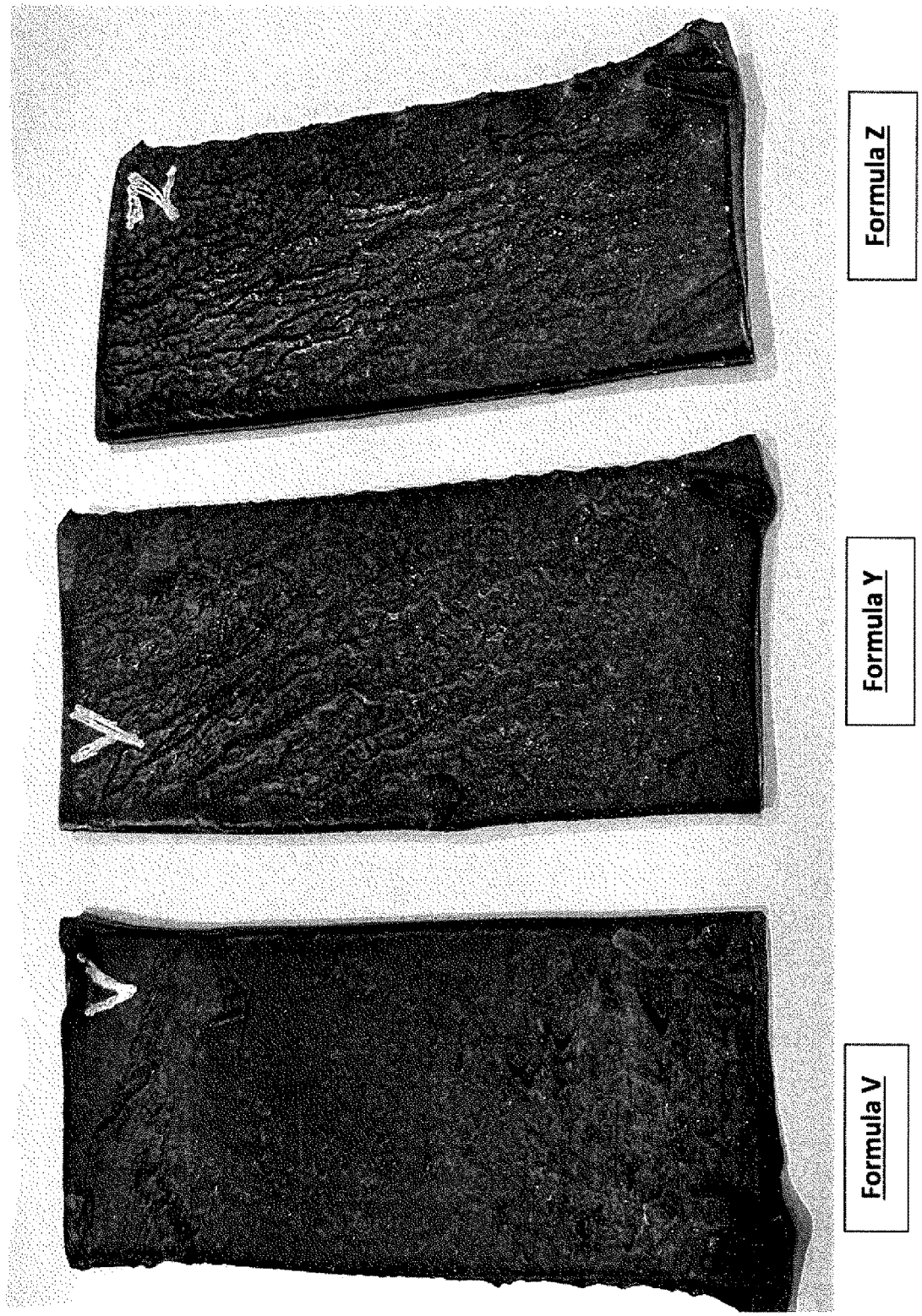
Figure 7: Applied Slab Dip Coatings on a CVT Tire Sidewall Compound for Formulas V, Y & Z

DILUTED ANTI-TACK FORMULATION AND METHOD OF USE OF DILUTED ANTI-TACK FORMULATION

FIELD OF THE INVENTION

The present invention relates to an anti-tack formulation that uses primarily talc that has been cationic polymer treated for the dip slurry coating of uncured rubber compounds in anti-tack applications.

BACKGROUND ART

In the prior art, it is known to use anti-tack formulations directed to coating uncured rubber compounds. Such formulations are applied to uncured rubber to serve as a process aide. The applied coating keeps the uncured rubber slabs or pellets from sticking to itself (i.e., prevents blocking) thereby enabling the rubber compounder to more easily handle, stack or convey the uncured rubber to other unit operations such as the compression molds and to profile extrusion units.

In general terms, anti-tack formulations commonly employ a number of ingredients such as mineral pigments, swelling clays, metallic stearate pigments, alkali metal fatty acid soaps, nonionic surfactants, defoamers, pigment suspension aides, waxes, etc. Some of the prior art also discloses the use of various water soluble polymer additives to enhance the coating film properties of the applied anti-tack. Examples of water soluble polymer additives employed in the prior art are:

- carbohydrate based polymers like carboxyl methyl cellulose (CMC) or polysaccharides (like xanthan gums);
- nonionic polymers like polyvinyl alcohol (PVA) or PVA/PVAC copolymers (PVAC=polyvinyl acetate); and
- anionic polymers or copolymers based on acrylates (e.g., acrylic binders or latexes).

One application for anti-tack formulations is as a slab dip slurry of relatively low solids content. This is where freshly compounded uncured rubber coming off a two roll mill is run through a dip slurry tank containing the anti-tack formulation in diluted aqueous form to dip coat the rubber slabs. An example of a slab dip use for an anti-tack formulation is shown in U.S. Pat. No. 5,178,676. This patent discloses the use of a surfactant-treated kaolin clay for use as an anti-tack.

U.S. Pat. No. 4,354,001 discloses the use of latex polymers containing carboxylate functionality in combination with fillers as anti-tack composition but there is no teaching of the use of water soluble cationic polymers.

JP 2009 249533 discloses the use of a surfactant and a water soluble polysaccharide polymer (xanthan gum), but there is no mention of the use of a water soluble, cationic polymer nor of talc.

JP 2010 247864 discloses the use of a water soluble PVA polymer for providing an anti-tack film on unvulcanized rubber but does not disclose the use of any water soluble cationic polymers.

WO 2018207939 discloses a typical anti-tack powder product that is dispersed in water at a rubber customer's facility. Anti-tack powders of this kind are typically dispersed on site in water at low solids contents (2-6%) for use as dip slurries for rubber slabs. The inorganic silicates named in this prior art, e.g., component E, does not include talc. Instead, mica and kaolin are listed as the desired material. Also employed in this product is a Na or K fatty acid soap in combination with an organic surfactant.

WO 2017164171 is an example of an anti-tack powder composition that employs a metallic stearate pigment (like Mg stearate or Zn stearate) as an anti-block additive.

JP 2014095010 discloses an anti-tack aqueous dispersion of moderately high solids content, which when calculated has a solids content of about 33.5%. This dispersion utilizes a water soluble polymer in the formulation (e.g., carboxymethyl cellulose and xanthan gum are mentioned), but water soluble cationic polymers are not mentioned. Carboxymethyl cellulose and xanthan gum are carbohydrate-based polymers that are frequently used as rheological thickening agents or as pigment suspension aides.

JP 2013124292 discloses an anti-tack powder composition. This prior art emphasizes the desirability of using inorganic mineral pigments having a low crystalline silica content (for safety purposes with respect to possible inhalation) and it also employs nonionic surfactants (fatty alcohol ethoxylates).

JP 2011144221 discloses an anti-tack powder composition that employs two different classes of nonionic surfactants (fatty alcohol ethoxylates and acetylene-based diol ethoxylates).

JP 2002363532 discloses an anti-tack composition that emphasizes an aqueous dispersion of $CaCO_3$ and/or talc in combination with a surfactant package. However, the dispersion is produced at a low solids content, i.e., 7.5% solids based on the amount of water specified in this prior art.

JP 2001348495 discloses an anti-tack composition that employs a water soluble polymer, such as a polyvinyl alcohol, but there is no mention of using a water soluble cationic polymer in combination with talc as an anti-block pigment.

JP 56-47475 discloses an anti-tack composition that can be an aqueous, high solids formulation. However, this formulation is an emulsion derived from a combination of Na oleate soap and an unsaturated fatty acid like oleic acid. There is no disclosure of an aqueous dispersion of a silicate mineral pigment like talc nor is there any teachings concerning the use of a water soluble cationic polymer.

JP 56-47476 discloses an anti-tack composition that can be an aqueous, high solids formulation. However, this formulation is an emulsion derived from a combination of Na oleate soap, a hydroxy-terminated silicone and a fluorosurfactant. There is no disclosure of an aqueous dispersion of a silicate mineral pigment like talc nor is there any teachings concerning the use of a water soluble cationic polymer.

JP 49-18780 discloses an anti-tack composition that is an aqueous dispersion of a metal stearate anti-block pigment that is wetted with a nonionic or anionic surfactant. The total solids content is about 30% and a silicate mineral pigment such as talc is not used.

ZA 6902507 discloses an anti-tack composition that is an aqueous dispersion that consists principally of a combination of clay mineral, an alkali metal fatty acid soap, and an alkali metal alkyl sulfate surfactant. However, the solids content of the formulation is quite low (about 25%) and the use of talc or a water soluble cationic surfactant is not disclosed.

U.S. Pat. Nos. 6,156,177 and 6,402,827 disclose the formation of cationic polymer flocculated kaolin pigments for use in paper coatings. The preferred water soluble cationic polymer in that application is an Epi-DMA polymer having a Mw<50,000. Neither one of these patents are concerned with anti-tack formulations for use on uncured rubber.

In addition, the use of talc as dry anti-tack powders for dusting elastomeric compounds is well known in the art. The use of talc to produce pellet lube slurries for coating uncured rubber pellets is also well known in the industry. Such pellet lubes are typically spray-applied onto uncured rubber pellets in a rotary drum or alternatively the talc slurry is flooded onto freshly formed, hot pellets as they emerge from a rubber extruder such a Barwell extruder. In these pellet lube applications, the talc-based slurries are typically utilized at a solids content of 10-18% solids. The pellet lube formulations themselves are relatively simple compositions as they are comprised mostly of talc and various alkali metal soaps of fatty acids. One such commercial product is sold by SASCO Chemical/PSG and is called Pellet Lube F3.

Many of the anti-tack dispersions of the prior art suffer from a number of problems that mandate improved dispersions for anti-tack applications. These problems include the requirement that the dry powder products need to be mixed at a customer's site to formulate the dispersion and this requires the customers to have extensive mixing equipment. Other formulations use expensive anti-block pigments like metal stearates. Other formulations suffer from excessive foaming, pigment settling and syneresis, hard and gummy dip slurry sediments that make remixing of the dip slurry dispersion difficult, environmental concerns such as the presence of fibrous asbestiform materials or high levels of total crystalline silica (TCS) in the associated mineral pigmentation, and/or just inferior anti-tack performance.

As such, a need exists to provide improved anti-tack dispersions that avoid or minimize the problem with current anti-tack products and dispersions. The invention responds to this need by providing an improved anti-tack dispersion and method of use in anti-tack applications.

SUMMARY OF THE INVENTION

In one embodiment, the invention relates to an anti-tack formulation that can be conveniently delivered in a high solids liquid concentrate form that can be readily pumped and is easily diluted with water to a lower solids content level for end application use as a dip coating slurry. The desired anti-tack formulation is also relatively low cost as it principally employs cost effective talc pigmentation rather than requiring the use of expensive anti-block pigments such as metal stearates.

Another aspect of the invention is the use of the anti-tack formulation in an anti-tack coating application such as in the spraying of uncured rubber pellets or slab dipping of uncured rubber slabs.

Yet another aspect of the invention is diluted anti-tack formulation that is useful in anti-tack coating applications for uncured rubber compounds whereby the diluted formulation is effective at low solids contents and does not hard pack settle in dip tanks and slurry lines when left non-agitated for extended periods of time.

Other objects and advantages will be become apparent as a further description of the invention is made.

One aspect of the invention relates to an aqueous anti-tack formulation of high total solids content ranging from 45 to 75% by weight of the formulation, preferably 50-75%. The formulation includes talc particles having a Cilas median particle size range of less than 7 microns, the talc particles being present in an amount ranging from 40% to 72% of the total formulation weight.

The anti-tack formulation also includes a polyquaternary cationic polymer having a molecular weight between about 50,000 to 2,000,000 Daltons in an effective amount to at least prevent hard pack settling of the talc when the anti-tack formulation is used in a diluted form for coating uncured rubber compound products and/or improving coating coverage of the uncured rubber compound products.

The formulation can also have one or a combination of the following:
a) one or more nonionic surfactants of intermediate HLB value of 6 to 12 in a total amount ranging from about 0.01-4.0% of the total formulation weight, preferably up to about 3.0%, and more preferably about 0.5 to 2.0% by weight of the formulation; and
b) one or more alkali metal, saturated or unsaturated, $C_8$-$C_{20}$ fatty acid soaps in a total amount ranging from about 0.01-3.0% of the total formulation weight, preferably less than 2.0% by weight of the formulation.

An optional additive to the formulation includes one or more suspension aids in a total amount of not more than about 2.0% by weight of the formulation.

The balance of the aqueous formulation is water.

In a more preferred embodiment, the polyquaternary cationic polymer can be in amount ranging from 0.01 to 0.25% by weight of the formulation, and more preferably less than 0.10% by weight.

In terms of viscosity, the viscosity of the aqueous anti-tack concentrate formulation can be controlled to have one or more of the following viscosities:
an initial 2 rpm static Brookfield Viscosity of 5,000 to 25,000 cps;
a two-week aged 2 rpm static Brookfield Viscosity less than 150,000 cps;
a two-week aged 20 rpm dynamic Brookfield Viscosity less than 25,000;
wherein the initial and aged static and dynamic viscosities are measured using a Brookfield RVDVE heliopath viscometer unit equipped with T-spindles and are run at 2 or 20 rpm and 25 degrees C..

The polyquaternary cationic polymer is preferably epichlorohydrin-dimethylamine (Epi-DMA), one or more polyquaterniums, or a combination thereof and more preferably polydiallyldimethyl ammonium chloride (PolyDADMAC).

The one or more nonionic surfactants can be selected from the group of ethoxylates of alkylphenols, ethoxylates of 2,4,7,9-tetramethyl 5 decyn-4,7-diol, ethoxylates of linear or branched fatty alcohols having a carbon chain length ranging from $C_6$-$C_{18}$, EO/PO alkoxylates of linear or branched fatty alcohols having a carbon chain length ranging from $C_6$-$C_{18}$, ethylene oxide/propylene oxide block copolymers, ethoxylates of sorbitan esters, ethoxylated fatty acids, ethoxylated castor oils, ethoxylated fatty amines, and PEG esters or diesters of saturated or unsaturated $C_8$ to $C_{20}$ fatty acids. The one or more alkali metal, saturated or unsaturated, $C_8$-$C_{20}$ fatty acid soaps can be selected from sodium or potassium soaps of saturated or unsaturated $C_8$-$C_{20}$ fatty acids.

While only one size talc particle can be used, the talc can be a blend of two differently sized talc particles wherein a size difference between the two differently-sized talc particles is at least two microns, the blend is preferably based on a weight ratio of larger to smaller particles of 1.5:1 to 9:1. The talc can also be substituted with one or more of another anti-block pigment in an amount up to 25% of the total weight of talc in the formulation. The anti-block pigment can be selected from the group consisting of kaolinite, calcined kaolin clays, smectite clay minerals such as bentonite and hectorite, attapulgite, sepiolite, barytes, nepheline syenite, calcium carbonate (ground or precipitated forms), dolomite, fine particle micas consisting of muscovite or phlogopite, feldspars, synthetic amorphous silica pigments such as precipitated silica and fumed silica, alumina trihydrate, hydrotalcite and various metal stearate pigments such as calcium stearate, magnesium stearate and zinc stearate.

Other additives that can be employed in the anti-tack formulation include one or more defoamers in a total amount of not more than about 1.0% of the total formulation weight and one or more biocides in a total amount of not more than about 0.15% by weight of the formulation.

The invention also entails a method of coating an uncured rubber compound to provide anti-tack properties to a surface of the rubber compound by using the inventive high solids anti-tack formulation, diluting it to 1-10% total solids content, preferably 2-6% and more preferably 3-4%, and applying the diluted anti-tack formulation to the rubber compound. The applications can include any type that would coat an uncured rubber compound for anti-tack purposes, and examples include a dip tank slurry application or a spraying application.

A more preferred anti-tack formulation is one that uses at least polydiallyldimethyl ammonium chloride as the polyquaternary cationic polymer, and a combination of both the nonionic surfactant and the one or more alkali metal, saturated or unsaturated, $C_8$-$C_{20}$ fatty acid soaps, with the nonionic surfactant preferably being one or more of ethoxylates of tridecyl alcohol and ethoxylates of 2,4,7,9-tetramethyl 5 decyn-4,7-diol nonionic surfactants and the one or more alkali metal, saturated or unsaturated, $C_8$-$C_{20}$ fatty acid soaps being one or more sodium or potassium soaps of saturated or unsaturated $C_8$-$C_{20}$ fatty acids, and one or more pigment suspension aides of fumed silica, xanthan gum and sepiolite.

Yet another aspect of the invention is providing an aqueous anti-tack formulation comprising the high solids content anti-tack formulation described above in diluted form such that the total solid content ranges from about 1 to 10%. This formulation can also have the same aspects of the high solids formulation in terms of different talc particle sizes, the substitution of talc with one or more anti-block pigments, presence of optional additives, and the like. For the diluted anti-tack formulation, it is preferred that it has a relative sediment volume (RSV) of at least 35 cm³, the relative sediment volume measured using 1000 ml of a 4% solids diluted form of the anti-tack slurry formulation in a 1 liter graduated cylinder after 24 hours of static settling.

A further aspect of the invention is a method of making the aqueous anti-tack formulation having a total solids content ranging from 45-75%. This method includes adding a number of components together to make the anti-tack formulation. More particularly, the adding step adds an amount of at least one size of fine particle size talc, an amount of one or more polyquaternary cationic polymers, an amount of either or both of: (i) one or more nonionic surfactants of intermediate HLB value of 6 to 12; and (ii) one or more alkali metal, saturated or unsaturated, $C_8$-$C_{20}$ fatty acid soaps, an optional amount of one or more suspension aids, defoamers, and biocides, and water to form the aqueous anti-tack formulation. When adding these various components together, the amount of the one or more polyquaternary cationic polymers is made into an aqueous solution and this aqueous solution is used when making the anti-tack formulation by adding the other components together.

In another aspect of the invention, polyquaternary cationic polymers that are produced directly in aqueous solution form from their polymerization processes and are commercially available as various solution grades can be appropriately selected and utilized as the cationic polymer in the inventive dispersion formulations. These solution grade cationic polymers can exhibit different aqueous solution viscosities that are correlatable to their associated molecular weight (whereby a lower Brookfield viscosity at a given polymer actives content reflects a cationic polymer of lower Mw). For example, representative examples of PolyDADMAC solution grades available from SNF Floerger at 20% polymer actives content are presented and the excellent utility of one particularly useful grade is demonstrated in several anti-tack formulations.

In another aspect of the invention, the dispersion is described in its 1-10% total solids content in terms of the weight percentages of its various components. More particularly, the diluted aqueous anti-tack dispersion includes at least one mineral pigment, the at least one mineral pigment including talc particles, the talc particles having a median particle size range of less than 7 microns, the talc particles in an amount ranging from 0.4% to 7.2% of the total dispersion weight, the aqueous anti-tack dispersion having a total solids content 1-10% by weight of the anti-tack dispersion, the talc particles dispersed in the aqueous anti-tack dispersion and forming a slurry. The diluted anti-tack dispersion further includes a polyquaternary cationic polymer having a molecular weight between about 50,000 to 2,000,000 Daltons in an effective amount to at least prevent hard pack settling of the talc when the anti-tack dispersion is used in a diluted form for coating uncured rubber compound products and/or improving anti-tack coating coverage of the uncured rubber compound products. The diluted aqueous anti-tack can also include one or a combination of the following:

a) one or more nonionic surfactants of intermediate HLB value of 6 to 12 in a total amount ranging from about 0.0001-0.4% of the total dispersion weight; and b) one or more alkali metal, saturated or unsaturated, $C_8$-$C_{20}$ fatty acid soaps in a total amount ranging from about 0.0001-0.3% of the total dispersion weight; and optionally, one or more suspension aids in a total amount of not more than about 0.2% by weight of the dispersion; and the balance water.

Another aspect of the invention is the addition of other anti-block pigments and control of the pigments selected for use in terms of their Cation Exchange Capacity (CEC) value and total weight with respect to the talc amount or the total dispersion, including control based on the desired viscosity of the high solids content dispersion. More particularly, wherein the talc is substituted with at least one anti-block pigment, the at least one anti-block pigment is selected from the group consisting of:

a) an inorganic mineral-based anti-block pigment having a CEC value of 5 meq/100 g or less and in an amount up to about 25% by weight of the total talc weight in the dispersion;

b) an inorganic mineral-based anti-block pigment having a CEC value of more than 5 and less than 15 meq/100 g and in an amount of up to about 15% by weight of the total talc weight in the dispersion;

c) an inorganic mineral-based anti-block pigment having a CEC value of 15 meq/100 g or more and 50 meq/100 g or less and in an amount up to about 5% by weight of the total talc weight in the dispersion;

d) a non-mineral-based anti-block pigment in an amount up to about 25% by weight of the total talc weight in the dispersion;

e) an inorganic metal oxide as the anti-block pigment and in an amount up to about 5% by weight of the total talc weight in the dispersion;
f) insoluble forms of alkali earth metal sulfates and alkali earth metal carbonates as the anti-block pigment and in an amount up to about 25% by weight of the total talc weight in the dispersion; and
g) silicate minerals having a CEC value of more than 50 meq/100 g as the anti-block pigment and in an amount up to about 2% by weight of the total dispersion.

Preferably, the addition of the anti-block pigments would not change the viscosity of the high solids content dispersion, such viscosities being one or more of the following viscosities:
an initial 2 rpm static Brookfield Viscosity of 5,000 to 25,000 cps;
a two-week aged 2 rpm static Brookfield Viscosity less than 150,000 cps;
a two-week aged 20 rpm dynamic Brookfield Viscosity less than 25,000 cps;
wherein the initial and aged static and dynamic viscosities are measured using a Brookfield RVDVE heliopath viscometer unit equipped with T-spindles and are run at 2 or 20 rpm and 25 degrees C..

Additional anti-block pigments can be one or more of illite, halloysite·2H$_2$O, and microcline.

In terms of the talc particle size, a more preferred median particle size range is about 0.5 to about 5.0 microns. The talc particles addition can also be controlled in terms of a CEC value, wherein it is preferred that the CEC value for the talc particles used in the dispersion is between 1.0 and 10 meq/100 g.

The one or more nonionic surfactants can also include an ethoxylated styrenated phenyl ether.

In another aspect of the invention, the particle aggregation is controlled through the use of the effective amount of the polyquaternary cationic polymer. The addition of this effective amount micro-flocculates the particles in the anti-tack dispersion such that a mean particle size of the diluted aqueous anti-tack dispersion with the effective amount of the polyquaternary cationic polymer increases by about 5 to 60% as compared to a mean particle size of a diluted aqueous anti-tack dispersion of particles without the effective amount of the polyquaternary cationic polymer.

BRIEF DESCRIPTION OF THE DRAWINGS

FIG. 6 are photographs of uncured rubber compound slabs after being dip coated with three different bentonite-based dip slurries that all employ a quaternary cationic polymer. The anti-tack formulations were all dip coated at 2% solids content however the original solids content of the dispersions prior to dilution vary.

FIG. 7 are photographs of uncured rubber compound slabs after being dip coated at 2% slurry solids with bentonite-based dip slurries having increasing dosage levels of quaternary cationic polymer in them.

DETAILED DESCRIPTION OF THE INVENTION

Figure 1:
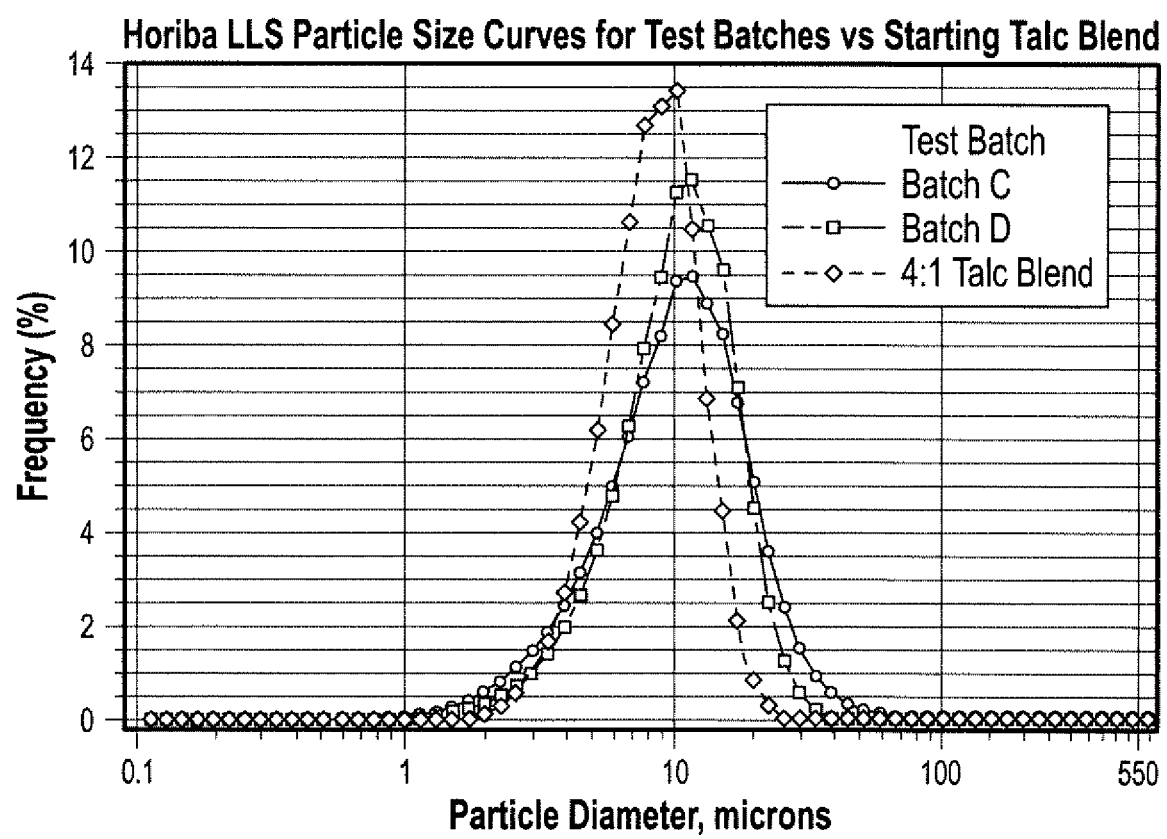
FIG. 1 is a Horiba laser light scattering particle size distribution curve showing the particle size distribution for two different anti-tack formulations as compared to the particle size distribution of the starting talc pigmentation.

Most rubber anti-tack products are produced and delivered in dry powder form. Dry powder products maximize solids content from a freight delivery standpoint but they require extensive mixing equipment on site at the customer's location to properly disperse the products into aqueous dip slurries. Also, the aforementioned dispersion process requires plant personnel to oversee its production to ensure the powder makedown protocol yields well dispersed dip slurries of appropriate % solids content. In many cases, the mixing process requires heating of the batch water to facilitate wetting, swelling, and dispersion of the various anti-block mineral pigments and extended mixing times to achieve good dispersion. These mixing challenges are particularly the case when the anti-tack powder formulation utilizes any significant amount of swelling clays such as bentonites.

Providing the anti-tack formulation in pre-dispersed slurry form provides a level of quality and ease of use for the customer. Liquid concentrates can be readily diluted with water to the desired target solids on site using automated dilution/mixing systems requiring minimal oversight. Such liquid concentrates do not require heating since the anti-block pigments therein are already wetted and well dispersed. However, it is desirable to provide the liquid concentrate of an anti-tack formulation in a high solids content form to minimize their freight costs during shipment. The liquid concentrate should also be stable yet fluid and should be easily pumped from totes or other containers using conventional positive displacement pumps. The liquid anti-tack formulation of this invention meets these utility requirements by providing a talc dispersion having a solids content equal to or greater than 45%, which is easily handled and pumped, more preferably 50% or more. While there is no upper end to the solid contents of the talc dispersion, a practical upper limit is about 75%, and solids contents above this amount are just too viscous to be high shear mixed and easily pumped once transported to a customer's facilities.

Many prior art anti-tack formulations employ expensive anti-block pigments such as metal stearate pigments of calcium, magnesium or zinc in appreciable amounts or they can employ expensive anti-block additives such as waxes or film forming polymers (like polyvinyl alcohol). Minimizing the use of such expensive chemical additives is essential to controlling the final cost of the formulation. It is therefore particularly desirable to develop a low cost anti-tack coating formulation based principally on mineral pigments that is effective in reducing the tackiness of uncured elastomeric compounds in slab or pellet form when applied as a coating film via a dip tank slurry application or via a spray application. The anti-tack formulation should be effective when applied to the uncured rubber slab at a diluted solids content of 2-6% by weight. The diluted solids content can range from 1-10% to a more preferred range of 2-6%, and even more preferred range of 3-4%.

The anti-tack formulations of the invention are principally comprised of one or more fine particle size talc pigments that are low cost mineral pigments being produced from various dry grinding processes such as a pin mill, a roller mill, an air swept impact mill or a jet mill based dry grinding/classification process. Talc pigments produced by water washed-based mineral processing technologies are known and also commercially available. The water-washed talc pigments can also be used but they are typically more expensive than the dry ground grades and they are not absolutely necessary for producing effective anti-tack formulations in accordance with the invention.

However, it is important to employ talc pigments produced from high grade ores that contain a minimal amount of other mineral impurities in them. The ore materials should contain preferably no or at most trace ppm type levels of any fibrous asbestiform materials and they should also contain a negligible amount of total crystalline silica (TCS) content because of the respiratory health hazards attributed to these materials. The TCS content is analytically determined by X-ray Diffraction (which has a detection limit of 0.10%) and is defined as the collective sum of all the crystalline silica species that are present in the mineral product as minor impurities. With respect to the TCS value determined by XRD, the three crystalline silica species of primary respiratory concern are quartz, cristobalite and tridymite. In the inventive anti-tack formulations, it is therefore preferred that the fine particle talc pigments have a TCS content less than 0.5% by weight and more preferably have a TCS content less than 0.3% by weight. On a total liquid formulation basis this puts the amount of TCS content to be less than 0.25% by weight of the total formula or more preferably to be less than 0.15% by weight of the total formula.

Given the recent rollout of reduced OSHA occupational exposure guidelines for respirable crystalline silica in general industry applications (see 29 C.F.R. 1910.1053) rubber compounders are becoming increasingly concerned about using anti-tack formulations that contain high levels of crystalline silica content. Many rubber compounders are requiring that suppliers provide anti-tack products that have TCS contents less than 1% or frequently even lower in order to meet these environmental exposure standards. As such, utilizing fine particle talc pigments that can meet these requirements is an important aspect of the inventive formulations.

Beyond its low cost, fine particle talc is of interest to use in anti-tack formulations because its platelet morphology provides good anti-block properties while its moderately hydrophobic surface lends to good affinity of the particles to elastomeric surfaces. Talc is also recognized as providing very good slip and lubrication properties. For example, the use of talc as dry anti-tack powders for dusting elastomeric compounds is well known in the industry. Furthermore, the use of talc pigmentation in pellet lube formulations for coating uncured rubber pellets is known in the art as discussed above in connection with the Pellet Lube F3 product. While such talc formulations are effective for coating rubber pellets at solids contents of 10-18%, they are less effective as anti-tacks when used as rubber slab dip slurries at lower solids contents of 3-4% solids. While a fine particle talc plus fatty acid soap combination provided in slurry form provides some desirable properties it still suffers from several disadvantages that limit its ease of use and utility for rubber slab dip applications and these are detailed below.

a. Talc slurries in high solids slurry concentrate form are frequently difficult to stabilize so as to inhibit syneresis and pigment settling. Accordingly, significant amounts of various suspension aides, such as CMC, xanthan gum, or bentonite, are commonly employed in the formulations to improve their pigment suspension properties.

b. Despite the use of suspension aides in a talc slurry concentrate, its subsequent dilution into waterborne slurries of about 3-4% solids content for subsequent potential use as a rubber slab dip normally results in dip slurries with poor talc suspension properties. Even when fine particle grades are employed, the talc pigmentation in the dip slurry settles rapidly and tends to form hard packed or gummy sediments which are very difficult to re-stir into suspension.

c. When utilized as rubber slab dip slurries at 3-4% solids content, the talc-based pellet lubes frequently yield poor coating coverage of uncured rubber grades such that poor anti-tack performance is obtained. The slab dip slurries derived from pellet lubes do not wet the elastomeric surface very well and consequently they tend to run off the rubber in streaks rather than provide a uniform continuous coating film.

d. The heavy reliance on using alkali metal fatty acid soaps in talc-based pellet lube formulations can frequently lend to the formation of notable amounts of foam in the dip slurry tank systems that must be proactively managed to keep under control. The generation of excessive foam in the dip slurry tanks can often create problems with respect to uniform coating coverage on the rubber slab and/or the pickup of clumps of foam froth that can dry down to form crusty areas on the rubber slab which can trap moisture underneath. The trapping of moisture underneath these dried clumps of foam can subsequently result in the formation of blisters during the subsequent molding or profile extrusion stages of final rubber product manufacture. Hence using anti-tack formulations that have low potential for producing foam in the dip tank systems are very desirable.

In contrast to the aforementioned pellet lubes and other prior art discussed above, the talc-based anti-tack formulations of this invention address the previous performance shortcomings associated with talc-dominated formulations because the talc pigmentation therein has now been flocculated with one or more water-soluble cationic polymers. The details of the water soluble cationic polymer are discussed below. The talc-based anti-tack formulations of this invention possess a number of advantageous attributes that provide a number of improvements over prior art anti-tack formulations. The attributes are discussed below.

The inventive formulation can be produced in a high solids concentrate form (slurry solids content being equal to or greater than 45%, more preferably 50% or more) that is stable and is easily pumped and readily diluted as needed. It is a low cost anti-tack formulation whereby expensive anti-block pigments or additives like metal stearates or waxes are not needed to yield a product that provides good anti-tack coating coverage on uncured rubber compounds. The high solids content is desirable from the standpoint of minimizing freight costs when shipping the product to distant customer locations.

All of the pigmentation is pre-dispersed and fully wetted in the formulation so it does not require any heating nor extended mixing times when diluted on-site for subsequent use. The product is ready to use as soon as it is diluted with water to the proper solids content. This can be accomplished with minimal supervision through the utilization of an automated dilution and metering system whereby slurry concentrate is pumped from a delivery tote into the dilution system, water is added, the combination is mixed for several minutes until homogeneous, and the solids content is continuously monitored via an inline probe and adjusted accordingly based on the target set point. The diluted anti-tack slurry product is then sent to the rubber line's dip tank system for application use. Automated dilution and metering system for drawing down a high solids slurry to a lower solids content are well known and an example of such a system is commercially provided or sold by SASCO/PSG.

The inventive talc based formulation when diluted to 3-4% solids content performs as an effective rubber slab dip formulation. It provides good anti-tack coverage on a wide array of uncured rubber compounds. Because the talc pigmentation has been lightly to moderately flocculated through the addition of a water-soluble cationic polymer, the agglomerated particles of talc will settle to yield soft, fluffy wet sediments that do not become hard packed if mixing in the dip slurry tanks is ever discontinued for extended periods of time. This fluffier sedimentation arising from a dip slurry of the inventive formulation is clearly reflected by the fact that the resultant wet sediments of talc exhibit a higher RSV value (RSV=relative sediment volume). Being soft and fluffy, the wet sediments of talc arising from the inventive formulations are found to be easily stirred back into suspension when mixing is resumed.

The concept of RSV for wet pigment sediments has been previously explained and discussed in U.S. Pat. No. 6,156,117. As disclosed there, the RSV value or wet void volume for a given mineral pigment is a measure of how densely the individual particles from an aqueous suspension have been packed together once they have completely settled into a wet sediment. The more compact or denser the mineral sediment is the less wet void volume there will be in the sediment. RSV (or wet void volume) results from imperfect particle packing arising from the shape(s) of the various particles that are present. Flocculation of the platy talc particles with a water soluble cationic polymer results in the formation of agglomerates that are irregularly shaped and of different sizes and this consequently results in imperfect particle packing. Dense phase packing of the talc platelets is also likely prevented by steric hindrance as a single long-chain water soluble cationic polymer is most likely attached to several talc particles via multiple points of ionic interaction. Hence, segments of the polymer chain thereby act as spacers to keep these platelets within the agglomerate physically separated from one another by a certain small distance. As such, it is believed that the agglomerates are likely loosely bound collections of talc platelets having interparticle spaces rather than being tightly bound, compacted collections of talc platelets. The overall magnitude of RSV increase can be impacted by the particle size of the starting talc, the amount of surfactant that is present in the formula and the overall dosage of the water soluble cationic polymer that is employed. However, increases in RSV on the order of 1.5-6 times greater have been observed when RSV comparisons are made to sediments arising from similar talc formulations not employing any water soluble cationic polymer like PolyDADMAC. For purposes of experimental comparison, the RSV of different talc anti-tack formulations have been assessed as 4% solids dip slurries after 6 hours and then again after 24 hours of static settling. No further change in RSV is typically noted beyond the 24 hour time period. It is believed that RSV values of 35 $cm^3$ or more when measured for 24 hours for a diluted anti-tack formulation, preferably more than 50 $cm^3$, provide the desired anti-tack properties when treating an uncured rubber compound using the inventive anti-tack formulation in an anti-tack application like spraying or dip slurry use. A more detailed explanation of the manner of measurement of the RSV value is given below.

A particularly effective water-soluble cationic polymer for the inventive anti-tack formulations are PolyDADMAC polymers (PolyDADMAC=polydiallyldimethyl ammonium chloride) of moderately high to high molecular weight. PolyDADMAC polymers having Mw values, as determined by GPC-T, ranging from about 200,000 Daltons to 2,000,000 Daltons are useful in the inventive process however a particularly effective Mw for the PolyDADMAC flocculating agent used in the inventive formulation is about 500,000 Daltons. A feature of the inventive formulation is the formation of fluffy talc sediments that could be easily stirred back into suspension with low shear agitation. In other talc-based anti-tack formulations, the talc wet sediments are frequently hard-packed or even in cases where they are not hard packed the talc wet sediments are instead gummy in nature and still highly problematic to re-suspend with moderate agitation.

While PolyDADMAC is one water soluble cationic polymer that is preferred for use in the inventive anti-tack formulations, other water soluble cationic polymers having a Mw range, as determined by GPC-T, ranging from about 50,000 Daltons to 2,000,000 Daltons and ability to form fluffy talc sediments that can be easily stirred back into suspension with low shear agitation can be used as the water soluble cationic polymer of the invention. One or more water soluble cationic polymers can be used as part of the anti-tack formulation of the invention. Examples of other cationic polymers include epichlorohydrin-dimethylamine (Epi-DMA), and polyquaterniums, including. cationic polyacrylamides (CPAM) and quaternized modifications of various polyamine polymers. Some representative examples of synthetic polyamines that are suitable for quaternization include polyethyleneimine (PEI), poly(amidoamine)s (PAA), poly(amino-co-ester)s (PAE) and poly(2-N,N-dimethylaminoethylmethacrylate) (PDMAEMA). In addition, the range of polyquaternary polymers commonly referred to as polyquaterniums in the cosmetic and personal care industry are suitable cationic polymers. Some common polyquaterniums known in the art are found in the list below. It should be understood that this listing of polyquaterniums is only exemplary and that other known polyquaterniums in the art can be used as the polyquaternary cationic polymer of the invention. It should be noted that in the list below, polyquaternium-6 corresponds to the PolyDADMAC mentioned above.

List if Polyquaterniums[1]

| Polyquaternium | Chemical Identity |
|---|---|
| Polyquaternium-1 | Ethanol, 2,2',2''-nitrilotris-, polymer with 1,4-dichloro-2-butene and N,N,N',N'-tetramethyl-2-butene-1,4-diamine |
| Polyquaternium-2 | Poly[bis(2-chloroethyl) ether-alt-1,3-bis[3-(dimethylamino)propyl]urea] |
| Polyquaternium-4 | Hydroxyethyl cellulose dimethyl diallylammonium chloride copolymer; Diallyldimethylammonium chloride-hydroxyethyl cellulose copolymer |
| Polyquaternium-5 | Copolymer of acrylamide and quaternized dimethylammoniumethyl methacrylate |
| Polyquaternium-6 | Poly(diallyldimethylammonium chloride) |
| Polyquaternium-7 | Copolymer of acrylamide and diallyldimethylammonium chloride |
| Polyquaternium-8 | Copolymer of methyl and stearyl dimethylaminoethyl ester of methacrylic acid, quaternized with dimethylsulphate[2] |
| Polyquaternium-9 | Homopolymer of N,N-(dimethylamino)ethyl ester of methacrylic acid, quaternized with bromomethane |
| Polyquaternium-10 | Quaternized hydroxyethyl cellulose |
| Polyquaternium-11 | Copolymer of vinylpyrrolidone and quaternized dimethylaminoethyl methacrylate |
| Polyquaternium-12 | Ethyl methacrylate/abietyl methacrylate/diethylaminoethyl methacrylate copolymer quaternized with dimethyl sulfate |
| Polyquaternium-13 | Ethyl methacrylate/oleyl methacrylate/diethylaminoethyl methacrylate copolymer quaternized with dimethyl sulfate |
| Polyquaternium-14 | Trimethylaminoethylmethacrylate homopolymer |
| Polyquaternium-15 | Acrylamide-dimethylaminoethyl methacrylate methyl chloride copolymer |
| Polyquaternium-16 | Copolymer of vinylpyrrolidone and quaternized vinylimidazole |
| Polyquaternium-17 | Adipic acid, dimethylaminopropylamine and dichloroethylether copolymer |
| Polyquaternium-18 | Azelaic acid, dimethylaminopropylamine and dichloroethylether copolymer |
| Polyquaternium-19 | Copolymer of polyvinyl alcohol and 2,3-epoxypropylamine |
| Polyquaternium-20 | Copolymer of polyvinyl octadecyl ether and 2,3-epoxypropylamine |
| Polyquaternium-22 | Copolymer of acrylic acid and diallyldimethylammonium Chloride |
| Polyquaternium-24 | Quaternary ammonium salt of hydroxyethyl cellulose reacted with a lauryl dimethyl ammonium substituted epoxide. |
| Polyquaternium-27 | Block copolymer of Polyquaternium-2 and Polyquaternium-17 |
| Polyquaternium-28 | Copolymer of vinylpyrrolidone and methacrylamidopropyl trimethylammonium |
| Polyquaternium-29 | Chitosan modified with propylen oxide and quaternized with epichlorhydrin |
| Polyquaternium-30 | Ethanaminium, N-(carboxymethyl)-N,N-dimethyl-2-[(2-methyl-1-oxo-2-propen-1-yl)oxy]-, inner salt, polymer with methyl 2-methyl-2-propenoate |
| Polyquaternium-31 | N,N-dimethylaminopropyl-N-acrylamidine quaternized with diethylsulfate bound to a block of polyacrylonitrile |
| Polyquaternium-32 | Poly(acrylamide 2-methacryloxyethyltrimethyl ammonium chloride) |
| Polyquaternium-33 | Copolymer of trimethylaminoethylacrylate salt and acrylamide |
| Polyquaternium-34 | Copolymer of 1,3-dibromopropane and N,N-diethyl-N',N'-dimethyl-1,3-propanediamine |
| Polyquaternium-35 | Methosulphate of the copolymer of methacryloyloxyethyltrimethylammonium and of methacryloyloxyethyldimethylacetylammonium |
| Polyquaternium-36 | Copolymer of N,N-dimethylaminoethylmethacrytate and buthylmethacrylate, quaternized with dimethylsulphate |
| Polyquaternium-37 | Poly(2-methacryloxyethyltrimethylammonium chloride) |
| Polyquaternium-39 | Terpolymer of acrylic acid, acrylamide and diallyldimethylammonium Chloride |
| Polyquaternium-42 | Poly[oxyethylene(dimethylimino)ethylene (dimethylimino)ethylene dichloride] |
| Polyquaternium-43 | Copolymer of acrylamide, acrylamidopropyltrimonium chloride, 2-amidopropylacrylamide sulfonate and dimethylaminopropylamine |
| Polyquaternium-44 | 3-Methyl-1-vinylimidazolium methyl sulfate-N-vinylpyrrolidone copolymer |
| Polyquaternium-45 | Copolymer of (N-methyl-N-ethoxyglycine)methacrylate and N,N-dimethylaminoethylmethacrylate, quaternized with dimethyl sulphate |
| Polyquaternium-46 | Terpolymer of vinylcaprolactam, vinylpyrrolidone, and quaternized vinylimidazole |
| Polyquaternium-47 | Terpolymer of acrylic acid, methacrylamidopropyl trimethylammonium chloride, and methyl acrylate |

[1]Iwata, Hiroshi; Shimada, Kunio (2012 OCt. 2). *Formulas, Ingredients and Production of Cosmetics: Technology of Skin- and Hair-Care Products in Japan* (https://books.google.com/books?id=QvDxRLtnXVQC). Springer Science & Business Media. ISBN 9784431540618.

In terms of useful cationic polymers, it should also be noted that polyquaternary polymers are recommended for use as the pKa value associated with polyamines is usually too low in relation to the typical operable pH range of 8.5-10.5 for the talc based anti-tack formulations of this invention such that the polyamines will largely be present in a non-protonated form. Consequently, this means that polyamines will not be cationic in the operable pH range.

In an effort to judge the size of the talc agglomerates being produced by the interaction of the water soluble cationic polymer, when PolyDADMAC is preferably used, with the individual talc platelets, testing was conducted to examine the change in the particle size distribution of the talc pigmentation used therein. Using a Horiba LA-300 laser light scattering analyzer, the median particle size and particle size distribution properties of the starting talc feedstock was characterized and then the resultant changes in those particle size properties upon treatment of the talc with the water soluble cationic polymer, i.e., the PolyDADMAC polymer, that is employed in the formulation were examined. A shift in the overall particle size distribution is seen in FIG. 1 as a consequence of the cationic polymer behaving as a flocculant and creating loosely bound agglomerates of the talc platelets. The net result is about a 25% increase in the median particle size value associated with the agglomerated talc species being created as compared to its starting talc control without any water soluble cationic polymer, e.g., PolyDADMAC.

Figure 3:
FIG. 3 are photographs of uncured rubber compound slabs after being dip coated with different talc-based anti-tack formulations.

While the exact mode(s) of interaction between water soluble cationic polymer, e.g., PolyDADMAC, and the talc particles in the inventive formulations are not totally understood, it is believed that it is particularly beneficial to use dry ground talc grades. In its highly crystalline, virgin form, talc is a layered silicate structure consisting of octahedral-coordinated $Mg^{VI}$ that is sandwiched between two layers of tetrahedral-coordinated $SiO_4$ with no residual surface charges, no cation exchange capacity (CEC), and therefore without interlayer cations. In the mineralogy literature, see E. F. Aglietti, Applied Clay Science, Vol. 9, 1994, pp. 139-147, it is known that significant physicochemical effects can occur when talc is subjected to intense dry grinding processes due to its low Mohs hardness. The layers in talc are bonded together only by weak Van der Waals forces which make it sensitive to grinding processes. Beyond just simple reduction in its particle size, the dry grinding of talc yields increases in surface area, porosity, CEC, and also solubility that creates very reactive surfaces. For example, Aglietti's published test data indicate that $Mg^{+2}$ levels as high as 400 meq Mg/100 g of mineral can be solubilized from talc and that CEC values as high as 20 meq/100 g can be created for talc depending on the extent of grinding. The increased solubility of $Mg^{+2}$ from ground talc in alkaline media is undoubtedly a driver to the creation of its observed anionic surface charge. The anionic surface charge of ground talc in aqueous media at pH's of 8.0-10.0 can be substantial with zeta potential values around −40 to −50 mV being reported in the mineralogy literature. This is shown in FIG. 3 of the technical publication of J. A Finch, et. al., Canadian Metallurgical Quarterly, Vol. 49, No. 4, 2010, pp. 405-410. The creation of CEC and substantial anionic surface charge therefore provide two different modes of possible ionic attachment between the ground talc particles and the PolyDADMAC polymer as the water-soluble, polycationic electrolyte.

Another feature of the invention is a dramatic improvement in anti-tack coating efficiency and the rate of drying of the applied slab dip film on uncured rubber compounds that is highly beneficial. This improvement in anti-tack coating efficiency and film drying enables the lightly-to-moderately flocculated talc based formulations of the invention to be used effectively as rubber slab dip slurries, for example dip slurries having a 3-4% solids content. In contrast, traditional talc based pellet lubes, wherein the talc particles are not flocculated, are far less effective as anti-tacks when utilized at low solids levels. This improvement in anti-tack performance has therefore allowed low cost, talc based anti-tack formulations to be developed that are highly effective for slurry slab dip applications which can still be produced as a slurry concentrate of at least 45% solids, preferably at least 50% solids, and they do not suffer from any of the hard pack or gummy dip slurry pigment settling issues normally associated with formulas using high levels of talc pigmentation.

In order to formulate effective anti-tack formulations utilizing talc and a water soluble cationic polymer like PolyDADMAC that results in a lightly to moderately flocculated talc product, it is preferred to employ nonionic surfactants of intermediate HLB value (HLB=6–12) as interfacial wetting agents in the formula. One or more nonionic surfactants of intermediate HLB value are commonly employed in the anti-tack formulation at combined concentration levels up to 4.0% by weight of the total formulation weight, preferably up to 3.0%, and more preferably between about 0.5 and 2.0% by weight of the total formulation weight. The term HLB stands for the Hydrophilic/Lipophilic Balance value for a surface active agent. Intermediate HLB nonionic surfactants typically exhibit lower foam potential than high HLB nonionic surfactants whereby the HLB value is substantially greater than 12. The intermediate HLB nonionic surfactants also typically exhibit lower foam properties as compared to other classes of wetting agents (e.g., anionic, cationic and amphoteric surfactants) that might be considered. Two intermediate HLB nonionic surfactants that are particularly useful in the inventive anti-tack formulation are ethoxylates of tridecyl alcohol (e.g., Ethal TDA-5; HLB 10.4) and ethoxylates of 2,4,7,9-tetramethyl 5 decyn-4,7-diol (e.g., Surfynol 440; HLB=8.0). However, other types of nonionic surfactants that would work in the formulation as well so long as their hydrophobic and hydrophilic segments therein are selected to be in balance with each other so as to yield an intermediate HLB value of 6-12 include the following nonionic chemistries: ethoxylates of alkylphenols, ethoxylates of other linear or branched fatty alcohols having a carbon chain length ranging from $C_6$-$C_{18}$, EO/PO alkoxylates of linear or branched fatty alcohols having a carbon chain length ranging from $C_6$-$C_{18}$, ethylene oxide/propylene oxide block copolymers, ethoxylates of sorbitan esters, ethoxylated fatty acids, ethoxylated castor oils, ethoxylated fatty amines and PEG esters or diesters of saturated or unsaturated $C_8$ to $C_{20}$ fatty acids.

Furthermore, it is preferred to include anionic surfactants, such as alkali metal fatty acid soaps to the anti-tack formulation, either alone or in combination with the nonionic surfactants.

The following provides more explanation regarding the use of the nonionic surfactants alone or in combination with the anionic surfactants, or the anionic surfactants alone as part of the inventive anti-tack formulation. In the talc-based anti-tack formulations of the invention, one will recognize that the critical formulary components therein are the fine particle size talc pigments which serve as anti-block partitioning agents, the polyquaternary cationic polymer, which serves to effectively flocculate the talc particles into loosely bound agglomerates that accordingly improve the settling characteristics of the talc pigmentation and also improve its anti-tack coating performance properties when, for example, the formulation is dip coated onto uncured rubber compounds, and lastly the employment of one or more organic based, surface active wetting agents, i.e., the nonionic and anionic surfactants, which assist in the interfacial wetting of the talc particles and the surface of the uncured rubber compound. This interfacial wetting assists in bringing the talc particles and the uncured rubber surface into intimate contact with one another so as to yield a pigmented coating film on the surface of the uncured rubber compound for purposes of reducing its surface tackiness. In the preferred embodiment of the invention, one would preferably utilize one or more intermediate HLB (HLB=6-12) nonionic surfactants in combination with one or more alkali metal, saturated or unsaturated, $C_8$-$C_{20}$ fatty acid soaps as the wetting agent package. The intermediate HLB nonionic surfactants are particularly effective in wetting the talc pigmentation but select nonionic surfactants can also aide in wetting the surface of the uncured rubber compound. The alkali metal, saturated or unsaturated, $C_8$-$C_{20}$ fatty acid soaps are particularly effective in wetting the surface of the uncured rubber compound and are excellent film formers on the rubber, which aide in forming a talc pigmented film. However, the lower chain length $C_8$-$C_{12}$ alkali metal soaps can also function as pigment wetting agents. Given these overall performance characteristics, it is understandable that using combinations of nonionic surfactants and anionic soaps would be particularly advantageous in the inventive talc based anti-tack formulations in terms of providing good interfacial wetting as well as good film forming properties. However, one skilled in the art will recognize that very careful selection of either the nonionic surfactant candidates or the alkali metal, saturated or unsaturated, $C_8$-$C_{20}$ fatty acid soaps (which are anionic surfactants) can enable effective anti-tack formulations to be created using just one class of surface active wetting agent (nonionic or anionic) rather than utilizing combinations of the two (nonionic plus anionic). So, in the broadest scope of the invention, the organic based, surface active wetting agent package can be just nonionic surfactant(s) (one or more types), or just anionic alkali metal, saturated or unsaturated, $C_8$-$C_{20}$ fatty acid soap(s) (one or more types), or preferably combinations of these two classes of surface active wetting agents whereby one or more nonionic surfactants are combined with one or more anionic soaps. As discussed elsewhere, the only limitation that needs to be kept in mind with respect to using the anionic soaps is the potential for side reactions with the polyquaternary cationic polymer if their respective concentrations in the formulation become too high.

When using the anionic surfactants in the anti-tack formulation, it is preferred to keep the amount of anionic surfactants to a minimum in the formulation. The reason for this is because of potential reaction interferences with the water soluble cationic polymer, e.g., PolyDADMAC. At high concentration levels of the water soluble cationic polymer, e.g., PolyDADMAC, and of the anionic soaps present in the formulation, some resultant reaction products arising from the ionic bonding of the cationic quaternary groups within the polymer with the anionic carboxylate groups associated with the fatty acid soap can undesirably occur. Such ionic reaction products between cationic polyelectrolytes and anionic surfactants are known in the prior art, see for example Chinese patent CN 104923079 B, and these situations should be avoided in the inventive formulation. To that end, total fatty acid soap contents in the inventive formulations should be maintained at levels of about 3.0% by weight of the total formulation or less and more preferably equal to or less than 2.0% by weight of the total formulation to minimize the potential for side reactions with the water soluble cationic polymer, e.g., PolyDADMAC. In summary, a relatively low level and effective amount of alkali metal fatty acid soap for providing good film forming properties on the uncured rubber substrate is needed in the anti-tack formulation while keeping the soap level low enough to also minimize the potential for any side reactions with the water soluble cationic polymer, e.g., PolyDADMAC. Examples of preferred alkali metal fatty acid soaps include sodium or potassium soaps of saturated or unsaturated $C_8$-$C_{20}$ fatty acids. Representative examples of such soaps would be either the sodium or potassium salts of fatty acids like caprylic acid, capric acid, lauric acid, myristic acid, palmitic acid, stearic acid, palmitoleic acid, oleic acid, linoleic acid, linolenic acid, ricinoleic acid and mixtures thereof. Common animal or vegetable sources of such fatty acids include but are not limited to tallow fatty acid, tall oil fatty acid, coconut fatty acid, soybean fatty acid, palm fatty acid and castor oil fatty acid.

Similarly, the water soluble cationic polymer, e.g., PolyDADMAC, dosage levels in the inventive formulation need to be sufficient to provide an effective degree of talc particle flocculation while also keeping its concentration level low enough to minimize the potential for any side reactions with the alkali metal fatty acid soaps being used therein. These end-use requirements are mutually accomplished by utilizing the water soluble cationic polymer, e.g., PolyDADMAC, at active basis dosage levels equal to or less than 0.25% by weight of the total formulation or more preferably at active basis dosage levels equal to or less than 0.10% by weight of the total formulation. On a dry talc basis, the effective amounts of water soluble cationic polymer, e.g., PolyDADMAC, treatment employed are equal to or less than 0.50% by weight of talc or more preferably equal to or less than 0.20% by weight of talc.

Given the anti-tack performance benefits derived from flocculating the talc with a water-soluble cationic polymer, another object of the invention is to develop a high-shear slurry dispersion process whereby water soluble cationic polymer, e.g., PolyDADMAC, and the talc particles can be brought together in an effective manner to yield a high solids slurry concentrate of lightly to moderately flocculated talc particles having acceptable rheological properties for stability and pumpability purposes. To this end, it is desirable that the amount of cationic polymer employed in the formulation be effective in improving the coating efficiency of the 3-4% solids dip slurry and in inhibiting hard pack or gummy settling of the talc pigmentation at very low active basis dosage levels. Otherwise, excessive flocculation of the talc particles in the slurry concentrate can translate to very high formulation viscosities that are not manageable from a mixing and pumpability standpoint.

The use of an effective amount of the cationic polymer is described in more detail as follows.

In the talc-based anti-tack formulations of the invention the active basis dosage of polyquaternary cationic polymer is critical to its functional performance properties in both the high solids slurry concentrate form of 45%-75% solids as well as in its subsequent diluted form of 1-10% solids which is commonly referred to as the anti-tack slab dip slurry. In the high solids slurry concentrate of 45%-75% solids, an effective amount of polyquaternary polymer, such as PolyDADMAC, needs to be employed for the following reasons:

1) An effective amount of polyquaternary polymer is needed to mildly to moderately flocculate the talc pigmentation, as reflected by a change in the talc's particle size distribution, while yielding a stable dispersion of flocculated talc particles that exhibits acceptable rheological properties in terms of its initial and aged Brookfield properties, as measured at 2 rpm and 20 rpm. An effective amount of polyquaternary polymer will increase the Horiba LLS median particle size of the talc pigmentation therein on the order of about 5%-40% which reflects the formation of loosely bound agglomerates of talc. The formation of the talc agglomerates in the concentrate formulation is essential to the resultant dip performance properties of the low solids slab dip slurry upon dilution of the concentrate with water.

2) The dosage of polyquaternary cationic polymer that is employed will have an effect on the concentrate formula's resultant rheological properties. An effective amount of polyquaternary polymer in the formulation yields 2 rpm and 20 rpm Brookfield viscosity properties that help to inhibit pigment settling and syneresis issues in the slurry concentrate during the two week aging period while also ensuring the good pumpability of the aged product concentrate. In terms of target Brookfield viscosities, the high solids anti-tack formulations will have an initial 2 rpm Brookfield Viscosity of 5,000-25,000 cps, but more preferably a 2 rpm Brookfield Viscosity of 10,000-20,000 cps, to insure that the formulation is viscous enough to keep all the pigmentation well suspended in the liquid concentrate and to inhibit syneresis during product storage. The formulation will increase in viscosity as it ages and will form a thixotropic gel whereby its preferred two week aged, 2 rpm Brookfield Viscosity should be less than 150,000 cps to insure that the product can be readily pumped. From a dynamic viscosity standpoint, it is desirable that the 20 rpm Brookfield Viscosity of the formulation after two weeks of aging should be less than 25,000 cps and more preferably be less than 20,000 cps.

3) An effective amount of polyquaternary cationic polymer is employed in the high solids anti-tack formulation so as to impart an effective level of anti-microbial activity to help extend the shelf life of the product or to potentially eliminate the need for adding other optional biocides.

4) The dosage of polyquaternary cationic polymer that is employed in the high solids talc based anti-tack formulation has an impact on its process viscosity and overall processability during the high-shear dispersion process. Hence, an effective amount of polyquaternary polymer in the formulation yields the above flocculation, viscosity and anti-microbial properties while simultaneously enabling the formulation to be processed using conventional single shaft or dual shaft high-shear dispersers at total % solids contents of at least 45% and more preferably at % solids contents greater than 50%. Higher than required levels of polyquaternary cationic polymer usage will result in excessive talc particle flocculation that translates to poor batch processability and it can also result in undesirable side reactions with the alkali metal fatty acid soaps which are anionic. It should also be noted that the effective amount of polyquaternary polymer is preferably added to the formulation's batch water in pre-dissolved form prior to the addition of the talc pigmentation to facilitate the polymer treatment process without causing excessive flocculation during makedown of the overall slurry batch.

With regards to the low solids dip slurry product of 1%-10% solids, that is more preferably 2%-6% solids, and most preferably 3%-4% solids, which is produced from the high solids concentrate of 45%-75% solids via dilution with water, the amount of polyquaternary cationic polymer that is employed in the making of the concentrate formulation ultimately translates to functional end-use performance benefits in an uncured rubber coating application like a dip slurry application. Hence, in a low solids dip slurry application, an effective amount of polyquaternary polymer, such as PolyDADMAC, needs to be present for the following reasons:

1) An effective amount of polyquaternary polymer is needed in the low solids dip slurry in order to prevent hard pack settling of the talc pigmentation. The effective amount of polyquaternary polymer results in the creation of soft or fluffy wet sediments of talc whereby the associated RSV of the wet sediment is equal to or greater than 35 cm$^3$ when measured in a 1 liter graduate cylinder from a 4% solids dip slurry contained therein that has been allowed to statically settle for 24 hours.

2) An effective amount of the polyquaternary cationic polymer is needed in the low solids, anti-tack dip slurry in order to improve the coating coverage of a 4% solids talc based dip formulation that is dip coated onto an uncured rubber compound slab for the purposes of improving the resultant anti-tack properties of the applied coating film on the surface of the uncured rubber slab to an anti-tack performance rating of at least 3 or preferably higher. A more detailed explanation of the anti-tack performance rating of dip coated uncured rubber compounds, which ranges from a low anti-tack performance rating of 0 (whereby a 0 rating equates to "fail") to a maximum anti-tack performance rating of 6 (whereby a 6 rating equates to "excellent"), will be provided later on in Example 3.

In a more preferred embodiment, the water soluble cationic polymer, e.g., PolyDADMAC, will be employed at active basis dosage levels equal to or less than 0.25% by weight of the total formulation or more preferably be employed at active basis dosage levels equal to or less than 0.10% by weight of the total formulation.

In addition to all the aforementioned performance benefits imparted from PolyDADMAC being added at very low active basis dosage levels the PolyDADMAC, being a cationic polyquaternary polymer, may also inherently help to mitigate microbial growth in the anti-tack formulation as the antimicrobial activity of cationic polyquaternary polymers has been previously reported in the technical literature; see for example A. M. Carmona-Ribeiro, et. al., International J. of Molecular. Sci., 2013, 14, pp. 9906-9946. This reported anti-microbial activity may extend the shelf life of the formulation or it may even obviate the need for using other biocide additives under certain storage conditions so this is another potential benefit associated with the use of a cationic polyquaternary polymer in the talc based anti-tack formulation.

Another aspect of the invention relates to the method of making the anti-tack formulation using the polyquaternary cationic polymer, one or more sizes of talc, and additives such as nonionic surfactants, anionic soaps, suspension aids, defoamers, and biocides. The various components are mixed together in various increments and order to ultimately form the inventive anti-tack formulation. While the order of adding the various components can vary as well as adding incremental amounts to obtain the desired concentrations, with regards to combining the cationic polymer and talc, the preferred mixing approach is to first add the cationic polymer in pre-dissolved aqueous form (which is about 7.0-7.5% active basis polymer) to the formula's starting batch water and then begin adding the dry talc thereafter in stages under high shear mixing conditions with intermittent additions of nonionic surfactant and alkali metal fatty acid soap to help wet and disperse the talc particles into a homogeneous slurry formulation. Along the course of this high-shear dispersion process, other chemical process additives such as suspension aides, defoamers, and biocides can also be incorporated to yield the final anti-tack formulation. A representative high-shear dispersion process scheme is outlined in Process Scheme 1 of Table III, which is detailed and discussed in Example 1 below. In contrast, adding the pre-dissolved water soluble cationic polymer, e.g., PolyDADMAC, solution at latter stages of the overall talc dispersion process can typically result in unmixable gels being quickly produced. The pre-dissolved solution of water soluble cationic polymer, e.g., PolyDADMAC, (at 7.0-7.5% solids content) that is used in the disclosed process of making is easily produced from dry water soluble cationic polymer, e.g., PolyDADMAC, beads by mixing them into soft, neutral pH water using an IKA Ultra-Turrax rotor/stator disperser. No detectable degradation in the molecular weight of the water soluble cationic polymer occurs when employing the Ultra-Turrax disperser at moderate mix shear rates while targeting a finished solids content of 7.0-7.5% for the water soluble cationic polymer, e.g., PolyDADMAC, solution. While it is possible that PolyDADMAC products which are commercially available in high solids content aqueous form (e.g., at 30-50% solids) from the polymer manufacturers may be employed in the inventive process by adjusting for their polymer actives content difference, many of these products contain their own surfactant packages that have to be considered and accounted for when formulating the desired anti-tack formulation. Given these additional considerations and the criticality of employing the right surfactants in the anti-tack formulation, it is preferred to obtain the PolyDADMAC in dry form and then pre-dissolve it in water for subsequent formulation use.

As noted above, the high solids talc based anti-tack formulations of the invention are comprised of three essential ingredients: a fine particle size talc, a polyquaternary cationic polymer and a surface active wetting agent package whereby the wetting agent package can consist of just intermediate HLB nonionic surfactant(s) (one or more types), or just anionic alkali metal, saturated or unsaturated, $C_8$-$C_{20}$ fatty acid soap(s) (one or more types), or preferably will contain combinations of these two classes of surface active wetting agents whereby one or more intermediate HLB nonionic surfactants are combined with one or more anionic alkali metal, saturated or unsaturated, $C_8$-$C_{20}$ fatty acid soaps. Also as mentioned above, another optional ingredient in the inventive anti-tack formulation is suspension aide additives. Useful suspension aide additives in the anti-tack formulation can include but are not limited to fumed silica, xanthan gum, sepiolite, smectite clays such as bentonite and hectorite, attapulgite and carboxy methyl cellulose. The optional amount of suspension aide potentially employed is highly dependent on the total % solids of the anti-tack formulations which can vary from a solids content of 45%-75% but the anti-tack formulations more preferably have a % solids content greater than 50%. The total combined amount of suspension aide that is employed is also highly dependent on which combination of one or more suspension aides is employed as the relative effectiveness and associated viscosity build from each suspension aide additive is different.

In the lower end of the total % solids range (from 45%-50% solids) a higher dosage level of suspension aide additive is commonly employed in the anti-tack formulation in order to help prevent pigment settling and/or to eliminate syneresis issues in the concentrate formulation. At a total solids content of 45%-50%, the combined amount of suspension aides that is typically utilized falls into the additive range of 1.0-2.0% by weight of the total formulation. In contrast, at a total solids content of 50%-55% the combined amount of suspension aides that is typically utilized falls into the additive range of 0.2-1.0% by weight of the total formulation. Lastly, at a total solids content greater than 55% the combined amount of suspension aides that is typically utilized falls into the additive range of 0.0-0.2% by weight of the total formulation as little to no suspension aide is required to minimize pigment settling and/or to prevent syneresis behavior. Thus, an overall range for the suspension aid, if used would be from zero to 2.0% by weight.

The various defoamer additives that have been discussed as components of the talc based anti-tack formulation (e.g., an oil based defoamer, n-butyl stearate and tributyl phosphate) are also optional additives. The use of defoamers is highly dependent on the type of surface active wetting agent package that is being employed and the total amount of wetting agent that is present in the anti-tack formulation. The alkali metal, saturated or unsaturated, $C_8$-$C_{20}$ fatty acid soaps are typically more foamy than many of the nonionic surfactants so the addition of some defoamer may be required to keep a dip slurry foam, for example, in check if soaps are utilized. In contrast, some low EO content nonionic surfactants and some of the alkoxylated EO/PO nonionic surfactants or select EO/PO block copolymer nonionic surfactants of intermediate HLB value are commonly very low foaming surfactants hence the need for using defoamer may be minimized or eliminated. Lastly, the addition of fumed silica as a suspension aide frequently helps to lower foam in the low solids dip slurries as well by acting as a particulate based bubble buster hence the need for using defoamer may be further minimized or eliminated. So in summary, the total amount of foam seen in the low solids dip slurries that are derived from the high solids anti-tack formulations via dilution is dependent on the types and amounts of wetting agent(s) employed so defoamer additives are accordingly employed as needed to keep the dip slurry foam as low as practically possible. It is also prudent to utilize as little defoamer as possible in controlling dip slurry foam because excessive usage of defoamers, particularly the oil based defoamers, can begin to effect the quality and coverage of the anti-tack dip coating that is being applied to the uncured rubber compound. Furthermore, it is generally not recommended to use any silicone (polysiloxane) based defoamer additives in the inventive anti-tack formulations. While silicones are very effective defoaming agents, their use can permanently effect the adhesion properties of the final rubber compound so most rubber compounder's prohibit their use.

The anti-tack formulations of the invention utilize talc particles having a median particle size of about 7 microns or less (as measured with a Cilas particle size analyzer) and more preferably having a median particle size of about 3 microns or less. In a highly preferred case, the talc pigmentation used in the inventive anti-tack formulation is a blend of two different sized talc particles, wherein the smaller median particle size is at least two microns less than the larger median particle size. For example, the talc particles could combine a 5 micron median particle size with one that is 3 microns or less. A more preferred combination of talc particles is a 3 micron median particle size (mps) talc and a 1 micron mps talc. The relative weight of the mix of talc particles is one where the larger size particles are greater in weight amount than the smaller size talc particles. The relative active basis weight ratio of larger talc to smaller talc can range from about 1.5:1 to 9:1. When using a combination of 3 and 1 micron mps talc particles, a preferred active basis weight ratio of 3 micron mps talc to 1 micron mps talc can range from about 2.5:1 to 4:1. The utilization of some 1 micron mps talc in the inventive formulation is desirable because its higher surface area translates to improved coating coverage of the uncured rubber compound. Two representative examples of commercial talc pigments that are particularly useful in the inventive formulation are SAS-3 Talc (Cilas mps=3.0 microns) and FlexTalc 610 (Cilas mps=1.0 micron) which are both available from Cimbar Performance Minerals. Both of these pigments are dry ground grades of talc that have been subjected to intensive grinding and classification. Furthermore, the SAS-3 and FlexTalc 610 talc pigments are produced from high quality ores that contain a minimum amount of mineral impurities such as crystalline silica. These pigments therefore help to meet the OSHA occupational exposure requirements discussed above.

Beyond the coating coverage aspects that the inventive anti-tack formulation provides (as discussed above), the utilization of fine particle size talc pigments in the inventive formulations is also preferred because they are more easily reincorporated into the rubber compounds in subsequent rubber product manufacturing steps. Anti-tack coating formulations are applied to uncured rubber compounds to reduce their tackiness. They serve as process aides to enable the rubber compounder to temporarily stack or more easily move compounded rubber to other operations where the rubber will ultimately be cured and molded into its finished product form. In these subsequent manufacturing steps, the compounder wants all of the compound's adhesion properties to be unaffected so as to yield good rubber to rubber or rubber to metal adhesion properties. It is therefore essential that the anti-tack coating be effective on the rubber compound's surface for a short period of time but then be easily reincorporated back into the compound later on such that final adhesion properties in the cured/molded product are not adversely affected. Being effective anti-block pigments, it is therefore preferable that the talc particles be small in size to aide their ease of reincorporation.

In terms of their desired viscosity, the inventive talc based anti-tack formulations have an initial 2 rpm Brookfield Viscosity of 5,000-25,000 cps, but more preferably a 2 rpm Brookfield Viscosity of 10,000-20,000 cps, in order to insure that the formulation will be viscous enough to keep all the pigmentation well suspended in the liquid concentrate and to inhibit syneresis during product storage. Typically, the inventive anti-tack formulation will increase in viscosity as it ages and will form a thixotropic gel. From an aged viscosity standpoint, it is preferred that the two week aged, 2 rpm Brookfield Viscosity of the formulation should be less than 150,000 cps to insure that the product can be readily pumped from totes or other shipping containers using a positive displacement type pump such as an air diaphragm pump, a rotary lobe pump, a progressive cavity pump or the like. Such positive displacement type pumps have the ability to overcome the aged product's rheological yield point so as to transform the gel into a pumpable fluid. From a dynamic viscosity standpoint, it is desirable that the 20 rpm Brookfield Viscosity of the inventive formulation after two weeks of aging be less than 25,000 cps and more preferably be less than 20,000 cps.

Given the measurement of both 2 rpm and 20 rpm Brookfield Viscosities for the inventive formulation, it is important to understand why these specific measurements are being made and why value ranges for each are being defined. The Brookfield 2 rpm measurement is being made to determine the viscosity of the formulation under essentially "static conditions" where a very low shear force is being applied. This low 2 rpm reading is particularly important when measuring the viscosity of the gels formed from aging under static conditions as it is essentially a measure of the gel's viscosity. In rheology terminology, the term kinematic viscosity is also used to define the measurement of a fluid's inherent resistance to flow when no external force, other than gravity, is acting on it. In contrast, the higher shear Brookfield 20 rpm measurement is measuring essentially a dynamic viscosity value. Dynamic viscosity is defined as the measurement of a fluid's resistance to flow when an external force is being applied. For 20 rpm, the dynamic viscosity of the formulation is measured in its flowable state as opposed to the viscosity reading at 2 rpm whereby the product is being measured in its non-flowing "static" gel state. Readings at both shear rates are consequently needed in order to more fully understand the overall rheological properties of the inventive anti-tack formulation.

In terms of processing equipment to produce the inventive anti-tack formulations, various types of high-shear mixing equipment can be potentially employed to disperse the talc at high slurry solids contents. One preferred type of high-shear mixing device is a single shaft, high speed disperser employing a Cowles, cutting-style disperser blade. Multi-shaft dispersers can also be employed with good results and are highly preferred. For example, dual shaft mixers equipped with a center shaft mounted low speed helical wall scrapper type blade in combination with an offset shaft mounted high speed disperser are very advantageous to employ in terms of the range of anti-tack formulations that can be easily produced. A representative example of such a dual shaft disperser system that is suitable for production use is manufactured by Hockmeyer. In comparison, the inventive anti-tack formulations produced with a single shaft disperser often require higher weight %'s of surfactant to be employed in the formula to help mediate the high-shear process viscosity associated with dispersing the talc and keeping the resultant dispersion of flocculated talc particles fluid. Using higher levels of surfactant can accordingly result in more process foam being generated which must then be dealt with through the employment of defoamer additives. In addition, using higher levels of surfactant in the anti-tack formulation can subsequently reduce the amount of wet sediment RSV that is obtained in the diluted dip slurry of 3-4% solids content. In summary, multi-shaft dispersers can often produce effective anti-tack formulations of lower cost by reducing the amount of surfactant that is required for dispersion.

Lastly, while the main object of the invention is to produce effective anti-tack formulations for rubber slab dip applications that are predominantly talc-based formulations, it is also well recognized to one skilled in the art that related formulations can be produced whereby small portions of the total talc pigmentation can be effectively replaced with other anti-block pigments to tailor the final performance properties of the anti-tack product. Examples of suitable replacement pigments for a portion of the talc include but are not limited to kaolinite, calcined kaolin clays, smectite clay minerals such as bentonite and hectorite, attapulgite, sepiolite, barytes, nepheline syenite, calcium carbonate (ground or precipitated forms), dolomite, fine particle micas consisting of muscovite or phlogopite, feldspars, synthetic amorphous silica pigments such as precipitated silica and fumed silica, alumina trihydrate, hydrotalcite and various metal stearate pigments such as calcium stearate, magnesium stearate and zinc stearate. Example formulations are disclosed and characterized whereby about 21% by weight of the total dry basis talc content was successfully replaced with an alternative anti-block pigment as discussed below in Example 3. In this example, the larger 3 micron mps talc was selectively replaced with the alternative anti-block pigment such that the weight ratio blend of 3 micron mps talc to 1 micron mps talc in the formulation was effectively reduced from 4:1 to 2.9:1.

Testing was performed relating to the invention and the various characteristics of the inventive anti-tack formulation. Example 1 of this testing relates to an exemplary composition of the inventive anti-tack formulation with a high solids content and its particle size distribution. Also examined in the testing relating to Example 1 are the properties of the fine particle talcs used in the formulation and the physical properties of the high solids content anti-tack formulation. Example 2 investigates the viscosity characteristics of formulations related to Example 1 to determine their pumping capability. Example 2 also formulates a 4% solids content dip slurry to investigate the foaming properties, sedimentation properties, and the anti-tack coating properties on uncured rubber. Example 3 investigates a composition similar to that used in Example 1 but with substitute anti-block pigments in place of the larger 3 micron mps talc. Example 3 also investigates physical properties of the high solids content formulations and properties of the dip slurry in terms of foaming, sedimentation, and anti-tack coating properties on uncured rubber. Example 4 is similar to Example 3 but makes changes in the amounts of alkali metal fatty acid soap and of nonionic surfactant that are employed to investigate their effects on the dip slurry properties of the inventive anti-tack formulation.

Example 1

Table I summarizes the composition for two different talc-based anti-tack formulations that were produced on a production scale of 3,600 lbs. using different types of high-speed dispersers.

TABLE I

Compositional Summary for Anti-Tack Talc Formulations A & B[c]

| Chemical Tradename/ Supplier | Chemical Name | Properties & Functionality of Ingredient | CAS # | Talc Anti-Tack Formula A Method: Single Shaft High-Speed Disperser | | Talc Anti-Tack Formula B Method: Dual Shaft High-Speed Disperser with Wall Scrapper | |
|---|---|---|---|---|---|---|---|
| | | | | Wt. in Production Batch, lbs. | Wt. % in Formula | Wt. in Production Batch, lbs. | Wt. % in Formula |
| Soft Water | Dihydrogen Oxide | Solvent Phase | 7732-18-5 | 1,708.43 | 47.45% | 1,575.59 | 43.77% |
| Talc SAS-3/Cimbar Performance Minerals | Talc; Magnesium Silicate Hydrate | Anti-Block Pigment (3 micron median p.s.)[a] | 14807-96-6 | 1,350.00 | 37.50% | 1,530.00 | 42.50% |
| FlexTalc 610/ Cimbar Performance Minerals | Talc; Magnesium Silicate Hydrate | Anti-Block Pigment (1 micron median p.s.)[a] | 14807-96-6 | 340.00 | 9.44% | 378.00 | 10.50% |
| Ethal TDA-5/Ethox Chemicals | PEG-5 Tridecyl Ether; Trideceth-5 | Interfacial Wetting (pigment & rubber); Nonionic Surfactant with HLB = 10.4 | 24938-91-8 | 66.60 | 1.85% | 20.70 | 0.58% |
| Norfox 92/Norman, Fox & Co. | Sodium Tallowate Soap | Interfacial Wetting (pigment & rubber) | 8052-48-0 | 39.00 | 1.08% | 39.00 | 1.08% |
| ValPro 59/Vanguard Soap | Blend of Sodium Vegate + Sodium Cocoate Soaps | Interfacial Wetting (pigment & rubber) | 68082-64-4 & 61789-31-9 | 27.60 | 0.77% | 20.40 | 0.57% |
| Konasil 200/OCI | 200 m$^2$/g Fumed Silica; Synthetic Amorphous Silicon Dioxide | Pigment Suspension, Foam Control & Anti-Block | 7631-86-9 | 21.60 | 0.60% | — | — |
| DEE FO 3010A/ Munzing Chemie | Petroleum distillates, blend of light & heavy paraffinic oils | Oil based Defoamer | 64742-56-9 & 64742-65-0 | 11.00 | 0.31% | 10.80 | 0.30% |
| Xanthan Gum/ Global Ingredients | Xanthan Gum; Polysaccharide | Pigment Suspension Aide | 11138-66-2 | 9.40 | 0.26% | 6.12 | 0.17% |
| n-Butyl Stearate/ Custom Synthesis, LLC | n-Butyl Stearate | Pigment Wetting & Defoamer | 123-95-5 | 7.20 | 0.20% | 7.20 | 0.20% |
| PhosFlex 4/ICL Industrial Products | Tri-n-butyl Phosphate | Defoamer | 126-73-8 | 7.20 | 0.20% | — | — |
| Pangel W/Tolsa Group | Sepiolite; Hydrous Magnesium Silicate | Pigment Suspension Aide | 63800-37-3 | 3.60 | 0.10% | 3.60 | 0.10% |
| PDMBL Series/ Isomeric Industries | PolyDADMAC; Polydiallyldimethyl Ammonium Chloride (Mw = 493,000 Da)[b] | Water Soluble Cationic Polymer; Pigment Flocculating Agent | 26062-79-3 | 3.37 | 0.09% | 3.37 | 0.09% |
| BSC 3243/Bulk Chemical Services | Dazomet; Tetrahydro-3,5-dimethyl-2H-1,3,5-thiadiazine-2-thione | Biocide | 533-74-4 | 2.70 | 0.075% | 2.70 | 0.075% |
| BCS 3502A/Bulk Chemical Services | Glutaraldehyde | Biocide | 111-30-8 | 2.20 | 0.06% | 2.16 | 0.06% |
| Surfynol 440/ Evonik | PEG-3.5 2,4,7,9-tetramethyl 5 decyn-4,7-diol | Interfacial Wetting (pigment & rubber); Nonionic Surfactant with HLB = 8.0 | 9014-85-1 | 0.40 | 0.01% | 0.36 | 0.01% |
| | | | Totals = | 3600.30 | 100.00% | 3600.00 | 100.00% |

Notes:
[a]Median particle size of the Talc was determined using a Cilas 990L Particle Size analyzer. The talc pigments were initially wetted in a 50% w/w aq. solution of Isopropanol and then subsequently dispersed into the analyzer's test chamber water which contained sodium hexametaphosphate as a dispersant.
[b]The Mw of the cationic polymer was determined by Jordi Labs of Mansfield, MA using Tetra-Detection Gel Permeation Chromatography (GPC-T).
[c]Target physical properties for these production scale runs are summarized in Table IV.

The anti-tack Formula A of the invention was produced using a 50 HP high speed, single-shaft disperser unit equipped with a Cowles cutting-style dispersion blade. The talc pigmentation used in Formula A is a blend of a 3 micron median particle size talc (Cimbar SAS-3) and a 1 micron median particle size Talc (Cimbar FlexTalc 610) whereby the preferred relative active basis weight ratio of 3 micron mps Talc to 1 micron mps talc is about 4:1. The stated median particle sizes of the SAS-3 and FlexTalc 610 starting materials are defined on the basis of their analysis with a Cilas 990L laser particle size analyzer. Both of these talc pigments are dry ground grades of talc that have been subjected to intensive grinding and classification and they are produced from high quality ores that contain a minimum amount of mineral impurities such as crystalline silica. Other typical physical properties associated with these preferred fine particle size Talc pigments are summarized in Table 11.

TABLE II

Comparative Typical Properties of Fine Particle Talc Pigments

| Property | SAS-3 Talc | FlexTalc 610 |
|---|---|---|
| Wt. % Passing 325 Mesh | 99.9 | 99.9 |
| Median Particle Size (Cilas PSD 50%)[1], microns | 3.0 | 1.0 |
| % Free Moisture | 0.2 | 0.3 |
| Cie Lab L* | 97.0 | 98.5 |
| pH at 10% solids[3] | 8.9 | 8.9 |
| Total Crystalline Silica Content[2], Wt. % | 0.27 | 0.40 |

Notes:

[1] Median particle size of the talc was determined using a Cilas 990 L Laser Particle Size analyzer. The talc pigments were initially wetted in a 50% w/w aq. solution of Isopropanol and then subsequently dispersed into the analyzer's test chamber water which contained sodium hexametaphosphate as a dispersant.

[2] Total crystalline silica content was determined by R J Lee Group using XRD via the NIOSH 7500 analysis method. Values reported reflect the historical average of lots periodically checked over a 3 year time frame.

[3] Talc pigments were dispersed in pH neutral soft water at 10% solids for pH measurement at 25° C.

Employing the high speed disperser a high-shear mixing process is employed whose stepwise additions are outlined in Process Scheme 1, which is shown in Table III

TABLE III

Process Scheme 1
PRODUCT: Talc Anti-Tack Formulation A
BATCH SIZE: 3,600 #
50 HP Single Shaft High-Speed
Disperser Equipped with a Cowles
EQUIPMENT: Dispersion Blade
PROCESS STEPS Special Instructions: All Talc (SAS-3 and FT610) are added through the screw conveyor addition system. All other powder additives are added over the side of the dispersion tank.

1. PreBlend: Using a Gast Air Mixer at ~40 PSI, begin mixing Ethal TDA-5 (warm; 95° F.) in a 5 gallon pail using a 5" type 3 prong turbine blade then slowly add xanthan gum into vortex. Scrape sides with a spatula & mix well. Leave preblend mixing until needed at Step No. 42.
   a) ETHAL TDA-5 (warm; 95° F.) = 16.2 #
   b) Xanthan Gum = 9.4 #
2. Lower disperser to lowest mix position.
3. Fill 375 gallon baffled SS tank with 1,665 # soft water @ 25-30° C.
4. Turn Ross Disperser on to 30 Hz.
5. Dazomet Biocide (BCS 3243) = 2.7 #
6. 7.2% active PolyDADMAC aq. solution = 46.8 #
7. Surfynol 440 surfactant = 0.4 #
8. Sepiolite (Pangel W) = 3.6 #
9. Munzing DE FOO 3010A defoamer = 5.5 #
10. Norfox 92 Soap = 39 #
11. ETHAL TDA-5 (warm; 95° F.) = 5.4 #
12. Disperse batch for 2 minutes. Check & record pH
13. Increase Ross Disperser mix speed to 60 Hz.
14. SAS-3 Talc = 450 # --- Feed at 1 bag/min rate via screw conveyor.
15. Valpro 59 soap flakes = 3 #
16. ETHAL TDA-5 (warm; 95° F.) = 1.8 #
17. Fumed silica (Konasil 200) = 9 #
18. Raise position height of dispersion blade to aide mixing & disperse for 3 min.
19. SAS-3 Talc = 450 # --- Feed at 2 bags/min rate via screw conveyor.
20. Valpro 59 soap flakes = 3 #
21. ETHAL TDA-5 (warm; 95° F.) = 1.8 #
22. Disperse for 2 minutes.
23. SAS-3 Talc = 350 # --- Feed at 2 bags/min rate into screw conveyor.
24. Valpro 59 soap flakes = 9 #
25. ETHAL TDA-5 (warm; 95° F.) = 12.6 #
26. Disperse for 5 minutes. Scrape down walls during mix time.
27. FlexTalc 610 = 150 #
28. n-Butyl Stearate (warm; 95° F.) = 7.2 #
29. Valpro 59 soap flakes = 6 #
30. ETHAL TDA-5 (warm; 95° F.) = 14.4 #
31. Disperse for 2 minutes.
32. FlexTalc 610 = 100 #
33. Valpro 59 soap flakes = 3 #
34. ETHAL TDA-5 (warm; 95° F.) = 14.4 #

TABLE III-continued

Process Scheme 1
PRODUCT: Talc Anti-Tack Formulation A
BATCH SIZE: 3,600 #
50 HP Single Shaft High-Speed
Disperser Equipped with a Cowles
EQUIPMENT: Dispersion Blade
PROCESS STEPS 35  Scrape down walls & tank baffles then disperse for 3 minutes.
36  FlexTalc 610 = 90 #
37  SAS-3 Talc = 100 #
38  Valpro 59 soap flakes = 3.6 #
39  Glutaraldehyde biocide = 2.2 #
40  Konasil 200 (fumed silica) = 12.6 # --- Add slowly to avoid exceeding max. motor amps
41  Adjust height of dispersion blade to aide incorporation of fumed silica & disperse for 3 minutes. Scrape down walls during mix time.
42  Add PreBlend (from Step No. 1) = 25.6 #
43  Disperse for 3 min.; check screen & mix longer if needed to achieve clear screen.
44  Adjust Ross Disperser to 45 Hz for adding the defoamers below.
45  Munzing DEE FO 3010A defoamer = 5.5 #
46  PhosFlex 4 (Tributyl Phospate) defoamer = 7.2 #
47  Scrape down walls & baffles, then disperse for 3 min. Screen check batch. Screen must be clear before checking pH.
48  Check & record pH. Typical pH = 9.4-9.8 @ 40° C.
49  If batch pH is <9.40 @ 40° C. then dose in 22.5% active KOH as needed to adjust pH to target range of 9.40-9.80 @ 40° C. Let batch mix at least 3 min. in between successive pH adjustments.
50  If batch pH is >9.80 @ 40° C. then dose in 2-Ethylhexanoic Acid as needed to adjust pH down to target range of 9.40-9.80 @ 40° C. Let batch mix at least 3 min. in between successive pH adjustments.
51  If pH adjustments are made (per Steps 49 or 50) then screen check batch before concluding run. Mix extra time as needed to yield clear screen check.
52  Pull batch sample for QC Lab.

Target Specific Gravity (@ 25° C.) = 1.39 ± 0.10;
Target Solids (@ 150° C.) = 52.0 ± 1.0%;
Target QC pH = 9.40-9.90 @ 25° C.;
Initial BF Visc. (Sp #91 @ 2 rpm) = 10,000-20,000 cps;
Conductivity (@ 25° C.) = 0.7-4.7 mS/cm In accordance with Process Scheme 1, the preferred means of bringing together the PolyDADMAC polymer and the Talc particles is to first add the cationic polymer in pre-dissolved aqueous form (which is about 7.0-7.5% active basis polymer) to the formulation's starting batch water and then begin incrementally adding the dry talc thereafter in stages under high shear mixing conditions with intermittent additions of the nonionic surfactants (Surfynol 440 and Ethal TDA-5) and the alkali metal fatty acid soaps (Norfox 92 and Valpro 59) being employed along the way to help wet and disperse the talc particles. These intermittent additions of nonionic surfactants and anionic soaps help to keep the batch fluid enough and mixing well so that a homogeneous dispersion is ultimately produced. In addition, the other process additives such as the suspension aides (Konasil 200—fumed silica, xanthan gum and Pangel W—sepiolite), the defoamers (DEE FO 3010A—oil based defoamer, n-butyl stearate and PhosFlex 4—tributyl phosphate), and biocides (dazomet and glutaraldehyde) can be incorporated in at various intermediate stages of the overall dispersion process to yield the final anti-tack formulation. While dazomet and glutaraldehyde are exemplified, any biocides known to be used in anti-tack formulations can be used in the inventive anti-tack formulations. For example, another potentially suitable biocide for the inventive anti-tack formulation is BIT (1,2-benzisothiazolin-3-one; CAS #2634-33-5). Furthermore, it is believed that the PolyDADMAC being a cationic polyquaternary polymer may also inherently help to mitigate microbial growth in the formulation as the antimicrobial activity of cationic polyquaternary polymers has been previously reported in the technical literature. This anti-microbial activity may therefore extend the shelflife of the formulation or it may even obviate the need for using other biocide additives under certain storage conditions so this is another potential performance benefit associated with the use of a cationic polyquaternary polymer in the talc based anti-tack formulation.

In Formula A, the PolyDADMAC polymer is employed at a very low active basis amount of 0.09% by weight of the total formulation and the specific grade of PolyDADMAC employed in the process had an Mw value of 493,000 Daltons as determined by Tetra Detection Gel Permeation Chromatography (GPC-T). GPC-T couples a GPC separation with a light-scattering (LS) detector for absolute molecular weight determination and a viscometer for determination of polymer shape and radius of hydration (Rh). The use of an LS detector renders calibration standards unnecessary as the measurement is based on the way in which the sample scatters light and not on the retention time at which the molecule elutes as compared to standards. From this analysis the PolyDADMAC grade that was employed was also determined to have an Intrinsic Viscosity of about 10.0 dL/g.

The low level of PolyDADMAC employed in Formula A (0.09% by weight) is sufficient in quantity to moderately flocculate the Talc particles into loosely bound agglomerates while still yielding acceptable rheological properties for stability and for pumpability purposes. The initial 2 rpm and 20 rpm Brookfield Viscosities for Formula A as well as its other QC test properties are summarized in Table IV. The total solids content of Formula A was 52.2% by weight and its initial 2 rpm Brookfield Viscosity was 17,500 cps which is viscous enough to keep all the pigmentation well suspended in the liquid concentrate as it ages and to inhibit the occurrence of syneresis during product storage. In addition, the total crystalline silica content of Formula A was determined to be just 0.14% on the basis of XRD analysis determinations done on the individual raw material contributors and then summing up their respective contributions based on their usage levels in the total formulation.

In Formula A, the nonionic surfactants being employed are nonionic surfactants of intermediate HLB value as both reside within the HLB range of 6-12. The preferred nonionic surfactants are a combination of a PEG-5 tridecyl ether (Ethal TDA-5; HLB=10.4) plus a PEG-3.5 2,4,7,9-tetramethyl 5 decyn-4,7-diol (Surfynol 440; HLB=8.0). Both nonionic surfactants function to provide interfacial wetting between the talc and the elastomer surface. It should also be noted that the total amount of sodium fatty acid soaps (the ValPro 59 plus the Norfox 92) being employed in Formula A is low (total=1.85% by weight of the formulation). ValPro 59 is a blend of sodium vegate and sodium cocoate soaps whereas Norfox 92 is a sodium tallowate soap. One needs to minimize the amount of alkali metal fatty acid soaps being used in the inventive formulation because they are anionic surfactants which can have potential reaction interferences with the PolyDADMAC cationic polymer. At high concentration levels of PolyDADMAC cationic polymer and of the anionic fatty acid soaps some resultant reaction products arising from the ionic bonding of the cationic quaternary groups within the polymer with the anionic carboxylate groups associated with the fatty acid soap can undesirably occur. Such ionic reaction products between cationic polyelectrolytes and anionic surfactants are known in the prior art and they need to be avoided. Consequently, total alkali metal fatty acid soap contents should be maintained at levels of about 3.0% by weight of the total formulation or less and more preferably equal to or less than 2.0% by weight of the total formulation to minimize the potential for side reactions with the PolyDADMAC cationic polymer. These low levels of alkali metal fatty acid soap are still effective for providing good film forming properties on the uncured rubber substrate for aiding anti-tack coating performance while being low enough to also minimize the potential for any side reactions with the PolyDADMAC.

Similarly, the PolyDADMAC polymer dosage of 0.09% by weight of the total formulation is sufficiently low in amount to minimize the potential for any side reactions with the aforementioned alkali metal fatty acid soaps but that dosage level is still adequate to provide an effective degree of talc particle flocculation that significantly enhances end use dip slurry performance properties. Flocculation of the talc particles within Formula A is evident from an examination of its Horiba particle size distribution curve as compared to the particle size distribution curve determined for the starting 4:1 w/w blend of 3 micron to 1 micron talc pigments (see FIG. 1). The observed shift in particle size distribution is a consequence of the cationic polymer creating loosely bound agglomerates of the talc platelets. The net result of this agglomeration is about a 25% increase in the median particle size value (the Horiba mps increased from about 7.82 to about 9.81 microns).

The complete compositional details for Formula B are also summarized in Table I. Formula B was produced via a high-shear mixing process in an analogous fashion to the slurry makedown protocol of Formula A but with some notable exceptions such as:
1) A dual-shaft Hockmeyer disperser was employed instead of a single shaft high speed disperser. The dual shaft disperser was equipped with a center shaft mounted low speed helical wall scrapper type blade in combination with an offset shaft mounted high speed disperser equipped with a Hockmeyer dispersion blade.
2) The same 3 micron mps and 1 micron mps talc pigments were employed at a 4:1 w/w ratio as before but the total solids content of the batch formula was higher and yielded 56.1% solids.
3) The amounts of Ethal TDA-5 surfactant and ValPro 59 soap used in Formula B were significantly reduced versus the amounts employed in Formula A. When comparing Formula A versus Formula B, the Ethal TDA-5 level has been reduced from 1.85 to 0.58 weight % while the level of ValPro 59 has been reduced from 0.77 to 0.57 weight %.
4) No fumed silica or Tri-n-butyl Phosphate defoamer were employed in Formula B.

When making Formula B, the preferred means of bringing together the PolyDADMAC cationic polymer and the Talc particles is to first add the cationic polymer in pre-dissolved aqueous form (which is about 7.0-7.5% active basis polymer) to the formula's starting batch water. Next, one begins to incrementally add in the dry talc in stages under high shear mixing conditions with intermittent additions of the nonionic surfactants (Surfynol 440 and Ethal TDA-5) and alkali metal fatty acid soaps (Norfox 92 and Valpro 59) being employed along the way to help wet and disperse the talc particles. These intermittent additions of surfactants and soaps help to keep the batch fluid enough and mixing well so that a homogeneous dispersion is ultimately produced. As shown in Table IV, the resultant batch produced from Formula B using the Hockmeyer dual-shaft disperser yielded an initial Brookfield Viscosity of 13,800 cps at 56.1% solids.

TABLE IV

Target Physical Properties of Anti-Tack Formulations A & B from Table I

|  | Talc Formula A | Talc Formula B |
| --- | --- | --- |
| pH @ 25° C. | 9.8 | 10.2 |
| Conductivity @ 25° C., mS/cm | 2.46 | 2.42 |
| Initial BF Viscosity (Sp# 91 @ 2 rpm)[1], cps | 17,500 | 13,800 |
| Initial BF Viscosity (Sp# 91 @ 20 rpm)[1], cps | 3,900 | 3,330 |
| Specific Gravity[2] @ 25° C., g/ml | 1.39 | 1.39 |
| Solids Content[3], Wt. % | 52.2 | 56.1 |
| Total Crystalline Silica Content[4], Wt. % | 0.14 | 0.16 |

Notes:
[1]Brookfield Viscosities were measured using a Brookfield RVDVE Heliopath Viscometer Unit equipped with T-spindles run at 2 rpm and then 20 rpm; T-spindle A (#91) was employed.
[2]Specific Gravities were determined using a 100 ml specific gravity cup in accordance with ASTM D1475.
[3]% Solids were determined by the use of a halogen lamp based A&D Model MF-50 Moisture Balance using a temperature setting of 150° C.
[4]Total Crystalline Silica Contents were calculated by summing the contributions from the various contributing mineral sources in the formulation. The contents levels in each contributing source were determined by R J Lee Group using XRD via the NIOSH 7500 analysis method.

Using a PolyDADMAC dosage level of 0.09% by weight of the total formulation the Formula B batch showed a very similar shift in Horiba particle size distribution as did Formula A as a consequence of flocculating the 4:1 w/w Talc blend of SAS-3 and FlexTalc 610. The net change in particle size distribution observed (see FIG. 1) again equated to about a 25% increase in the median particle size value arising from the agglomerated talc species being formed (Horiba mps increased from about 7.82 to about 9.82 microns). However, a key advantage of using the Hockmeyer dual-shaft disperser was that lower amounts of surfactant and soap were required to handle the process viscosity which thereby required less defoamer to be used to keep the foam at an acceptable level. The Hockmeyer dual-shaft disperser therefore enables a more economical formula to be produced and its resultant initial Brookfield Viscosity was notably less than that for Formula A despite the reduction in the amounts of nonionic surfactant and alkali metal soap that were employed.

Example 2

In this Example, a series of talc based anti-tack formulations were all produced on a 5,300 gram lab scale using high-speed dispersers. As shown in Table V, the four anti-tack formulations are identified as Formulas C, D, E and F.

uncured rubber pellets at higher application solids of 10-18%. Pellet Lube F3, which is manufactured by SASCO Chemical Group/PSG, is principally comprised of a 3 micron median particle size talc (Cimbar SAS-3) plus sodium fatty acid soaps and a small amount of bentonite clay as a suspension aide. The Pellet Lube F3 formulation does not employ any polymeric additives such as PolyDADMAC. Commercial batches of Pellet Lube F3 typically have a solids content of about 54% and a pH of about 10 as produced. Formulas C, E and F were produced using a high speed, single-shaft lab disperser unit equipped with a Cowles cutting-style dispersion blade whereas Formula D was produced with a dual shaft lab-scale disperser. The

TABLE V

Physical Property Tracking Data[a] for Lab Batches of Talc Anti-Tack Formulations C, D, E & F

| Anti-Tack Formulation (% Solids[b] & Description) | Initial BF Viscosity, pH & Conductivity[c] | Aged BF Visc., pH & Cond. after Aging 3 Days | Aged BF Visc., pH & Cond. after Aging 7 Days | Aged BF Visc., pH & Cond. after Aging 14 Days |
|---|---|---|---|---|
| Formula C @ 52.2% Solids Description: Talc based Anti-Tack via Cowles Disperser; Lab Scale Equiv. to Formula A | Sp #91 BF @ 2 rpm = 18,000 cps BF @ 20 rpm = 4,140 cps pH = 9.64 Cond. = 2.61 mS/cm | Sp #91 BF @ 2 rpm = 52,100 cps BF @ 20 rpm = 9,630 cps pH = 9.72 Cond. = 2.85 mS/cm | Sp #92 BF @ 2 rpm = 75,200 cps BF @ 20 rpm = 12,400 cps pH = 9.59 Cond. = 2.78 mS/cm | Sp #92 BF @ 2 rpm = 84,600 cps BF @ 20 rpm = 15,760 cps pH = 9.46 Cond. = 2.53 mS/cm |
| Formula D @ 56.1% Solids Description: Talc based Anti-Tack via Dual-Shaft Disperser; Lab Scale Equiv. to Formula B | Sp #91 BF @ 2 rpm = 11,500 cps BF @ 20 rpm = 3,140 cps pH = 10.20 Cond. = 2.34 mS/cm | Sp #91 BF @ 2 rpm = 45,200 cps BF @ 20 rpm = 7,580 cps pH = 10.15 Cond. = 2.75 mS/cm | Sp #91 BF @ 2 rpm = 55,600 cps BF @ 20 rpm = 7,740 cps pH = 10.05 Cond. = 2.75 mS/cm | Sp #91 BF @ 2 rpm = 61,600 cps BF @ 20 rpm = 7,670 cps pH = 9.88 Cond. = 2.88 mS/cm |
| Formula E @ 52.1% Solids Description: Formula C via Cowles Disperser but no Poly-DADMAC was used | Sp #91 BF @ 2 rpm = 13,200 cps BF @ 20 rpm = 3,480 cps pH = 9.79 Cond. = 2.38 mS/cm | Sp #91 BF @ 2 rpm = 55,800 cps BF @ 20 rpm = 10,820 cps pH = 9.71 Cond. = 2.41 mS/cm | Sp #92 BF @ 2 rpm = 74,200 cps BF @ 20 rpm = 14,580 cps pH = 9.55 Cond. = 2.41 mS/cm | Sp #92 BF @ 2 rpm = 107,600 cps BF @ 20 rpm = 17,680 cps pH = 9.46 Cond. = 2.35 mS/cm |
| Formula F @ 54.2% Solids Description: Commercial Talc based Pellet Lube; Tradename = Pellet Lube F3 | Sp #91 BF @ 2 rpm = 13,000 cps BF @ 20 rpm = 3,330 cps pH = 10.25 Cond. = 4.84 mS/cm | Sp #91 BF @ 2 rpm = 58,200 cps BF @ 20 rpm = 8,270 cps pH = 10.32 Cond. = 5.21 mS/cm | Sp #92 BF @ 2 rpm = 70,700 cps BF @ 20 rpm = 9,540 cps pH = 10.22 Cond. = 5.44 mS/cm | Sp #92 BF @ 2 rpm = 90,600 cps BF @ 20 rpm = 10,860 cps pH = 10.12 Cond. = 5.33 mS/cm |

Notes:
[a]Test batches were all aged at room temperature (20-25° C.). Properties were all determined at 25° C. Brookfield Viscosities were measured using a Brookfield RVDVE Heliopath Viscometer Unit equipped with T-spindles run at 2 rpm and then 20 rpm; T-spindles A (#91) & B (#92) were used as required.
[b]% Solids values were determined by the use of a halogen lamp based AND Model MF-50 Moisture Balance using a temperature setting of 150° C.
[c]All pH values were determined at 25° C. using an Oakton pH 450 meter. Conductivity values were determined at 25° C. using an Oakton CON 700 conductivity/TDS meter.

Batch Formulas C and D in Table V are identical in composition to Formulas A and B, respectively, as described above in Example 1 except the total batch size has now been reduced to a 5,300 gram lab scale. Formulas C and D will serve as comparative lab controls in this example. The composition of batch Formula E is based on Formula C except the PolyDADMAC polymer addition was intentionally left out in order to illustrate the differences in the resultant properties and performance without the cationic polymer being employed. All other ingredient amounts remained unchanged versus Formula C.

Batch Formula F is based on the commercial recipe for Pellet Lube F3 which is a conventional anti-tack for coating overall method of making Formulas C, D and E was analogous to the stepwise pigment addition scheme previously outlined in Process Scheme 1 (Table III) wherein the nonionic surfactants and anionic soaps are intermittently incorporated to keep the batch fluid and well mixed during the course of the slurry dispersion process.

Batch Formulas C, D, E and F were fully characterized and their respective physical properties were then rechecked over a period of 2 weeks. The physical properties tracked over the 2 week aging period are summarized in Table V. Properties that were monitored include Brookfield Viscosity values determined at 2 rpm and 20 rpm, pH and Conductivity. All four batches had a solids content greater than 50% and yielded an initial Brookfield 2 rpm viscosity between 10,000-20,000 cps. All the talc-based formulations were therefore stable with respect to showing no pigment settling and showing no observed syneresis during the 2 week aging period. After aging for 2 weeks at room temperature (20-25° C.) all four batches had a 2 rpm Brookfield Viscosity less than 150,000 cps and also had a 20 rpm Brookfield Viscosity less than 20,000 cps. Their aged Brookfield Viscosity values are acceptable and are indicative of formulations that can be readily pumped from totes or other shipping containers using a positive displacement type pump such as an air diaphragm pump, a rotary lobe pump, a progressive cavity pump or the like. Such positive displacement type pumps have the ability to overcome the aged product's rheological yield point so as to transform it into a pumpable fluid. At 20 rpm, the dynamic viscosity of the formulation is being measured in its flowable state whereas the viscosity reading at 2 rpm is one where the product is being measured in its non-flowing "static" gel state.

In Table VI, the dip performance properties of Formulas C, D, E and F are critically compared whereby each formula was transformed via dilution with water into slab dip slurries of 4% solids content for end use application testing.

TABLE VI

Slab Dip Performance Testing of Talc Based Anti-Tacks at 4% Dip Slurry Solids

| Formula ID | Talc Formula C | Talc Formula D | Talc Formula E | Talc Formula F |
|---|---|---|---|---|
| Product Description | Talc based Anti-Tack via Cowles Disperser | Talc based Anti-Tack via Dual-Shaft Disperser | Formula C via Cowles Disperser but no PolyDADMAC | Pellet Lube F3 (talc Based pellet lube) |
| Foam Properties for Dip Slurries[1] | | | | |
| Initial Foam Height, mm | 83 | 79 | 113 | 93 |
| Foam Height after 1 min., mm | 32 | 6 | 70 | 35 |
| Foam Height after 2 min., mm | 18 | 5 | 49 | 31 |
| Foam Height after 5 min., mm | 13 | 2 | 21 | 26 |
| Foam Height after 10 min., mm | 5 | 0 | 19 | 16 |
| Wet Sedimentation Properties for Dip Slurries[2] | | | | |
| RSV after 6 Hrs., cm$^3$ | 44 | 240 | 19 | 22 |
| RSV after 24 Hrs., cm$^3$ | 50 | 186 | 31 | 25 |
| Wet Sediment Characteristics | Soft Sediment - moderate mixing needed to re-suspend | Very Fluffy Sediment - minimal agitation needed to re-suspend | Hard Packed & Gummy Sediment - difficult to re-suspend; required high speed mixing | Hard Packed & Gummy Sediment - difficult to re-suspend; required high speed mixing |
| Anti-Tack Coating Properties on Uncured Rubber | | | | |
| Rubber Coating Coverage | Uniform Opaque Coating | Heavy Opaque Coating with Flocculated Appearance | Splotchy Non-Uniform Coating | Splotchy & Streaky Coating; Uncoated Spots |
| Anti-Tack Performance[3] Rating (0 → 6) | 4 (Good) | 5 (Very Good) | 2 (Fair) | 1 (Poor) |

Note:
[1]Talc Formulations were transformed into 4% solids slab dip slurries via dilution with deionized water then 700 ml of the resultant slab dip slurry was transferred to a 1 liter graduated glass cylinder whose top can be sealed by a ground glass stopper. Upon filling the glass cylinder, it was stoppered and then inverted upside down 10 times in rapid succession (each inversion cycle taking about 2 seconds). After sitting the cylinder down the initial foam height above the 700 ml mark was recorded and the slab dip slurry was then allowed to sit undisturbed. The foam level was then monitored and measured over specific time internals up to a total time of 10 minutes.
[2]Talc Formulations were transformed into 4% solids slab dip slurries via dilution with deionized water then 1,000 ml of the resultant slab dip slurry was transferred to a 1 liter graduated glass cylinder whose top can be sealed by a ground glass stopper. Upon filling the glass cylinder, it was stoppered and then allowed to stand undisturbed. Pigment sedimentation in the slab dip slurries was monitored over time and measurement levels in the cylinder were noted in cm$^3$ and recorded after 6 hours and then again after 24 hours. The dip slurry of Formula D settled in a
different manner than the other three. The dip slurry of Formula D quickly settled into a voluminous fluffy suspension that gradually compacted down over time. In contrast, the other dip slurries yielded more compact sediments that increased in total volume over time as more material settled out.
[3]Anti-Tack coating performance was qualitatively assessed on the following rating scale:
Rating   Rating Description
0   Fail = Rubber test slabs completely stuck together; unable to separate.
1   Poor = Rubber test slabs were stuck in multiple areas; difficult to separate
2   Fair = Rubber test slabs were moderately adhered to each other but could be separated with a moderate level of applied pull force

TABLE VI-continued

Slab Dip Performance Testing of Talc Based Anti-Tacks at 4% Dip Slurry Solids

| | |
|---|---|
| 3 | Acceptable = Rubber test slabs were lightly adhered but they could be separated with a minimal level of applied pull force |
| 4 | Good = Slabs not adhered; only minor tack in small areas of contact was detected |
| 5 | Very Good = Slabs not adhered; almost negligible tack in single small area of contact was detected |
| 6 | Excellent = Absolutely no adherence/tack between the rubber slabs. |

Three different types of dip slurry performance properties are being assessed in this example and the results for each are summarized in Table VI. The first dip slurry performance property assessed was the foam performance of the 4% solids dip slurries. Initial foam heights were determined and then the subsequent foam heights after time intervals of 1 minute, 2 minutes, 5 minutes and 10 minutes were respectively determined. Details associated with the foam testing methodology are summarized in the footnote section of Table VI. A review of the foam test data indicates that the slab dip slurries derived from the talc formulas containing PolyDADMAC cationic polymer, namely Formulas C and D, yielded less initial foam. In addition, their dip slurry foam was less stable so it subsequently died off more quickly and to a lower level than what was observed with the 4% dip slurries derived from either Formula E or F. Lower levels of dip foam are always desired in rubber slab dip applications. Foam is not only a housekeeping issue but dried clumps of foam on the surface of uncured rubber compounds can entrap moisture underneath, which can subsequently result in the formation of blisters during the compound's molding process.

Figure 2:
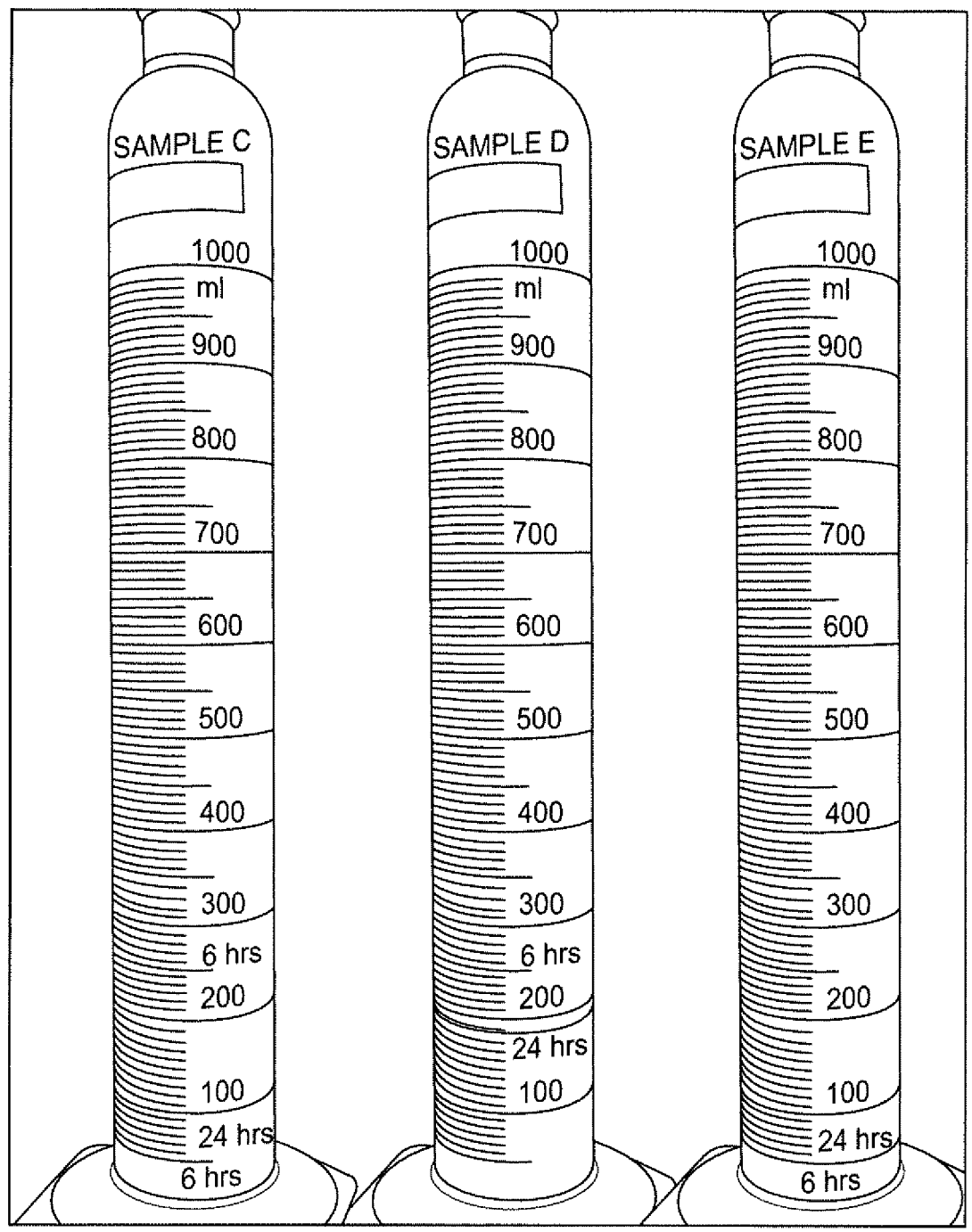
FIG. 2 is a photograph of three 1 liter sedimentation cylinders for different talc-based anti-tack formulations showing their relative sedimentation volumes.

The second dip performance property assessed was the pigment settling characteristics of the 4% solids dip slurries. The 4% solids dip slurries were allowed to statically settle over a 24 hour time period in a 1 liter glass graduated cylinder and their relative sediment volumes (RSV) were then measured after 6 hours and 24 hours. Details associated with this sedimentation testing methodology are summarized in the footnote section of Table VI. The importance and significance of RSV as it relates to particle agglomeration and subsequent imperfect particle packing has been previously discussed in the invention summary and the concept is also explained in U.S. Pat. No. 6,156,117. Once again, the talc formulas containing PolyDADMAC cationic polymer, namely Formulas C and D, resulted in 4% solids dip slurries that yielded far more voluminous wet sediments as a consequence of the Talc platelets being flocculated into loosely bound agglomerates having inter-particle void spaces. As seen in Table VI, their relative sediment volumes after either 6 hours or 24 hours were notably greater than those produced from the 4% solids dip slurries derived from Formulas E and F where no PolyDADMAC was employed. These differences in RSV value between the 4% solids dip slurries derived from Formulas C, D and E are visually evident in FIG. 2. It is also interesting to note that Formula D yielded a significantly higher RSV than Formula C even though the active basis dosage level of PolyDADMAC employed in the two formulas was the same (0.09% by weight of the total formulation). In FIG. 1, these same anti-tack formulas made on a production scale (Formulas A and B, respectively) had indicated that the increase in their particle size distributions versus the 4:1 w/w blend of starting 3 micron mps and 1 micron mps talc pigments was roughly the same. Both anti-tack formulas showed about a 25% increase in median particle size based on measurements made with a Horiba LA-300 laser light scattering particle size analyzer.

While the notable difference in RSV between Formulas C and D is not fully understood, it is believed that the difference is likely a consequence of the higher nonionic surfactant and anionic alkali metal fatty acid soap levels employed in Formula C. The higher concentration of nonionic surfactants and anionic soaps being used in Formula C likely wets the talc particles more completely allowing them to compact down to a greater degree. Greater compaction of the wetted talc platelets would therefore result in a lower RSV value being measured. Even though this argument suggests that nonionic surfactant and anionic soap levels can have some impact on the RSV value, the comparative examination of the dip slurries derived from Formulas C versus E clearly indicates the sediment bulking effect that results from adding the PolyDADMAC polymer. Formula E is compositionally identical to Formula C with the exception that no PolyDADMAC was utilized in the E formulation. The 24 hour RSV value of Formula E's 4% solids dip slurry was 31 $cm^3$ whereas the 4% solids dip slurry of Formula C yielded a 24 hour RSV value of 50 $cm^3$. This notable difference equates to a 61% increase in RSV by simply using a PolyDADMAC active basis dosage of only 0.09% by weight of the total formulation. Lastly, it should be noted that the higher RSV values associated with Formulas C and D have resulted in wet talc sediments that are soft or fluffy hence they are easy to re-suspend with minimal to moderate levels of agitation. In contrast, the wet sediments associated with the 4% solids dip slurries of Formulas E and F are gummy and hard packed hence they are a lot more difficult to re-suspend. The consistency of these wet sediments was assessed by probing the bottom of the storage flasks with a plastic spatula. Having an effective dip slurry product that does not hard pack settle is definitely desirable. Also, hard pack settling of talc dominated anti-tack formulations has historically been a major limitation that is now overcome by the current invention through the employment of a cationic polymer such as PolyDADMAC.

The third dip performance property assessed in Example 2 was the anti-tack coating properties of the slab dip formulations on an uncured rubber compound. Once again, 4% solids slab dip slurries derived from Formulas C, D, E and F were employed. The uncured rubber compound utilized in the dip coating application study was a typical passenger tire sidewall compound that employs a NR/BR/EPDM polymer blend. Uncured rubber compound was refreshed on a 2-roll mill and then calendared off into a sheet that was approximately 0.125 inches in thickness. This rubber sheet was then cut into rectangular test pieces that were approximately 4 inches long×1.5 inches wide×0.125 inches thick. The 4% solids dip slurries derived from Formulas C, D, E and F were subsequently heated to 110° F. in a microwave oven and kept continuously stirred for dip coating use. The uncured rubber test pieces were individually placed in a Quincy Labs 20GC gravity convection lab oven, whose temperature thermostat was set at 375° F., and then heated for about 2 minutes in order to raise their surface temperature to about 225-230° F. as measured with a digital laser IR Temperature gun (FLUKE Model 62 Max Plus). An oven-heated test piece of uncured rubber was then dipped into the stirred 4% dip slurry whose slurry temperature was being maintained at about 108-110° F. Total immersion time of the rubber test piece was about 5 seconds. The wetted test piece of rubber was then air dried using ambient temperature blown air (from a nearby fan) to yield a coated rubber specimen for anti-tack performance assessment. A pair of rubber test pieces was dip coated for each of the 4% solids dip slurries. The resultant coating coverage results are summarized in Table VI and FIG. 3 shows representative examples of the coated rubber specimens after drying. The dip coating results indicate that the 4% solids dip slurries derived from Formulas C and D yield more uniform, opaque coatings on the rubber test pieces of heavier coat weight. In comparison, the dip coatings associated with using the 4% solids dip slurries derived from Formulas E and F were not uniform and they were very splotchy in appearance. After a pair of coated rubber specimens was generated, the pair was placed in aligned face-to-face contact with one another and then placed between a set of polished stainless steel plates whereupon a 20 lbs. certified weight was placed on top of the plates for a period of 24 hours under ambient room temperature (20-25° C.) conditions. After the 24 hour contact period, the 20 lbs. weight and stainless steel plates were removed and then the pair of coated rubber specimens which had been compressed together in intimate contact was assessed for their degree of adherence to one another. Anti-tack performance was then qualitatively assessed on the basis of the following rating scale:

| Rating | Rating Description |
| --- | --- |
| 0 | Fail = Rubber test slabs completely stuck together; unable to separate. |
| 1 | Poor = Rubber test slabs were stuck in multiple areas; difficult to separate |
| 2 | Fair = Rubber test slabs were moderately adhered to each other but could be separated with a moderate level of applied pull force |
| 3 | Acceptable = Rubber test slabs were lightly adhered but they could be separated with a minimal level of applied pull force |
| 4 | Good = Slabs not adhered; only minor tack in small areas of contact was detected |
| 5 | Very Good = Slabs not adhered; almost negligible tack in single small area of contact was detected |
| 6 | Excellent = Absolutely no adherence/tack between the rubber slabs. |

The anti-tack performance ratings for the 4% solids dip slurries derived from Formulas C, D, E and F are summarized in Table VI. The 4% solids dip slurries derived from Formulas C and D both yielded "Good" to "Very Good" anti-tack coating performance as a consequence of employing some PolyDADMAC polymer. In contrast, the 4% solids dip slurries derived from Formulas E and F, which contain no PolyDADMAC polymer, yielded only Fair to Poor anti-tack coating performance. The significant difference in anti-tack coating performance between the 4% solids dip slurries derived from Formulas C and E clearly demonstrates the benefit of adding a low dosage level of PolyDADMAC polymer to the talc-based anti-tack formulation. Formula E is compositionally identical to Formula C with the exception that no PolyDADMAC was utilized in the E formulation. The significant improvement in dip coating coverage and anti-tack performance on uncured rubber compounds associated with employing low dosage levels of PolyDADMAC cationic polymer in the inventive talc-based dip slurry formulations, per the 4% solids dip slurries of Formulas of C and D, are remarkable and truly unexpected.

Example 3

This Example is analogous to Example 2 in scope and in dip slurry testing protocol except that four new anti-tack formulations were produced on a laboratory bench scale for testing. Formulations G, H, I and J of Table VII are all compositionally related to Formula C of Example 2.

Compositionally anti-tack Formulas G, H, I, and J are identical to anti-tack Formula C except that a portion of the 3 micron mps talc content has been replaced by another anti-block pigment (namely with calcium stearate, calcium carbonate, calcined kaolin clay and phlogopite mica, respectively). In each case, 26.67% by weight of the active basis 3 micron mps talc content present in Formula C has been replaced in producing this new set of anti-tack formulas. In these new formulations, this means that about 21.3% by weight of the total dry basis talc content, the total being the combined amount of 3 micron mps talc plus 1 micron mps talc, has been replaced with the aforementioned alternative anti-block pigments. However, since the partial talc replacement strategy with alternative anti-blocks selectively replaced just 3 micron mps talc this means the active basis weight ratio of 3 micron mps talc to 1 micron mps talc in the formulas has been reduced from its original 4:1 w/w ratio to about a 2.91:1 w/w ratio. In terms of overall formulation weight %'s, the 3 micron mps talc (SAS-3) has therefore been reduced in formula weight % from 37.50% to 27.50%, the 1 micron mps talc (FlexTalc 610) remains the same at a formula weight % of 9.44%, while the alternative anti-block replacement pigment (calcium stearate, calcium carbonate, calcined kaolin clay or phlogopite mica) has increased in formula weight % from 0.00% to 10.00%. In these experiments, the larger 3 micron mps talc was chosen for selective replacement since some of the anti-block replacement pigments, namely the calcium stearate and the phlogopite mica, are larger in particle size and both have platy morphology. The Baerolub S-VSA-200 is a -200 mesh, fusion grade calcium stearate which typically has a Microtrac median particle size of about 16-20 microns whereas the Suzorite 325-S is a -325 mesh, phlogopite mica having a Cilas median particle size of about 35 microns and a Jennings aspect ratio of about 80.

All the new anti-tack formulas were produced on a 5,300 gram scale using a high speed, single-shaft lab disperser unit equipped with a Cowles cutting-style dispersion blade. The overall method of making Formulas G, H, I, and J was analogous to the stepwise pigment addition scheme previously outlined in Process Scheme 1 (Table III) wherein the nonionic surfactants and anionic alkali metal fatty acid soaps are intermittently incorporated to keep the batch fluid and well mixed during the course of the slurry dispersion process.

Batch Formulas G, H, I, and J were fully characterized and their respective physical properties were then tracked over a period of 2 weeks (as summarized in Table VII). Physical properties that were monitored include Brookfield Viscosity values determined at 2 rpm and 20 rpm, pH and Conductivity. All four batches had % solids contents greater than 50% and all yielded an initial Brookfield 2 rpm viscosity between 10,000-20,000 cps. All the formulas showed no evidence of pigment settling and no observed syneresis during their 2 week aging period. After aging for 2 weeks at room temperature (20-25° C.), all four formulas had a 2 rpm Brookfield Viscosity less than 150,000 cps and also had a 20 rpm Brookfield Viscosity less than 20,000 cps. In short, these anti-tack formulations are all viable to be manufactured, stored, transported and pumped.

mps=2 microns) as a partial replacement for the 3 micron mps talc, exhibited a somewhat higher level of foam. Reducing Formula H's foam level can likely be addressed by decreasing the amounts of nonionic surfactant and alkali metal fatty acid soap being employed in that particular formulation or by using nonionic surfactants in the same chemical family having a slightly lower HLB that will be inherently less foamy. Furthermore, it should be noted that the wet sediments arising from the dip slurries of Formula's G through J were in general more packed and gummy than those originating from the dip slurries of Formulas C and D. Once again, this can likely be addressed by reducing the amounts of nonionic surfactant and anionic soap being

TABLE VII

Physical Property Tracking Data[a] for Lab Anti-Tack Formulations G, H, I & J:

| Anti-Tack Formula (% Solids[b] & Description) | Initial BF Viscosity, pH & Conductivity[c] | Aged BF Visc., pH & Cond. after Aging 3 Days | Aged BF Visc., pH & Cond. after Aging 7 Days | Aged BF Visc., pH & Cond. after Aging 14 Days |
|---|---|---|---|---|
| Formula G @ 52.0% Solids Description: Formula C via Cowles but 26.67% Repl. of 3 micron Talc with BaeroLub VSA-200 Ca Stearate | Sp #91 BF @ 2 rpm = 19,500 cps BF @ 20 rpm = 4,860 cps pH = 9.80 Cond. = 2.28 mS/cm | Sp #91 BF @ 2 rpm = 57,400 cps BF @ 20 rpm = 10,260 cps pH = 9.87 Cond. = 2.51 mS/cm | Sp #92 BF @ 2 rpm = 71,200 cps BF @ 20 rpm = 11,580 cps pH = 9.55 Cond. = 2.41 mS/cm | Sp #92 BF @ 2 rpm = 86,800 cps BF @ 20 rpm = 13,420 cps pH = 9.60 Cond. = 2.06 mS/cm |
| Formula H @ 52.15% Solids Description: Formula C via Cowles but 26.67% Repl. of 3 micron Talc with HuberCarb G2 CaCO$_3$ | Sp #91 BF @ 2 rpm = 14,600 cps BF @ 20 rpm = 3,350 cps pH = 9.94 Cond. = 3.17 mS/cm | Sp #91 BF @ 2 rpm = 29,600 cps BF @ 20 rpm = 5,770 cps pH = 9.85 Cond. = 3.21 mS/cm | Sp #91 BF @ 2 rpm = 36,000 cps BF @ 20 rpm = 6,810 cps pH = 9.76 Cond. = 3.25 mS/cm | Sp #91 BF @ 2 rpm = 45,000 cps BF @ 20 rpm = 7,600 cps pH = 9.61 Cond. = 3.30 mS/cm |
| Formula I @ 52.35% Solids Description: Formula C via Cowles but 26.67% Repl. of 3 micron Talc with Iceberg Calcined Kaolin | Sp #91 BF @ 2 rpm = 16,500 cps BF @ 20 rpm = 4,150 cps pH = 9.49 Cond. = 2.52 mS/cm | Sp #91 BF @ 2 rpm = 54,400 cps BF @ 20 rpm = 10,060 cps pH = 9.63 Cond. = 2.76 mS/cm | Sp #92 BF @ 2 rpm = 68,800 cps BF @ 20 rpm = 12,160 cps pH = 9.42 Cond. = 2.74 mS/cm | Sp #92 BF @ 2 rpm = 91,600 cps BF @ 20 rpm = 15,240 cps pH = 9.28 Cond. = 2.69 mS/cm |
| Formula J @ 52.75% Solids Description: Formula C via Cowles but 26.67% Repl. of 3 micron Talc with Suzorite 325-S Mica | Sp #91 BF @ 2 rpm = 18,300 cps BF @ 20 rpm = 4,710 cps pH = 9.73 Cond. = 2.39 mS/cm | Sp #91 BF @ 2 rpm = 71,000 cps BF @ 20 rpm = 12,680 cps pH = 9.64 Cond. = 2.58 mS/cm | Sp #92 BF @ 2 rpm = 85,000 cps BF @ 20 rpm = 14,540 cps pH = 9.53 Cond. = 2.53 mS/cm | Sp #92 BF @ 2 rpm = 108,000 cps BF @ 20 rpm = 17,460 cps pH = 9.41 Cond. = 2.52 mS/cm |

Notes:
[a] Test batches were all aged at room temperature (20-25° C.). Properties were all determined at 25° C. Brookfield Viscosities were measured using a Brookfield RVDVE Heliopath Viscometer Unit equipped with T-spindles run at 2 rpm and then 20 rpm; T-spindles A (#91) & B (#92) were used as required.
[b] % Solids values were determined by the use of a halogen lamp based AND Model MF-50 Moisture Balance using a temperature setting of 150° C.
[c] All pH values were determined at 25° C. using an Oakton pH 450 meter. Conductivity values were determined at 25° C. using an Oakton CON 700 conductivity/TDS meter.

In Table VIII below, the dip slurry performance properties of Formulas G, H, I, and J are critically compared whereby each anti-tack formula was transformed via dilution with water into slab dip slurries of 4% solids content for end use application testing. Three different types of dip performance properties were again assessed using all the same testing protocols previously outlined and discussed in Example 2. The testing results are summarized in Table VIII. All the anti-tack formulas, with the exception of Formula H, yielded comparable amounts of dip slurry foam to the 4% solids dip slurries previously derived from Formulas C and D. However, Formula H, which utilized some fine particle ground calcium carbonate (HuberCarb G2; reported Sedigraph employed and/or by increasing the amount of PolyDADMAC polymer that is utilized to increase the overall amount of mineral particle flocculation that is created. It is not too surprising that partial replacement of the 3 micron talc pigmentation with other alternative anti-block pigments would require some tweaking of the nonionic surfactant, anionic soap and cationic polymer package amounts to optimize the new formula's dip slurry properties since the replacement pigments have different surface chemistries, different surface charge properties and different surface areas. With regards to the wet sediment volumes, the higher RSV value associated with the dip slurry derived from Formula I may seem to be an anomaly in light of its packed, gummy sediment but this situation can be easily explained on the basis of the structured pigment morphology of calcined kaolin clays. It is known in the prior art that kaolin platelets are fused together into structured aggregates during the high temperature calcination process such that calcined clays inherently provide more bulking properties. The calcined kaolin clay used in Formula I was a conventional paint and coatings grade calcined kaolin (Burgess Pigment Company's Iceberg) which has a reported Sedigraph median particle size of about 1.3 microns.

What is more critical in this initial formulation screening of other anti-blocks as partial replacements for the 3 micron mps talc pigmentation is the coating coverage and resultant anti-tack performance properties on uncured rubber compounds. All the 4% solids dip slurries yielded a uniform, opaque coating on the uncured rubber compound. The 4% solids slab dip slurries derived from Formulas G and J were in particular "Very Good" anti-tacks as judged on the basis of our anti-tack performance rating criteria. This example clearly demonstrates that very functional anti-tacks can be formulated whereby a portion of the 3 micron mps talc can be effectively replaced by other anti-block pigments in replacement amounts up to about 25-30% by weight. Particularly effective anti-block pigments, as demonstrated in this example, are those having platelet morphology such as fusion grade calcium stearate pigments and mica pigments. Consequently, high aspect ratio delaminated kaolin clays may also be particularly effective anti-block candidate given their platy morphology and associated aspect ratio that can be similar in magnitude to the aspect ratio of fine particle talcs. For one skilled in the art the desired improvements in dip slurry foam and in pigment suspension for the 4% solids dips of Formulas G and J can be realized through adjusting the relative amounts of nonionic surfactants, anionic alkali metal fatty acid soaps, defoamer and PolyDADMAC cationic polymer used in the formulation. While the costs associated with calcium stearate pigments and mica pigments are typically more than for a fine particle, dry ground talc the additional raw material cost associated with partially replacing a portion of the talc may be warranted based on final cost versus performance considerations.

TABLE VIII

| | Slab Dip Performance Testing of Talc Based Anti-Tacks at 4% Dip Slurry Solids | | | |
|---|---|---|---|---|
| Formula ID | Talc Formula G | Talc Formula H | Talc Formula I | Talc Formula J |
| Product Description | Formula C but 26.67% Repl. of 3 micron Talc with BaeroLub VSA-200 Calcium Stearate | Formula C but 26.67% Repl. of 3 micron Talc with HuberCarb G2 $CaCO_3$ | Formula C but 26.67% Repl. of 3 micron Talc with Iceberg Calcined Kaolin Clay | Formula C but 26.67% Repl. of 3 micron Talc with Suzorite 325-S Mica |
| | Foam Properties for Dip Slurries[1] | | | |
| Initial Foam Height, mm | 43 | 126 | 88 | 78 |
| Foam Height after 1 min., mm | 31 | 104 | 63 | 47 |
| Foam Height after 2 min., mm | 30 | 99 | 29 | 29 |
| Foam Height after 5 min., mm | 23 | 65 | 20 | 18 |
| Foam Height after 10 min., mm | 19 | 32 | 18 | 7 |
| | Wet Sedimentation Properties for Dip Slurries[2] | | | |
| RSV after 6 Hrs., $cm^3$ | 17 | 6 | 67 | 33 |
| RSV after 24 Hrs., $cm^3$ | 28 | 14 | 67 | 50 |
| Wet Sediment Characteristics | Hard Packed & Gummy Sediment - difficult to re-suspend; required high speed mixing | Hard Packed & Gummy Sediment - difficult to re-suspend; required high speed mixing | Hard Packed & Gummy Sediment - difficult to re-suspend; required high speed mixing | Soft Sediment - moderate mixing needed to re-suspend |
| | Anti-Tack Coating Properties on Uncured Rubber | | | |
| Rubber Coating Coverage | Uniform Opaque Coating | Uniform Opaque Coating | Uniform Opaque Coating | Uniform Opaque Coating |
| Anti-Tack Performance[3] Rating (0 → 6) | 5 | 3 | 4 | 5 |

Note:
[1]Talc Formulas were transformed into 4% solids dip slurries via dilution with deionized water then 700 ml of the resultant dip slurry was transferred to a 1 liter graduated glass cylinder whose top can be sealed by a ground glass stopper. Upon filling the glass cylinder, it was stoppered and then inverted upside down 10 times in rapid succession (each inversion cycle taking about 2 seconds). After sitting the cylinder down the initial foam height above the 700 ml mark was recorded and the slab dip slurry was then allowed to sit undisturbed. The foam level was then monitored and measured over specific time internals up to a total time of 10 minutes.
[2]Talc Formulas were transformed into 4% solids slab dip slurries via dilution with deionized water then 1,000 ml of the resultant slab dip slurry was transferred to a 1 liter graduated glass cylinder whose top can be sealed by a ground glass stopper. Upon filling the glass cylinder, it was stoppered and then allowed to stand undisturbed. Pigment sedimentation in the slab dip slurries was monitored over time and measurement levels in the cylinder were noted in $cm^3$ and recorded after 6 hours and then again after 24 hours. The dip slurry of Formula I settled in a different manner than the other three. The 4% solids dip slurry of Formula I completely settled within 6 hours and no further changes in RSV value were noted beyond that timeframe. In contrast, the other dip slurries yielded TABLE VIII-continued Slab Dip Performance Testing of Talc Based Anti-Tacks at 4% Dip Slurry Solids more compact sediments that increased in total volume over time as more material settled out.
[3]Anti-Tack coating performance was qualitatively assessed on the following rating scale:

| Rating | Rating Description |
|---|---|
| 0 | Fail = Rubber test slabs completely stuck together; unable to separate. |
| 1 | Poor = Rubber test slabs were stuck in multiple areas; difficult to separate |
| 2 | Fair = Rubber test slabs were moderately adhered to each other but could be separated with a moderate level of applied pull force |
| 3 | Acceptable = Rubber test slabs were lightly adhered but they could be separated with a minimal level of applied pull force |
| 4 | Good = Slabs not adhered; only minor tack in small areas of contact was detected |
| 5 | Very Good = slabs not adhered; almost negligible tack in single small area of contact was detected |
| 6 | Excellent = Absolutely no adherence/tack between the rubber slabs. |

Example 4

This anti-tack formulation experiment was carried out as follow-up work to Formula J in Example 3 and it is analogous in testing scope to Example 3. However, in this example, the weight % amounts of Valpro 59 soap and Ethal TDA-5 nonionic surfactant being used in new Formula K were notably reduced to demonstrate the effect that anionic soap plus nonionic surfactant levels can collectively have on resultant dip slurry foam and RSV wet sedimentation properties. However, the weight % amount of PolyDADMAC cationic polymer being employed in Formulas J versus K was kept constant. Like Formula J, new Formula K is a talc plus mica combination of anti-block pigments whereby the relative active basis weight ratio of the total combined talc pigments to 35 micron mica is about 3.7:1. The talc portion of the formula's anti-block pigmentation consists of 3 micron mps talc plus 1 micron mps talc in about a 2.91:1 relative active basis weight ratio. The full compositional details on Formula K are summarized in Table IX.

TABLE IX

Compositional Summary for Anti-Tack Talc/Mica Formulation K

| | | | | Talc/Mica Anti-Tack Formula K[c] Method: Dual Shaft High-Speed Disperser | |
|---|---|---|---|---|---|
| Chemical | | Properties & | | | |
| Tradename/ Supplier | Chemical Name | Functionality of Ingredient | CAS # | Wt. in Lab Batch, g | Wt. % in Formula |
| Soft Water | Dihydrogen Oxide | Solvent Phase | 7732-18-5 | 2581.18 | 48.70% |
| Talc SAS-3/ Cimbar Performance Minerals | Talc; Magnesium Silicate Hydrate | Anti-Block Pigment (3 micron median p.s.)[a] | 14807-96-6 | 1457.50 | 27.50% |
| FlexTalc 610/ Cimbar Performance Minerals | Talc; Magnesium Silicate Hydrate | Anti-Block Pigment (1 micron median p.s.)[a] | 14807-96-6 | 500.56 | 9.44% |
| Suzorite 325S Mica/Imerys | Phlogopite Mica | Anti-Block Pigment (35 micron median p.s.)[a] | 12001-26-2 | 530.00 | 10.00% |
| Ethal TDA-5/ Ethox Chemicals | PEG-5 Tridecyl Ether; Trideceth-5 | Interfacial Wetting (pigment & rubber); Nonionic Surfactant with HLB = 10.4 | 24938-91-8 | 53.29 | 1.01% |
| Norfox 92/ Norman, Fox & Co. | Sodium Tallowate Soap | Interfacial Wetting (pigment & rubber) | 8052-48-0 | 57.42 | 1.08% |
| ValPro 59/ Vanguard Soap | Blend of Sodium Vegate + Sodium Cocoate Soaps | Interfacial Wetting (pigment & rubber) | 68082-64-4 & 61789-31-9 | 19.43 | 0.37% |
| Konasil 200/ OCI | 200 m$^2$/g Fumed Silica; Synthetic Amorphous Silicon Dioxide | Pigment Suspension, Foam Control & Anti-Block | 7631-86-9 | 31.80 | 0.60% |
| DEE FO 3010A/ Munzing Chemie | Petroleum distillates, blend of light & heavy paraffinic oils | Oil based Defoamer | 64742-56-9 & 64742-65-0 | 15.90 | 0.30% |
| Xanthan Gum/ Global Ingredients | Xanthan Gum; Polysaccharide | Pigment Suspension Aide | 11138-66-2 | 13.78 | 0.26% |

TABLE IX-continued

Compositional Summary for Anti-Tack Talc/Mica Formulation K

| Chemical Tradename/ Supplier | Chemical Name | Properties & Functionality of Ingredient | CAS # | Talc/Mica Anti-Tack Formula K[c] Method: Dual Shaft High-Speed Disperser Wt. in Lab Batch, g | Wt. % in Formula |
|---|---|---|---|---|---|
| n-Butyl Stearate/ Custom Synthesis, LLC | n-Butyl Stearate | Pigment Wetting & Defoamer | 123-95-5 | 10.60 | 0.20% |
| PhosFlex 4/ICL Industrial Products | Tri-n-butyl Phosphate | Defoamer | 126-73-8 | 10.60 | 0.20% |
| Pangel W/Tolsa Group | Sepiolite; Hydrous Magnesium Silicate | Pigment Suspension Aide | 63800-37-3 | 5.30 | 0.10% |
| PDMBL Series/ Isomeric Industries | PolyDADMAC; Polydiallyldimethyl Ammonium Chloride (Mw = 493,000 Da)[b] | Water Soluble Cationic Polymer; Pigment Flocculating Agent | 26062-79-3 | 4.96 | 0.09% |
| BSC 3243/Bulk Chemical Services | Dazomet; Tetrahydro-3,5-dimethyl-2H-1,3,5-thiadiazine-2-thione | Biocide | 533-74-4 | 3.98 | 0.08% |
| BCS 3502A/ Bulk Chemical Services | Glutaraldehyde | Biocide | 111-30-8 | 3.18 | 0.06% |
| Surfynol 440/ Evonik | PEG-3.5 2,4,7,9-tetramethyl 5 decyn-4,7-diol | Interfacial Wetting (pigment & rubber); Nonionic Surfactant with HLB = 8.0 | 9014-85-1 | 0.53 | 0.01% |
| | | | Totals= | 5,300 g | 100.00% |

Notes:
[a]Median particle sizes of the Talc & Mica pigments were determined using a Cilas 990L Particle Size analyzer.
[b]The Mw of the cationic polymer was determined by Jordi Labs of Mansfield, MA using Tetra-Detection Gel Permeation Chromatography (GPC-T).
[c]The physical properties obtained for this batch are summarized in Table X.

Formula K was produced on a 5,300 gram lab scale using a dual-shaft lab disperser unit whereby the high speed shaft was equipped with a Cowles cutting-style dispersion blade. The overall methodology of making Formula K was analogous to the stepwise pigment addition scheme previously outlined in Process Scheme 1 wherein the nonionic surfactants and anionic alkali metal fatty acid soaps are intermittently incorporated to keep the batch fluid and well mixed during the course of the slurry dispersion process.

The batch for Formula K was fully characterized immediately after being produced and its physical properties were then retested after a 2 week aging period (data are summarized in Table X).

TABLE X

Physical Test Properties of Talc/Mica Anti-Tack Formulation K (from Table IX)

| | Initial QC Test Properties for Batch[1] | 2-Week Aged Test Properties for Batch[1] |
|---|---|---|
| pH @ 25° C. | 9.63 | 9.36 |
| Conductivity @ 25° C., mS/cm | 2.27 | 2.63 |
| BF Viscosity (Sp# 91 or 92 @ 2 rpm), cps | 19,800 | 100,200 |
| BF Viscosity (Sp# 91 or 92 @ 20 rpm), cps | 4,230 | 14,900 |
| Specific Gravity[2] @ 25° C., g/ml | 1.36 | — |
| Solids Content[3], Wt. % | 51.0 | — |

Notes:
[1]Test batch was aged at room temperature (20-25° C.). Properties were all determined at 25° C. The pH values were determined using an Oakton pH 450 meter. Conductivity values were determined using an Oakton CON 700 conductivity/TDS meter. The Brookfield Viscosities were measured using a Brookfield RVDVE Heliopath Viscometer Unit equipped with T-spindles run at 2 rpm and then 20 rpm; T-spindle A (#91) was employed for the initial BF readings while T-spindle B (#92) was employed for the BF readings on the 2-week aged batch.
[2]Specific gravity was determined using a 100 ml specific gravity cup in accordance with ASTM D1475.
[3]% Solids was determined by the use of a halogen lamp based AND Model MF-50 Moisture Balance using a temperature setting of 150° C.

Physical properties that were tested on Formula K include % solids content, specific gravity, its Brookfield Viscosity values determined at 2 rpm and 20 rpm, pH and conductivity. Formula K is a slurry concentrate that has a % solids content greater 50% and the batch yielded an initial Brookfield 2 rpm viscosity between 10,000-20,000 cps. It showed no evidence of pigment settling and no observed syneresis during its 2 week aging period. After aging for 2 weeks at room temperature (20-25° C.) Formula K yielded a 2 rpm Brookfield Viscosity less than 150,000 cps and also had a 20 rpm Brookfield Viscosity less than 20,000 cps. Formula K is therefore a high solids, talc plus mica anti-tack formulation that is viable to be manufactured, stored, transported and pumped.

The dip slurry performance properties of Formula K were then critically assessed whereby the slurry concentrate was transformed via dilution with water into a slab dip slurry of 4% solids content for end use application testing. Three different types of dip performance properties were again evaluated using all the same testing protocols previously outlined and discussed in Examples 2 and 3. The dip slurry testing results are summarized in Table XI.

TABLE XI

Slab Dip Testing of Talc/Mica Based Anti-Tack at 4% Dip Slurry Solids

| Formula ID | Talc/Mica Formula K |
|---|---|
| Product Description | Talc/Mica Anti-Tack Formula with Reduced %'s of V59 Soap & TDA-5 Surfactant |
| Foam Properties for Dip Slurry | |
| Initial Foam Height, mm | 28 |
| Foam Height after 1 min., mm | 0 |
| Foam Height after 2 min., mm | 0 |
| Foam Height after 5 min., mm | 6 |
| Foam Height after 10 min., mm | 0 |
| Wet Sedimentation Properties for Dip Slurry | |
| RSV after 6 Hrs., cm$^3$ | 122 |
| RSV after 24 Hrs., cm$^3$ | 75 |
| Wet Sediment Characteristics | Soft Sediment - moderate mixing needed to re-suspend |
| Anti-Tack Coating Properties on Uncured Rubber | |
| Rubber Coating Coverage | Uniform Opaque Coating |
| Anti-Tack Performance Rating (0 → 6) | 4 |

When comparing the dip slurry foam results for Formula K versus Formula J the level of initial foam height has been significantly reduced (from 78 mm to 28 mm). Furthermore, for Formula K the initial dip foam level that was created was not stable and it completely died off very quickly in less than 1 minute. The dip slurry foam associated with Formula J also died off albeit more slowly and not to the same extent. These foaming differences indicate a significant improvement in dip slurry foam control by reducing the amounts of nonionic alkali metal fatty acid soap and nonionic surfactant that is employed in Formula K. However, the overall levels of anionic alkali metal fatty acid soap and nonionic surfactant therein were still sufficient to yield an effective anti-tack dip coating on an uncured elastomeric compound. Furthermore, reducing the amounts of anionic alkali metal fatty acid soap and nonionic surfactant employed in the anti-tack formulation had a positive effect on increasing the RSV value of its resultant wet sediment after the 4% solids dip slurry was allowed to stand undisturbed for 24 hours. This improvement in soft wet sediment volume is seen by comparing the 24 hour RSV values associated with Formula J (50 cm$^3$; Table VIII) versus the 24 hour RSV associated with Formula K (75 cm$^3$; Table XI). Increasing the soft wet sediment volume is desirable as it minimizes the potential for hard packing of the mineral pigmentation in the dip slurry tanks and lines when dip systems are shut-down for maintenance reasons or over holidays. Example 4 further illustrates within the scope of the invention that overall dip slurry performance properties (foam, RSV, coating coverage and anti-tack effectiveness) can be readily altered as desired through adjusting the relative amounts of nonionic surfactants, anionic alkali metal fatty acid soaps, defoamer, and PolyDADMAC cationic polymer that are being used in the anti-tack formulation.

Additional experiments were conducted to demonstrate other advantageous effects of the high solids content dispersion invention and, in particular, when this dispersion is subsequently diluted to low solids contents for slab dip application use. The examples also illustrate how various key parameters associated with the dispersions affect resultant particle agglomeration, how the degree of particle aggregation can be defined and demonstrate the correlation between the degree of particle aggregation and resultant anti-tack coating performance properties when the dispersions are subsequently diluted for slab dip application use. More particularly, Example 5 demonstrates the following:

a) improved anti-tack performance and dip slurry properties when the dispersion includes a cationic polymer that yields an effective level of talc micro-flocculation;

b) improved anti-tack performance for the high solids inventive dispersion when subsequently diluted to produce a slab dip slurry having a solids content of 4% as compared to similar dispersions that are initially made up at lower solids content levels and diluted, e.g., original 15% or 10% solids dispersions diluted to 4% or to a dispersion made up directly at 4% solids that is utilized in its original form for slab dip application use.

While the low solids content dispersions do exhibit a low degree of micro-flocculation, as reflected by their resultant increase in mean particle size, the overall degree of agglomeration obtained is believed to be insufficient as compared to the level present in the invention as the inventive dispersions demonstrate improved anti-tack performance as compared to the dispersions that were made up with a lower solids content. The data presented thus suggest that an optimum level of micro-flocculation is needed in the talc plus cationic polymer dispersion to impart benefits to its anti-tack coating performance.

Example 6 shows the importance of particle size control for the talc pigmentation that is employed and of molecular weight selection for the cationic polymer in terms of being able to make a viable high solids dispersion of Talc plus PolyDADMAC that meets the viscosity, stability and pumpability requirements.

Example 7 shows that similar improvements in anti-tack coating performance are obtained when the talc mineral pigmentation is partially replaced with another anti-block pigment, this one being a metal stearate. This example also demonstrates the unexpected improvements in dip slurry properties and anti-tack performance when the dispersion includes a cationic polymer. Further yet, this example confirms the anti-tack performance improvements shown in Example 5 in terms of the inventive high solids content dispersion yielding, upon dilution, improved performance as compared to similar dispersions that are made as lower solids dispersions and diluted or just made directly as a low solids content dispersion for anti-tack coating use. The dispersions produced at the various solids content levels were all analyzed for their particle size properties by Horiba LLS analysis and the degree of particle aggregation obtained, as reflected in their change in mean particle size, was shown to strongly correlate with their resultant anti-tack coating performance. The data presented indicate the degree of particle aggregation obtained is dependent on the original solids content of the dispersion and, since particle aggregation affects anti-tack coating performance, then dispersions produced at different solids content targets do not perform the same.

Example 8 demonstrates the importance of using a silicate mineral pigment of relatively low cation exchange capacity (CEC) in the anti-tack dispersions if a cationic polymer, like PolyDADMAC, is to be employed. More particularly, this Example shows that a significant degree of particle aggregation is obtained, which is reflected by a large increase in the pigmentation's mean particle size, when a dispersion formulation containing a high weight % of a high CEC mineral pigment is utilized and that the magnitude of the aggregate particle size change increased with increasing solids content of the dispersion, such increase resulting in poor anti-tack coating film uniformity and reduced anti-tack coating performance.

Example 9 demonstrates the effect of adding increasing amounts of cationic polymer in a dispersion formulation containing a high weight % of a mineral pigment with a high CEC value. Whereas one experiment in Example 8 shows a minimal effect on anti-tack performance when utilizing a small amount of cationic polymer in a dispersion that is produced at a low solids content of 2%, Example 9 demonstrates that the addition of larger amounts of cationic polymer (even in a dispersion of just 2% solids) results in much degradation in anti-tack coating performance, which is believed to be due to very large particle aggregates being formed from an agglomeration process that is best described as macro flocculation. The formation of very large particle aggregates as the cationic polymer dosage was increased is reflected in the very large increases in mean particle size detected from Horiba LLS particle size analysis. The high degree of particle aggregation being obtained in this Example's experiments is a consequence of the significant particle/cationic polymer interaction that is being driven by using a fine particle mineral having a high CEC value (like smectite clays). This high degree of particle aggregation thus significantly limits the amount of smectite clay that can be used in the inventive dispersions.

The following relates to technical background considerations for new Examples 5-9 and further discussion of the fundamental differences in properties and anti-tack performance associated with the talc/cationic polymer dispersions previously disclosed in Examples 1-4 of US Patent Application Publication US 2020/0317952 A1 when they are produced at a high, non-volatile (NV) solids content under high shear mixing conditions and then subsequently diluted to a low NV solids content for rubber dip slurry coating applications use versus using compositionally equivalent talc/cationic polymer dispersions as dip slurries that are produced directly at a lower NV solids content. These examples demonstrate that the high NV solids content dispersions yield different particle agglomerate structures and sizes which upon subsequent dilution to low solids translate to unexpectedly better anti-tack coating performance on uncured rubber compounds when they are utilized as a slab dip slurry. In contrast, the compositionally equivalent dispersions made directly at low non-volatile solids content yield decreased anti-tack coating performance on uncured rubber compounds when used as slab dip slurries.

When considering the formation of silicate mineral/cationic polymer dispersions the structure and size of the resultant particle agglomerate is governed by a several different chemistry and processing factors that are involved in producing the dispersions. Some of the key factors impacting particle agglomeration in the inventive dispersions are as follows:

1) Particle Size/Surface Area of the silicate pigments being flocculated with a cationic coagulant polymer.
2) The relative concentration level of silicate pigment that is being treated with a given dosage of cationic polymer.
   a. Changes in the concentration of silicate pigment and/or the polymer dosage level can affect the degree of particle aggregation that is obtained.
3) Cation Exchange Capacity (CEC) of the silicate pigments being employed in the formulation.
   a. Higher levels of pigment CEC offer more points of contact relative to cationic polymer/particle interactions. This can then influence the type and amount of particle aggregation that is obtained.
4) The charge density and molecular weight (Mw) of the cationic polymer that is being employed.
5) Chemistry differences between the various types of cationic polymers that are available for use (see previous list of polyquaternium polymers), hereinafter PDM or PolyDADMAC.
6) How and when the cationic polymer is introduced into the particle dispersion process.
   a. For example, adding it up front before any pigments are introduced versus adding the cationic polymer later in the process to a preformed pigment slurry dispersion.
   b. Rate of cationic polymer addition when adding a cationic polymer to a preformed pigment dispersion.
7) The mixing process that is being employed (e.g., the type of mixing blade, mixing speed, high shear versus low shear mixing and the duration of the mix time).
   a. Mixing can impact the homogeneity of polymer distribution onto the particles and under high shear mixing conditions the shear can potentially attrition down the size of the resulting particle agglomerates.
   b. If very high Mw cationic polymers are employed, the utilization of high shear mixing creates the potential of scissoring the polymer chain into smaller Mw fragments.

Several of the above factors which impact particle agglomeration are discussed below in more detail. Relative to particle size/surface area effects on particle agglomeration, this is driven by particle/polymer electrostatic interactions that arise from the cationic polymer and the anionic charge associated with the silicate mineral particles. The cationic polymers are adsorbed on the surface of the anionic mineral particles so available surface area has a bearing on the amount of polymer that can be adsorbed and how it is adsorbed. As discussed below, different modes of particle/polymer interaction resulting in particle bridging are proposed by Breen (C. Breen, Applied Clay Science, 15, 1999, pp. 187-219) whereby fine particle size particles of high anionic charge are particularly conducive to yielding particle bridging across multiple particles. The effect of particle size is observed in Example 6, see below, whereby a finer particle size talc, FlexTalc 815, having a median particle size of 2 microns was used as a replacement for SAS-3 which has a median particle size of 3 microns. An increased level of particle agglomeration was realized in the dispersion based on the notably increased aged Brookfield viscosity response associated with the batch even though the two talc pigments had very similar CEC values. While the inventive dispersions of talc+PDM are best accomplished using talc particles less than 7 microns in median particle size a more preferred range of median particle sizes for the talc pigmentation is from about 0.5-5.0 microns. A representative commercial example of a nano particle size, dry ground Talc that is suitable for use as the secondary talc pigment of finer size in a coarse particle+fine particle Talc blend strategy for the inventive dispersions is the jet milled product NANO-FLEX produced by Cimbar Minerals which has a Cilas median particle size value of 0.7 microns. Talc pigmentation combinations having too many ultrafine particles tend to increase the aged viscosity response of the high solids talc+PDM dispersions while utilizing too much coarser particle size talc pigmentation results in a decrease in anti-tack coating coverage when the dispersion is applied to the rubber in its low solids dip slurry form. So, finding an optimum balance between these two performance parameters is desirable from an end use applications perspective.

The degree of particle aggregation obtained in the talc+PDM dispersions is closely related to the relative concentrations of each that are brought together in the dispersion process. In Example 5 below, the total NV solids content of the talc+PDM dispersion (per dispersion Formula M) is about 52% by weight (which is within the 45%-75% solids content target range). The pigment solids content is about 47.2% and the PDM concentration level is 0.0933% by weight of total formula. This Formula M dispersion recipe yielded an acceptable level of micro-flocculated talc particles that translated to notable improvements in slab dip properties when the dispersion concentrate was subsequently diluted back to 4% NV solids content. Acceptable levels of talc particle aggregation could also be achieved if the total solids content of the dispersion concentrate was reduced to about 46%. However, the dosage of PDM polymer that would be required to yield the desired aggregation would have to be notably increased. Conversely, the total solids content of the dispersion concentrate could be increased to about 57% but the dosage of PDM polymer that would be required to yield the desired micro-flocculation level would have to be notably decreased. Hence, with the intent being to produce desirable levels of micro-flocculated talc, one sees that the required concentrations of talc particles and PDM polymer are inversely related to one another. However, if the median particle size of the talc particles is changed and/or the talc pigmentation to be employed has a different CEC value, then, for a given total NV solids content, the PDM dosage level will have to be accordingly adjusted. This is because particle size/surface area, mineral CEC, the total solids content of the dispersion and the relative concentrations of talc and PDM are all interrelated with respect to the resultant aggregate particle size one obtains. However, when making talc+PDM dispersions, there is a lower limit on total NV solids content that can be used to produce a micro-flocculated Talc aggregate that yields the desired anti-tack coating performance properties. Other dispersion experiments presented in Example 5 will demonstrate that talc+PDM dispersions produced at 15%, 10%, and 4% solids do not perform the same as anti-tack dip coating slurries as the corresponding dispersions produced at high solids contents (45%-75%) and subsequently diluted to 4% solids for slab dip use.

Amongst the above factors, the CEC of the silicate mineral pigment employed is a particularly critical property relative to forming dispersions of particle+cationic polymer agglomerates that yield improvements in anti-tack coating performance properties on uncured rubber compounds when they are subsequently employed as low NV solids content slab dip slurries. The CEC values associated with various silicate minerals are known to vary over a wide range of values (from 0 to about 200 meq/100 g). However, all CEC values are not as conducive to generating the desired micro-flocculated particles when producing high solids content dispersions in the presence of a cationic polymer like PDM.

From a mineralogy definition standpoint, the Cation Exchange Capacity of a clay soil is a measure of the soil's ability to hold positively charged ions. The CEC is an important soil property influencing soil structure stability, nutrient availability, soil pH and the soil's reaction to fertilizers and other ameliorants. The clay mineral components of a soil have negatively charged sites on their surfaces which adsorb and hold positively charged ions (cations) by electrostatic force. The main ions associated with CEC in soils are the exchangeable cations calcium ($Ca^{2+}$), magnesium ($Mg^{2+}$), sodium ($Na^+$) and potassium (Kt). These cations are generally referred to as the base cations. In most cases, summing the analyzed base cations gives an adequate measure of CEC (known as CEC by bases).

The Cation Exchange Capacity properties of various silicate mineral pigments commonly used in applicant's anti-tack formulations are tabulated below in Table XII. The CEC values reported in Table XII were determined by an outside Mineralogy Lab (R. J. Lee) using the compulsive exchange method of Gillman and Sumpter (1986) whereby two different lots for a given mineral pigment were analyzed and the results were then averaged.

TABLE XII

Silicate Mineral CEC Analysis Data

| Mineral & Description | Total CEC, meq/100 g (average value of 2 lots; analyzed via Compulsive Exchange Method of Gillman & Sumpter - 1986 *) |
|---|---|
| SAS-3 Talc, Cimbar Minerals (Roller mill/classifier produced) | 6.3 |
| SAS-3 Talc, Cimbar Minerals (Jet-mill produced version) | 6.6 |
| FlexTalc 610, Cimbar Minerals (Jet-milled, Ultrafine Talc) | 6.6 |
| Pangel S9, Sepiolite - untreated; Tolsa Group | 4.8 |
| Kaoplate 13P, Thiele Kaolin Co. (Coarse Particle Size, Delaminated Kaolin Clay) | 0.4 |
| Hydrite RS-A, Imerys (Fine Particle Size, Kaolin Clay) | 2.0 |
| Iceberg, Burgess Pigment Co. (Calcined Kaolin Clay) | 0 |
| MB300S; LKAB Minerals Ltd. (Na, Ca-Bentonite) | 22.0 |
| Volclay 325; American Colloid Co./MTI (Na, Ca-Bentonite) | 21.5 |

Note:
* G. P. Gillman & E. A. Sumpter; Austrailian J. Soil Res., 1986, 24, pp. 61-66.

The CEC values determined above can be compared to those previously reported in the mineralogy literature such as those cited in Table XIII below by Grim (1968).

TABLE XIII

Literature CEC Values for Various Silicate Minerals*

| Table | Cation-exchange capacity of clay minerals, in milliequivalents per 100 g |
|---|---|
| Kaolinite | 3-15 |
| Halloysite $2H_2O$ | 5-10 |
| Halloysite $4H_2O$ | 40-50 |
| Smectite | 80-150 |
| Illite | 10-40 |
| Vermiculite | 100-150 |

TABLE XIII-continued

Literature CEC Values for Various Silicate Minerals*

| Table | Cation-exchange capacity of clay minerals, in milliequivalents per 100 g |
|---|---|
| Chlorite | 10-40 |
| Sepiolite-attapulgite-palygorskite | 3-15 |

Note:
*Table taken directly from *Clay Mineralogy*, Ralph E. Grim, McGraw-Hill Book Co., Table 7-1 on pp. 189, ©1968.

Note: * Table taken directly from Clay Mineralogy, Ralph E. Grim, McGraw-Hill Book Co., Table 7-1 on pp. 189, © 1968.

The CEC values previously reported in the technical literature for talc (E. F. Aglietti, Applied Clay Science, 9, 1994, pp. 139-147 and references cited therein) can range from as low as 0.4 meq/100 g (for unground Talc) up to about 20 meq/100 g (after the talc is subjected to very intensive dry grinding). In comparison to these literature values, the ground Talc pigments (SAS-3 and FlexTalc 610) that were used in the various illustrative examples (which have Cilas median particle size values of 3 and 1 microns, respectively) were determined to have CEC values of about 6.3-6.6 meq/100 g. They were produced via a conventional dry grinding process (e.g., roller mill/classifier or jet mills). The SAS-3 and FlexTale 610 talc pigments used in the inventive dispersions are both generated from a high quality, Chinese talc ore that is mined from the Guilin, China geographical region and were processed using the aforementioned dry grinding processes. The CEC values reported in the technical literature for another relevant silicate mineral, muscovite mica, are about 2.8 meq/100 g (Sonja Milicevic, et. al., Journal of Thermal Analysis and Calorimetry, 2018, 134, pp. 1011-1019). Micronized muscovite mica has been frequently utilized as a dry dusting agent for rubber compounds to serve as an anti-block/partitioning agent. Given the above reported CEC values for illite, halloysite·2H$_2$O and microcline, suitable grade candidates of these silicate minerals meeting the defined CEC end-use requirements of the invention can be selected for use as secondary anti-block pigments in the high solids content talc+PDM dispersions.

It should be mentioned that the CEC values being reported for the MB300S and for the VolClay 325 bentonite clays listed in Table XII are considerably lower than the literature referenced 80-150 meq/100 g CEC range reported by Grim for Smectite Group Minerals such as montmorillonite (commonly called bentonite), hectorite, saponite, etc. This discrepancy is because the bentonite clays employed herein, for viscosity related reasons, are Na,Ca-bentonites and not sodium bentonites or sodium activated bentonites. The lower CEC properties of these calcium bentonites enables higher quantities to be employed in the formulations because they do not swell as much and consequently generate lower resulting viscosities when dispersed into water. The lower Brookfield viscosity properties associated with calcium bentonite clays and their ability to be used at higher pigment loading levels in waterborne coatings is, for example, disclosed in U.S. Pat. No. 5,700,319. For illustrative purposes, however, these calcium bentonites (as compared to the talc pigments employed) still show the significant impact of higher CEC value on aggregate particle formation when polycationic coagulant polymers are employed; hence, utilizing bentonite or hectorite grades of even higher CEC would only further magnify the effects on particle aggregation discussed below.

Figure 4:
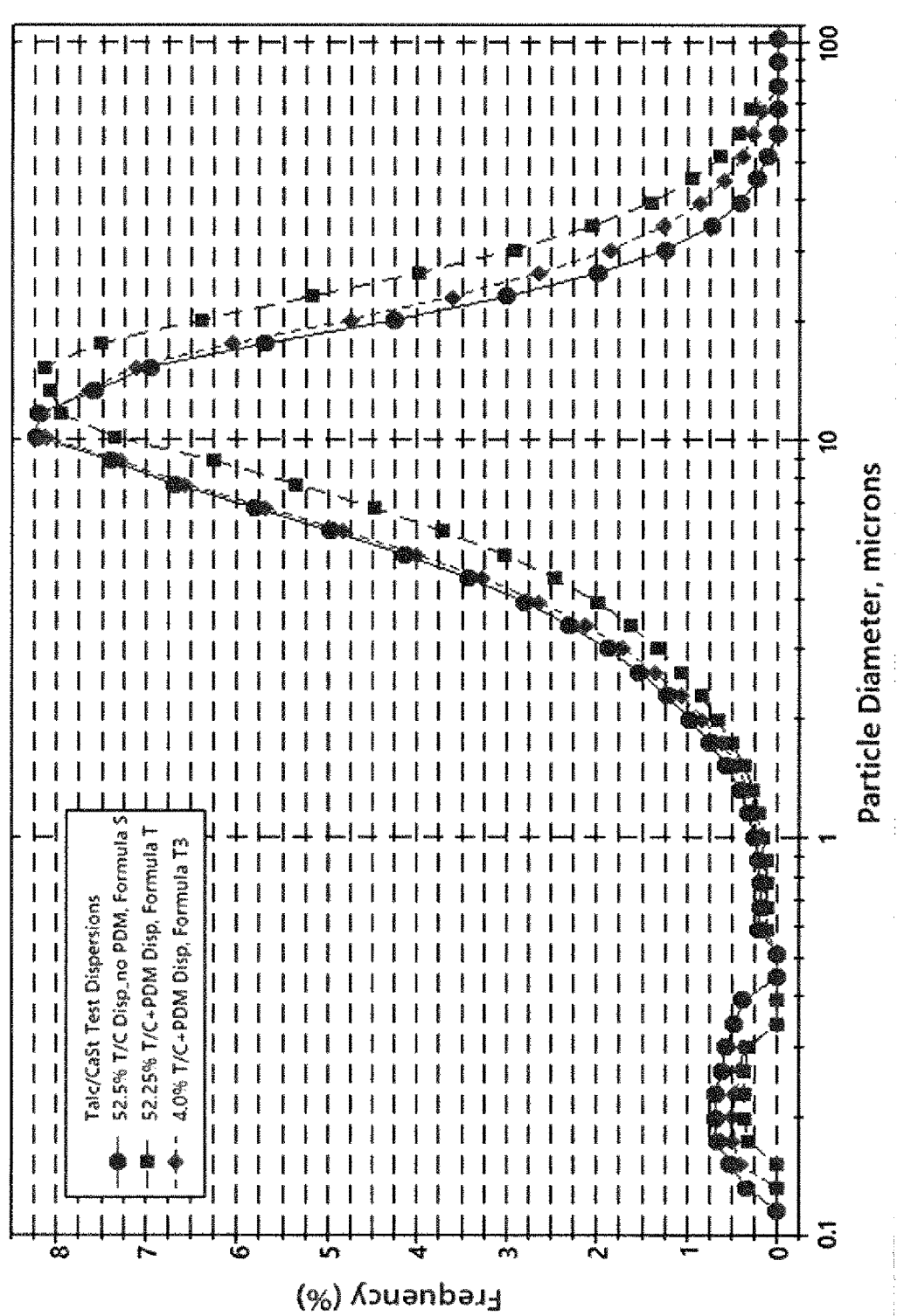
FIG. 4 is a Horiba laser light scattering particle size distribution curve showing the particle size distribution for three anti-tack formulations that are different from those used in FIG. 1 in that they employ a combination of talc and calcium stearate pigmentation either with or without the addition of a cationic polymer.
Figure 5:
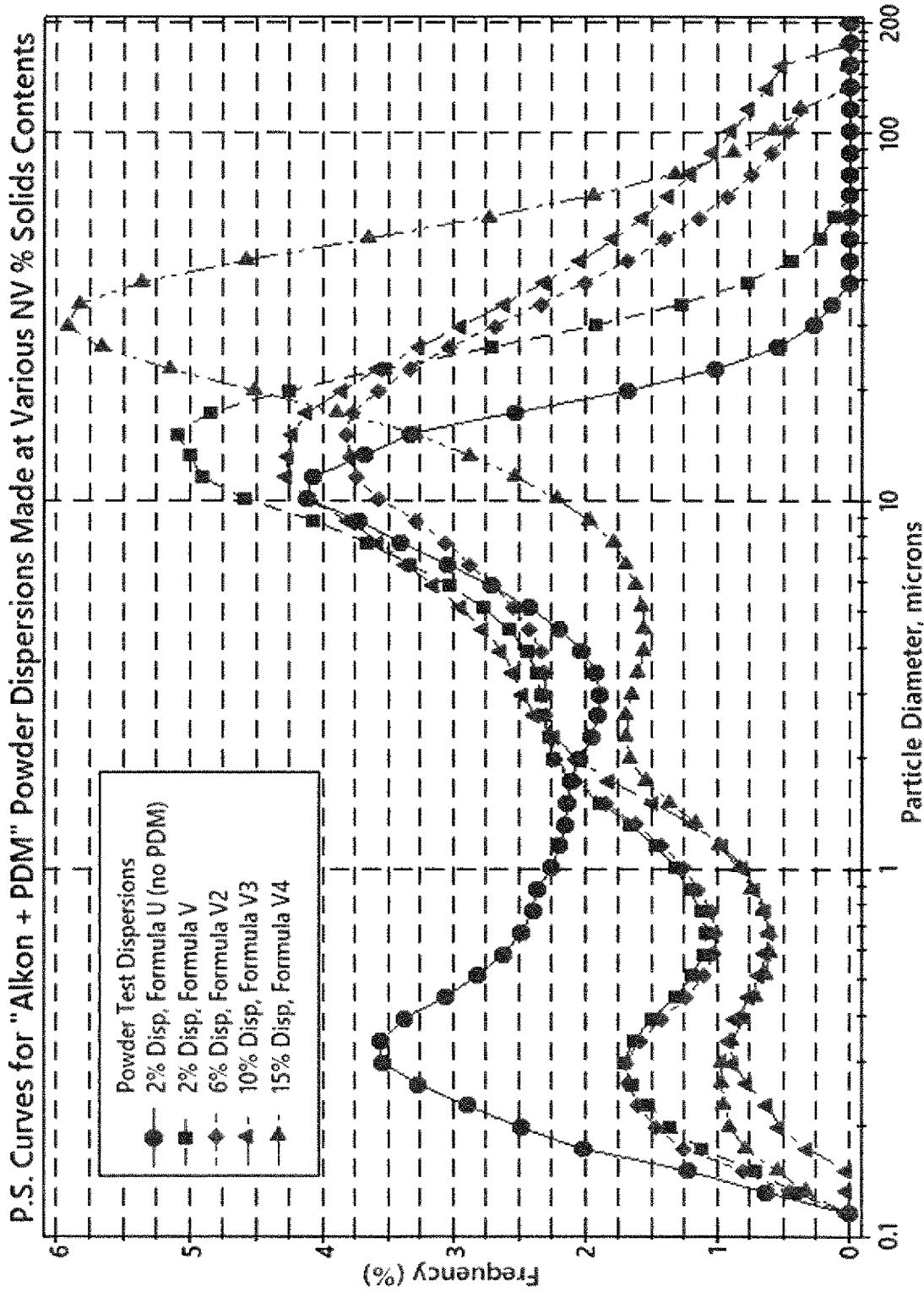
FIG. 5 is a Horiba laser light scattering particle size distribution curve showing the particle size distribution for five anti-tack formulations that employ a high content % of a bentonite clay pigment having a high CEC value. One of the plotted formulations contain no quaternary cationic polymer while the others employ a quaternary cationic polymer. The formulations are further differentiated in that they are produced at various non-volatile % solids contents ranging from 2% to 15% by weight.

The CEC value of silicate mineral particulates is important in terms of controlling the amount of polycationic polymer that is adsorbed and the resultant level and type of particle flocculation one obtains when employing a polycationic polymer coagulant like PolyDADMAC. This effect on flocculation is documented in the clay mineral discussions presented in the technical publication of Breen entitled "The Characterization and Use of Polycation-Exchanged Bentonites" (C. Breen, Applied Clay Science, 15, 1999, pp. 187-219). Breen emphasizes that polycationic polymers, such as PolyDADMAC, adsorb onto mineral particulates via coulombic interactions between the cationic functional groups within the polymer and the negatively charged clay mineral surfaces. Clay minerals of lower CEC have surfaces of lower anionic charge thus providing fewer contact points for the cationic polymer. Clay minerals of higher CEC value (with their correspondingly higher anionic surface charge and greater number of contact points) will adsorb polycationic polymers of high positive charge density differently than clay mineral materials having a lower CEC. Other factors such as particle size can also come into play relative to cationic polymer adsorption and in general smectite clays (such as bentonites) are considerably finer in median particle size than ground talc (the former commonly being submicron in particle size and the latter being commonly 1-10 microns in size). The different modes of interaction between clay minerals of different charge and different median particle size with polycationic polymers are graphically depicted in Breen's paper. For discussion purposes Breen's representation of potential particle/cationic polymer interactions are shown in FIGS. 4 and 5 of his technical publication. One proposed mechanism of particle flocculation involves interparticle bridging of multiple particles via the polymer, see depictions (b) and (c) in FIG. 4 of Breen's publication, whereby the loops and/or dangling tails of a single cationic polymer have the capability to interact with additional particles thereby bridging them. In the case of smectite clays, which typically exhibit a high negative charge while also being small in particle size, then interaction mode (c) per FIG. 4 of Breen's publication is likely the predominant particle/cationic polymer bridging mechanism. In contrast when employing Talc pigmentation, like SAS-3 and FlexTale 610, then interaction mode (b) per FIG. 4 of Breen's publication is likely the more predominant particle bridging mechanism. However, another type of particle flocculation mechanism, called patch flocculation, is depicted in FIG. 5 of Breen's publication whereby polycation rich surfaces on one particle have the capability to interact with anionic surface areas of another particle that are free of adsorbed polycationic polymer. While the overall combination of mechanisms in play causing particle flocculation can be complex, the key takeaway is that smectite clays like bentonite with their higher CEC properties have a greatly enhanced capacity to adsorb cationic polymers as compared to the ground tale pigments used in the invention and this functionality thus leads to a greater extent of particle flocculation. The high degree of particle flocculation that occurs when significant quantities of higher CEC minerals are employed in a mineral dispersion that is dosed with polycationic polymers (like PolyDADMAC) results in notable increases in particle agglomeration that can be experimentally quantified by relative % changes in their mean or median aggregate particle size as measured by laser light-scattering (LLS) methods. However, alternate methods of particle-sizing can be also employed relative to determining the relative % changes in mean or median particle size arising from particle agglomeration. For example, the particle size and shape of the primary particles used in the agglomeration process (or comprising the aggregates) can be individually quantified by microscopy-based particle image analysis methods and the measured properties can then be compared to those determined by the same image analysis methodology for the actual aggregates that are formed from the primary particles. Image analysis requires that hundreds of particles be measured in order to get statistically meaningful results, but this task is easily accomplished via the use of computer assisted imaging systems. While the absolute particle size numbers may be somewhat different when comparing particle size values derived from different analysis methods the relative % change in particle size values are comparable.

It should also be noted for clarification that the particle/cationic polymer electrostatic interactions of interest in the present invention occur at the surface of the silicate mineral particle and should not be confused with nanoclays previously reported in the art whereby an organic polymer has been intercalated between the interlayer galleries of the mineral particle's crystal lattice.

From Horiba LLS particle size measurements and subsequent slab dip application testing, it has been determined that the % relative increase in aggregate particle size resulting from cationic polymer interactions with anionic mineral particles can be descriptively classified into three basic categories, as defined below in Table XIV, whereby the different aggregate size categories are closely correlated with their respective end-use performance properties in anti-tack coating formulations.

TABLE XIV

Particle Aggregation Resulting from Use of Cationic Polymer Coagulants - Aggregated Particle Size Descriptions

| % Increase in Mean Particle Size* Arising from Cationic Polymer/Particle Interactions | Resultant Particle Aggregate Description |
|---|---|
| 5-60 | Micro-Flocculation (a low degree of particle agglomeration) |
| 61-150 | Moderate-Flocculation (a moderate or intermediate degree of particle agglomeration) |
| 151-400+ | Macro-Flocculation (a high degree of particle agglomeration resulting in large agglomerates) |

Note:
*Mean particle size measurements were made using a Horiba LA-300 laser light-scattering particle size analyzer.

With respect to the different aggregate particle size categories defined in Table XIV, the relative % increase in mean particle size was determined from comparing the mean particle size of the starting point anti-tack formula dispersions containing no polycationic polymer to the mean particle size of anti-tack formula dispersions containing particle/cationic polymer agglomerates that were produced from the addition of some polycationic polymer to the formulation. In general, anti-tack formulations generated from combining lower CEC minerals (like talc) with a polycationic polymer (like PolyDADMAC) tended to yield aggregated particle dispersions that are best described as micro-flocculated systems as they exhibited a relatively low degree of particle agglomeration as determined by LLS particle size measurements. The resultant % increase in mean particle size that arises from micro-flocculation of mineral particulates will range from about 5-60% but from an anti-tack coating performance standpoint will more preferably range from 20-50%. This relationship between mean particle size increase and anti-tack coating performance are demonstrated in Examples 5 and 7, see below, but overall micro-flocculation has been found to be the most effective level of talc particle/cationic polymer aggregation with respect to anti-coating performance on uncured rubber compounds.

In terms of producing the talc/cationic polymer dispersions of the invention at high % NV solids contents that are stable and pumpable as pigmented slurries but are still highly functional as anti-tack dip slurries for rubber when subsequently diluted to NV solids contents of 1-10%, it is more preferred that the talc pigmentation (whether using a single particle size grade or a blend of two or more different particle size grades) have a CEC value of 1-10 meq/100 g (as defined by the Compulsive Exchange Method of Gillman and Sumpter) and that any other auxiliary silicate mineral additives used as extender pigments or as anti-block pigments in the formulation to further augment anti-tack coating properties should preferably have a CEC value equal to or less than about 15 meq/100 g. If any auxiliary silicate mineral additives with CEC values >15 meq/100 g are to be employed in the inventive talc/cationic polymer dispersions then they typically must be limited to low content levels (e.g., about 5% by weight or less of the total talc content by weight can be replaced). In the case where very high CEC silicate minerals are employed which can simultaneously function as anti-block pigments and as suspension aides, whereby their CEC value 50 meq/100 g, then additive level needs to be limited to no more than 2% by weight of the total formulation weight. These criteria should be followed in order for the talc+PDM dispersions to generate satisfactory micro-flocculation levels of particle aggregation (as defined in Table XIV) that yield beneficial anti-tack coating properties and for the original dispersions of 45%-75% total NV solids content to meet the Brookfield viscosity requirements needed for their stability and pumpability. The CEC driven interactions and properties, along with accompanying particle size and surface area considerations, thus help to define the amounts of optional anti-block or extender pigments that can be typically employed in the high solids content dispersions as partial replacements for the talc pigmentation therein in accordance with the following substitution guidelines:

a) Silicate mineral based anti-block pigments having a CEC value <5 meq/100 g can be utilized as partial replacements for talc in amounts up to 25% by weight of the total talc content that is present in the formulation. These low CEC silicate mineral pigments, such as kaolin clays and calcined kaolin clays, will in general be more conducive to yielding micro-flocculated particle aggregates.

b) Silicate mineral based anti-block pigments having a CEC value of 5-15 meq/100 g can be utilized as partial replacements for talc in amounts up to 15% by weight of the total talc content that is present in the formulation. These lower replacement amounts for talc are governed by the mineral's increased potential to generate moderately higher degrees of particle aggregation than what talc alone would generate. Higher than optimum degrees of particle aggregation can yield diminished slap dip slurry properties and decreased anti-tack coating performance properties. Higher degrees of particle aggregation can also result in the original high solids dispersions yielding a higher than desired aged Brookfield viscosity.

c) Silicate mineral based anti-block pigments having a CEC value >15 meq/100 g can be utilized as partial replacements for talc in amounts up to 5% by weight of the total talc content that is present in the formulation. These low replacement amounts for talc are governed by the mineral's increased potential to generate notably higher degrees of particle aggregation than what Talc alone would generate.

d) Silicate minerals, like smectite clays, having a very high CEC value >50 meq/100 g can be utilized as anti-block pigments but can also be used as a pigment suspension aide in the inventive, high solids content dispersions. They can only be utilized in amounts up to 2% by weight of the total formulation weight. Higher amounts of usage in the dispersion would contribute to increased particle aggregation levels and to higher Brookfield viscosity values.

e) Inorganic oxide pigments such as synthetic silica pigments (e.g., precipitated silica, fumed silica, silica gel and colloidal silica) used as anti-block pigments can be utilized as partial replacements for talc in amounts up to 5% by weight of the total talc content that is present in the formulation. This replacement limitation is principally driven by the fine particle size, high surface area and/or high oil absorption properties of synthetic silicas which can accordingly increase the aged Brookfield viscosity properties of the high solids content dispersions.

f) Inorganic pigments such as the insoluble carbonates or sulfates of various alkali earth metals (e.g., calcium carbonate, dolomite and barytes) used an anti-block or extender pigments can be utilized as partial replacements for talc in amounts up to 25% by weight of the total talc content that is present in the formulation. The amount of replacement that is possible is principally governed by the particle size and surface area properties of these inorganic pigments which impacts the aged Brookfield viscosity properties of the high solids content dispersion.

g) Other non-mineral based anti-block pigments such as metallic stearates (e.g., calcium stearate, magnesium stearate, and zinc stearate) can be utilized as partial replacements for talc in amounts up to 25% by weight of the total talc content that is present in the formulation. The amount of replacement that is possible is principally governed by the particle size and surface area properties of the metallic stearate pigment which thus affects the aged Brookfield viscosity properties of the high solids content dispersion. Metallic stearate pigments are commonly produced in melt fusion grades and precipitated grades with the former typically being in the form of crystalline platelets and the latter being in the form of precipitated particle aggregates having higher surface area properties.

Anti-tack formula dispersions that contain high content amounts of high CEC minerals (like bentonite or other smectite minerals) tend to yield particle/cationic polymer aggregates that are best described as moderately flocculated to macro-flocculated systems as they exhibit a high degree of particle agglomeration even when the aggregate dispersions are produced directly at low, non-volatile % solids contents. The resultant % increase in mean particle size that arises from moderate flocculation or macro-flocculation of mineral particulates that employ high content amounts of high CEC minerals are typically found to range from about 80% to over 400%. For example, such highly flocculated anti-tack formulations will arise from adding a polycationic polymer (like PolyDADMAC) to the high smectite content, powder formulations previously disclosed by Oka in EP3434719 A1 and in WO 2019/044831 A1 when they are subsequently dispersed in water at solids contents of 0.5-10% for slab dip application use. This technical assertion is demonstrated in Example 8, below, when some PolyDADMAC (PDM) was employed as an additive to a commercial anti-tack powder formulation that is analogous to those previously disclosed in the Oka prior art. Furthermore, in anti-tack formulations with a high smectite mineral content, the overall degree of particle aggregation resulting from the addition of polycationic polymer is highly dependent on the total NV % solids content at which the formulation is dispersed. Equivalent compositions in terms of the relative amounts of active ingredients utilized that are formulated at low total NV solids contents versus higher total NV solids contents do not yield the same level of resultant particle aggregation when a polycationic polymer is employed in the formulations and accordingly they do not perform the same as slab dip anti-tack coatings for uncured rubber.

In short, the effective use of polycationic polymers in mineral based anti-tack formulations is highly dependent on the CEC value of the mineral pigments that are employed and is also dependent on the total NV solids content at which the formulation was originally dispersed. The total solids content of the initial dispersion therefore establishes the resultant aggregate structure even if the dispersion is subsequently reduced in solids content at a later point in time before final application use as a slab dip slurry. Therefore, in summary, producing a particle/cationic polymer dispersion at a high NV solids content and subsequently diluting it to a low NV solids content does not yield the same aggregate structure and same anti-tack coating performance as producing the formula dispersion directly at a low solids content level. Lastly, when producing high solids content aqueous dispersions of talc+PDM, it is preferable from a mixing process standpoint to add all the PDM polymer up front and prior to the addition of any pigmentation. These points as well as others will be further discussed in the following illustrative examples.

Example 5

In this example, a high solids anti-tack formulation that is similar to Formulation A (per Example 1) was produced using a combination of SAS-3 Talc and FlexTalc 610 with a new PolyDADMAC (PDM) polymer that was sourced from SNF Floerger called Floquat FL 4520. This PolyDADMAC grade is supplied as a liquid solution having a total solids content of 20%. Its properties in relation to other solution grade PolyDADMAC products from SNF are shown in Table XV. Based on its Brookfield Viscosity value, the Floquat FL 4520 would be categorized as a medium molecular weight (Mw) PolyDADMAC polymer and was found through experimentation to be one of the best SNF solution polymer grades for producing the inventive talc/cationic polymer dispersions at high total NV solids contents.

TABLE XV

Representative Examples of PolyDADMAC Coagulant Solution Grades Commercially Available from SNF FLOERGER

| PolyDADMAC Product Tradename | % Total Solids* | Brookfield Viscosity, cps* | Relative Molecular Weight |
|---|---|---|---|
| Floquat FL 4820 | 20% | 1,000-3,000 | Very High |
| Floquat FL 4620 | 20% | 700-1,000 | High |
| Floquat FL 4520 | 20% | 200-600 | Medium |

TABLE XV-continued

Representative Examples of PolyDADMAC Coagulant Solution Grades Commercially Available from SNF FLOERGER

| PolyDADMAC Product Tradename | % Total Solids* | Brookfield Viscosity, cps* | Relative Molecular Weight |
|---|---|---|---|
| Floquat FL 4420 | 20% | 80-180 | Low |

Note:
*Data taken directly from SNF Floerger product brochure literature.

Formulary and addition step details associated with the inventive talc+PDM dispersion produced at about 52% total NV solids content when Floquat 4520 was employed are detailed below in Table XVI-A. This aqueous formulation (hereafter denoted as Formula M) was produced using a single shaft, high shear Cowles disperser unit. Standard QC (Quality Control) properties for this Formula M test batch are summarized in Table XVI-B. The total NV % solids content of the batch that was experimentally determined from the use of an AND MF-50 moisture analyzer unit set to run at 150° C. was 52.45% by weight. It should be noted that the active PDM polymer level present in the total formulation is 0.0933% by weight. When calculated on a total "solid pigments" basis, the active PDM dosage level added on total solid pigment is 0.1978% by weight (where the "solid pigments" utilized in this anti-talc formulation are talc, sepiolite and fumed silica). Relative to its talc pigmentation content, the active PDM dosage level added to the dispersion is 0.1988% by weight of total dry talc.

TABLE XVI - A

Process Addition Steps & Formulation for Talc + PolyDADMAC Dispersion Using Floquat FL 4520 (Formula M)

| Step # | Raw Material Name | Raw Material Activity | Ingredient Amount, g | % Raw Material in Finished Batch |
|---|---|---|---|---|
| 1 | Soft Neutral Water @ 25° C. | 0.000 | 1695.00 | 47.07% |
| 2 | Dazomet Biocide/BCS 3243 | 0.240 | 2.70 | 0.07% |
| 3 | SNF Floquat FL 4520, 20% active PolyDADMAC solution | 0.200 | 16.80 | 0.47% |
| 4 | SURFYNOL 440 Surfactant, Evonik | 1.000 | 0.40 | 0.01% |
| 5 | PANGEL W, Sepiolite, Tolsa Group | 0.950 | 3.60 | 0.10% |
| 6 | Munzing DEEFO 3010A, Oil Based Defoamer | 1.000 | 5.50 | 0.15% |
| 7 | Valpro 92 SFG, Na Tallowate Soap Powder, Vanguard | 0.920 | 39.00 | 1.08% |
| 8 | ETHAL TDA-5, SEO Tridecyl Alcohol, HLB = 10.6, Ethox Chemicals | 1.000 | 5.40 | 0.15% |
| 9 | Cimbar Talc SAS-3; Cilas mps = 3 μm | 0.990 | 450.00 | 12.50% |
| 10 | ValPro 59, Na Cocoate/Na Vegate Soap Flakes, Vanguard | 0.960 | 3.00 | 0.08% |
| 11 | ETHAL TDA-5, SEO Tridecyl Alcohol, HLB = 10.6, Ethox Chemicals | 1.000 | 1.80 | 0.05% |
| 12 | Konasil 200, 200 m2/g fumed silica | 1.000 | 9.00 | 0.25% |
| 13 | Cimbar Talc SAS-3; Cilas mps = 3 μm | 0.990 | 450.00 | 12.50% |
| 14 | ValPro 59 Na Cocoate/Na Vegate Soap Flakes (Vanguard) | 0.960 | 3.00 | 0.08% |
| 15 | ETHAL TDA-5, SEO Tridecyl Alcohol, HLB = 10.6, Ethox Chemicals | 1.000 | 1.80 | 0.05% |
| 16 | Cimbar Talc SAS-3; Cilas mps = 3 μm | 0.990 | 350.00 | 9.72% |
| 17 | ValPro 59 Na Cocoate/Na Vegate Soap Flakes (Vanguard) | 0.960 | 9.00 | 0.25% |
| 18 | ETHAL TDA-5, SEO Tridecyl Alcohol, HLB = 10.6, Ethox Chemicals | 1.000 | 12.60 | 0.35% |
| 19 | Cimbar FlexTalc 610; Cilas mps = 1 μm | 0.990 | 150.00 | 4.17% |
| 20 | n-Butyl Stearate (@ 35° C.), Custom Synthesis | 0.990 | 7.20 | 0.20% |
| 21 | ValPro 59 Na Cocoate/Na Vegate Soap Flakes (Vanguard) | 0.960 | 6.00 | 0.17% |
| 22 | ETHAL TDA-5, SEO Tridecyl Alcohol, HLB = 10.6, Ethox Chemicals | 1.000 | 14.40 | 0.40% |
| 23 | Cimbar FlexTalc 610; Cilas mps = 1 μm | 0.990 | 100.00 | 2.78% |
| 24 | ValPro 59 Na Cocoate/Na Vegate Soap Flakes (Vanguard) | 0.960 | 3.00 | 0.08% |
| 25 | ETHAL TDA-5, SEO Tridecyl Alcohol, HLB = 10.6, Ethox Chemicals | 1.000 | 14.40 | 0.40% |
| 26 | Cimbar FlexTalc 610; Cilas mps = 1 μm | 0.990 | 90.00 | 2.50% |
| 27 | Cimbar Talc SAS-3; Cilas mps = 3 μm | 0.990 | 100.00 | 2.78% |
| 28 | ValPro 59 Na Cocoate/Na Vegate Soap Flakes (Vanguard) | 0.960 | 3.60 | 0.10% |
| 29 | Glutaraldehyde Biocide, BCS 3502A | 0.5000 | 2.20 | 0.06% |
| 30 | Konasil 200, 200 m2/g fumed silica | 1.000 | 13.00 | 0.36% |
| 31 | Add Xanthan/Surfactant/Defoamer PreBlend Below: | | | |
| a) | PhosFlex 4, Tributylphosphate Defoamer | 1.000 | 7.20 | 0.20% |
| b) | ETHAL TDA-5, SEO Tridecyl Alcohol, HLB = 10.6, Ethox Chemicals | 1.000 | 16.20 | 0.45% |
| c) | Xanthan Gum | 1.000 | 9.40 | 0.26% |
| 32 | Munzing DEEFO 3010A, Oil Based Defoamer | 1.000 | 5.50 | 0.15% |

TABLE XVI - A-continued

Process Addition Steps & Formulation for Talc + PolyDADMAC Dispersion Using Floquat FL 4520 (Formula M)

| Step # | Raw Material Name | Raw Material Activity | Ingredient Amount, g | % Raw Material in Finished Batch |
|---|---|---|---|---|
| 33 | Adjust final pH to pH 9.60-9.80 using either 22.5% Potassium Hydroxide or 2-Ethylhexanoic Acid as needed. | | | |
| | | Total= | 3600.70 | 100.0% |

TABLE XVI - B

QC Test Properties for Dispersion Formula M

Batch QC Properties for Talc + PDM Dispersion using FL 4520

| | |
|---|---|
| Initial Brookfield Visc. (Sp #91 & 25° C.), cps | @ 2 rpm = 17,000; @ 20 rpm = 3,960 |
| Specific Gravity @ 25° C. | 1.2224 |
| pH @ 25° C. | 9.64 |
| Conductivity @25° C., mS/cm | 2.54 |
| Calculated NV Solids** Content, Wt. % | 51.87 |
| Measured NV Solids Content, Wt. % | 52.45 |
| Total Solid Pigments* Content, Wt. % | 47.17 |
| Active PDM Polymer Level in Total Formulation, Wt. % | 0.0933 |
| Active PDM Polymer Dosage Level on Total Solid Pigments Basis, Wt. % | 0.1978 |
| Active PDM Polymer Dosage Level on Total Dry Talc Basis, Wt. % | 0.1988 |
| Wt. % of Active PDM Polymer when Dispersion Concentrate is Subsequently Diluted into Dip Slurry of 4% Total NV Solids Content | 0.0071 |

Note:
*For calculation purposes, the solid pigments in this formulation include the silicate mineral pigments (Talc and Sepiolite) plus the Fumed Silica,
**NV Solids denotes "Non-Volatile Solids". The NV solids content is defined as the total wt. % of all non-volatile substances in the formulation which is determined herein via the use of a halogen lamp based AND Model MF-50 Moisture Analyzer Balance at a temperature setting of 150° C. Measuring the wt. % of all non-volatile substances in the formula via a moisture analyzer balance is based on drying methods described for waterborne coatings in ASTM D7232 and D2369.

The high solids Formula M dispersion of talc+PDM as outlined in Table XVI-A is further characterized in Table XVII which provides a testing summary of the dispersion's concentrate properties and its dip slurry performance properties after dilution to 4% NV solids content. The Formula M dispersion yielded a 2-week aged, Brookfield 2 rpm Viscosity of 102,400 cps, which is within the aged viscosity requirements previously defined for these high solids anti-tack formulations. In contrast, the same base formula dispersion of talc produced without the addition of any PDM (labeled as Formula L in Table XVII) yielded a lower 2-week aged, Brookfield 2 rpm Viscosity of 77,400 cps. Comparing these two dispersion experiments shows that particle aggregation resulting from the addition of PDM increases the viscosity properties of the concentrate formulation to a moderate degree but not to such an extent that the concentrate anti-tack formulation becomes too thick to subsequently pump and transport.

Also presented in Table XVII are additional experiments where equivalent talc+PDM dispersion formulations were produced with the exception that the targeted total % NV solids content of the test dispersion was significantly lower. Like Formula M, the Talc+PDM dispersions were also produced using a high-shear, Cowles dispersion process but the original formulation (as detailed in Table XVI-A) was merely reduced in total NV solids content by adding additional starting batch water to the recipe. The targeted % NV solids content associated with these additional dispersion experiments were about 15%, 10% and 4% by weight and they are hereafter designated as Formulas N, O and P, respectively. These batches were characterized and then subsequently allowed to age to monitor their viscosity and stability properties which are reported in the concentrate section of Table XVII. As seen in Table XVII these lower solids content talc+PDM dispersion batches were not stable long term with respect to static pigment settling and they had to be re-agitated prior to converting them into slab dip slurries for application use.

After characterization of the concentrates, portions of the talc+PDM based dispersion formulations were diluted under low shear agitation with additional water as needed to bring their final NV solids content to 4.0% for dip slurry application testing. The viscosity and foam properties for each 4.0% dilution slurry are summarized in Table XVII. Furthermore, their respective dip coating performance properties as anti-tack slurries are summarized there. With respect to the anti-tack testing protocol employed, this testing has been previously described in detail in Example 2 above. The only exception in this instance is that a typical tire tread compound employing a NR/BR polymer blend was utilized in the dip coating and anti-tack testing assessment. As before, an anti-tack rating scale of 0 to 6 was utilized to assess anti-tack performance differences whereby a rating of 6 is the best (absolutely no adherence/tack between the rubber slabs) and a rating of 0 is Fail. With respect to the foam testing conducted, it should be noted that in this and subsequent Examples foam height assessments were determined by a slightly modified testing procedure versus the one described in Example 2. Instead of employing a stoppered, glass graduate cylinder, a 1-liter Nalgene, PMP beaker was employed whereby 1 liter of 4.0% solids dip slurry that had been preheated in a microwave to about 108-110° F., was vigorously poured back and forth between another empty 1-liter Nalgene PMP beaker four times before the test beaker was set down and the initial foam height in mm was measured. Dissipation of this initial foam head was then monitored after time periods of 10 minutes and 20 minutes had elapsed and the residual foam heights were noted and recorded.

TABLE XVII

Talc + PDM Dispersions using FL 4520 - Properties and
Dip Slurry Performance (Dispersion Formulas L, M, N, O and P)

| Talc + PDM Test Disp.* @ % NV solids target | Dispersion Concentrate Properties | | | Dip Slurry Testing Properties of 4% Solids Dilution | | | |
|---|---|---|---|---|---|---|---|
| | | | | Dip Viscosity & Foam | | For Tire Tread Cap | |
| | pH @ 25° C. | Initial BF Visc., cps @ rpm & spindle # | 2-Week Aged BF Visc., cps @ rpm & spindle # | BF Visc. of 4% Dilution, cps @ rpm & spindle # | Foam Height Properties of 4% Dip Slurry | Description of Applied Dip Coating & Drying Time | Anti-Tack Rating** of Coating: 0 → 6 Scale |
| Formula L; Talc Disp. - no PDM @ 52.25% NV solids; control | 9.70 | BF = 14,100 cps; (2 rpm, Sp#91) | BF = 77,400 cps; (2 rpm, Sp#92) | BF = 17.6 cps; (100 rpm, Sp#2) | Initial = 40 mm; 10 min. = 5 mm; 20 min. = 3 mm | Lightly Coated, Splotchy Film; (Drying Time = 45 sec.) | 3 |
| Formula M; (Talc + PDM) Disp. @ 52.45% NV solids | 9.64 | BF = 17,000 cps; (2 rpm, Sp#91) | BF = 102,400 cps; (2 rpm, Sp#92) | BF = 18 cps; (100 rpm, Sp#2) | Initial = 30 mm; 10 min. = 3 mm; 20 min. = 1 mm | Heavy, Uniform Visible Coating; (Drying Time = 45 sec.) | 4.5 |
| Formula N; (Talc + PDM) Disp. @ 15.1% NV solids | 9.60 | BF = 1,400 cps; (2 rpm, Sp#91) | N.A.; batch settled within 1 week | BF = 22 cps; (100 rpm, Sp#2) | Initial = 16 mm; 10 min. = 2 mm; 20 min. = 2 mm | Visible Coating with Streaky Floc Structure; (Drying Time = 45 sec.) | 4 |
| Formula O; (Talc + PDM) Disp. @ 10.1% NV solids | 9.61 | BF = 900 cps; (2 rpm, Sp#91) | N.A.; batch settled within 3 days | BF = 21.2 cps; (100 rpm, Sp#2) | Initial = 20 mm; 10 min. = 0 mm; 20 min. = 0 mm | Visible Coating with Streaky Floc Structure; (Drying Time = 1 min.) | 3.5 |
| Formula P (Talc + PDM) Disp. @ 4.0% NV solids | 9.60 | BF = 22 cps; (100 rpm, Sp#2) | N.A.; batch settled within 1 day | BF = 22.8 cps; (100 rpm, Sp#2) | Initial = 25 mm; 10 min. = 5 mm; 20 min. = 4 mm | Visible Coating with Streaky Floc Structure; (Drying Time = 1 min.) | 3 |

Note:
*The Talc + PDM dispersions were made using the PDM additive at the same active dosage level of 0.1978 wt. % on a total solid pigment basis whereby the solid pigments in this formula were talc, sepiolite and fumed silica. Dispersions were made at their designated % NV Solids target and characterized and then subsequently diluted to 4% NV solids content for evaluation of their dip slurry performance properties.
**Anti-Tack coating performance of dip coated slabs were assessed on the same anti-tack rating scale that was used in Example 2.

In reviewing the dip slurry performance data in Table XVII, one will note that the inventive talc+PDM Formula M dispersion yielded advantages in dip slurry properties and in anti-tack coating performance when dip tested at 4% solids. As compared to the base formula dispersion with no PDM additive (Formula L), the inventive talc+PDM dispersion (Formula M) had improved initial foam properties when they were comparatively evaluated at 4% NV solids content. In addition, the inventive Talc+PDM dispersion (Formula M) yielded the most uniform dip coating film and the best anti-tack performance on the tire tread compound when applied as a 4% solids dip slurry. The notable improvement in anti-tack coating performance with PDM versus without PDM addition (Formula M versus Formula L, respectively) can be attributed to the resultant micro-flocculated particle aggregate structure that is created which is reflected by the mean particle size change shown in Table XVIII. The addition of PDM cationic polymer, per Formula M, resulted in a notable increase in mean particle size of 44.4% (as compared to the mean value of Formula L). While the mechanism of anti-tack coating improvement arising from talc particle micro-flocculation, as it relates to Formula M, was unexpected and is not completely understood, it is believed that the coating performance improvement at least in part is likely related to its improved uniform film formation on the rubber substrate and the improved sag resistance of its applied coating film.

TABLE XVIII

Horiba LLS Particle Size Properties* for Talc + FL4520 PDM Dispersions

| Test Dispersions Talc + FL4520 PDM Dispersions @ % NV solids target | Mean Particle Size | | Median D50 Particle Size | | D90 Particle Size Microns | Resulting Particle Description |
|---|---|---|---|---|---|---|
| | Microns | % Increase vs. Control | Microns | % Increase vs. Control | | |
| Formula L; Talc Disp. - no PDM @ 52.25% NV solids; control | 9.73 | — | 8.80 | — | 17.91 | Fully Dispersed |
| Formula M; (Talc + PDM) Disp. @ 52.45% NV solids | 14.05 | 44.4% | 9.84 | 11.8% | 25.17 | Micro-Flocculated |
| Formula P; (Talc + PDM) Disp. @ 4.0% NV solids | 11.47 | 17.9% | 10.08 | 14.5% | 20.73 | Micro-Flocculated |

Note:
*The dispersions were analyzed for their particle size distribution properties using a Horiba LA-300 laser light-scattering particle size analyzer. Each concentrate was analyzed after their subsequent dilution to 4% NV solids in accordance with their respective dip slurries shown in Table XVII.

The anti-tack performance benefits of Formula M should also be contrasted to the performance of the talc+PDM dispersion that was produced directly at 4% NV solids content (Formula P). The Formula P dispersion which was produced directly at 4% solids yielded significantly reduced anti-tack coating performance as compared to the inventive dispersion (Formula M). However, as shown in Table XVIII, the mean particle size increase associated with the Formula P dispersion was only 17.9% (as compared to 44.4% for Formula M). While the particle size change for Formula P does reflect the creation of some micro-flocculation the smaller increase in mean particle size is apparently insufficient to yield improvements in anti-tack coating performance versus the Formula L control dispersion which contained no PDM. Another contributing factor with respect to Formula P's performance could be the potentially reduced uniformity of PDM polymer distribution within the dispersion. Producing the talc+PDM dispersions directly at a low solids content imparts a lot less mix shear to the formulation which may influence polymer distribution and the resultant structure of the resultant particle aggregates.

Since the anti-tack coating performance of Formula P is no better than the talc dispersion that utilized no PDM (Formula L) there is no incentive for one to consider using a PDM additive if a low solids content, ready to use dispersion is to be produced directly. The anti-tack performance data presented in Table XVII also demonstrate that producing talc+PDM dispersion concentrates at even 15% and 10% NV solids contents, which are subsequently diluted to 4% for dip testing, still caused deleterious effects on anti-tack coating performance as compared to the inventive dispersion of Formula M. In summary, this test data shows that end-use, anti-tack coating performance for the dip slurry is very dependent on the original NV solids content at which the talc+PDM dispersion concentrate was initially produced.

Example 6

A talc+PDM dispersion was produced that was analogous to the dispersion produced in Formula M of Example 5 except that the SAS-3 Talc component was completely replaced with a finer particle size talc grade called FlexTalc 815. FlexTalc 815 (FT815) is a jet milled talc having a reported Cilas median particle size of 2 microns. Except for this talc change, all other ingredient components and the dispersion process steps employed remained exactly the same as those outlined in Table XVI-A for the Formula M dispersion. The new talc+PDM dispersion employing FlexTalc 815 (FT815) and FlexTalc 610 (FT610) plus Floquat FL 4520 as the PDM additive is hereby designated as Formula Q. Its initial and aged QC properties are summarized below in Table XIX. Review of its Brookfield Viscosity properties indicates this talc+PDM dispersion ages out too high in Brookfield viscosity relative to the viscosity requirements previously defined in the detailed description of the invention section. This example therefore highlights the importance of particle size selection when employing mineral pigments even when their CEC value is moderate. Using too much fine particle size talc in the talc+PDM dispersion can be deleterious to its final viscosity properties which consequently impacts its storage stability and pumpability properties. However, it should be noted that, through additional experimentation, the resultant aged viscosity of this formulation can be lowered to an acceptable value by either reducing the targeted NV solids content of the dispersion recipe and/or by reducing the PDM polymer dosage that is employed. However, it is desirable that the NV solids content of the dispersion be maintained above 45%. Given the noted issues with using too much fine particle size talc in the inventive talc+PDM dispersions a lower limit median particle size of about 0.5 microns is preferred for use even when such an ultrafine fine particle size talc would be employed as the secondary pigment for blending purposes in lower content quantities versus the primary talc pigment.

Another new talc+PDM dispersion is shown in Table XIX as Formula R. This dispersion is the same as the one for Formula Q except that the PolyDADMAC solution, Floquat FL 4520, has been replaced with a lower Mw grade of Floquat called Floquat FL 4420 (see Table XV for its comparative polymer properties). The initial and aged QC properties for the Formula R dispersion are summarized in Table XIX. Review of its Brookfield Viscosity properties indicates this talc+PDM dispersion ages out even higher in Brookfield viscosity than the Formula Q dispersion. This example therefore highlights the importance of Mw selection when choosing a PolyDADMAC polymer to employ. The results associated with the Formula R dispersion also indicate that mineral factors (particle size) and chemistry factors (polymer Mw) can compound each other relative to their effects on the dispersion's finished viscosity properties. The criticality of these dependent factors relative to each other make producing the inventive dispersions non-trivial. However, it should be noted that through experimentation the resultant aged viscosity of this formulation can be potentially lowered by reducing the targeted NV solids content of the dispersion recipe and/or by selecting alternative Talc pigmentation for use that have a lower CEC value. Nevertheless, it is still desirable that the NV solids content of the dispersion be maintained above 45%.

The anti-tack coating performance of the Formula Q and Formula R dispersions as slab dip slurries were not determined in this instance since their aged Brookfield viscosity properties were found to be unacceptable relative to the storage and pumpability requirements previously defined.

tale, some minor changes in the nonionic surfactant package were also made. Portions of the original Ethal TDA-5 surfactant have been changed to a combination of Ethox 1449 (a PO/EO Decyl Alcohol Alkoxylate) and Ethox 2938 (a POE Styrenated Pheny Ether). The Ethox 1449 is a low foam, nonionic surfactant because of its PO/EO content and helps to provide some defoaming properties in the low solids dip slurry because of its low cloud point temperature (about 19° C.). The Ethox 2938 is another nonionic surfactant that is a good wetting agent for the CaSt pigmentation and thus helps to mitigate the formation of dense micro-foams containing small unwetted particles of CaSt.

Complete formulary and addition step details associated with the inventive talc/CaSt+PDM dispersion produced at about 52% total NV solids content (whereby Floquat 4520 was again employed as the PDM) are detailed below in Table XX-A. This new talc/CaSt+PDM dispersion formulation, hereafter designated as Formula T, was produced using a single shaft, high shear Cowles disperser unit. Standard QC properties for the Formula T test batch are summarized in Table XX-B. The total NV % solids content of the batch that was experimentally determined from the use of an AND MF-50 moisture analyzer unit was 52.25% by weight. It should be noted that the active PDM polymer level present in the total formulation is 0.0929% by weight. When calculated on a total "solid pigments" basis, the active PDM dosage level added on total solid pigment is 0.1957%

TABLE XIX

Batch QC Properties for Other Talc + PDM Dispersions

| Expt. # | NV Solids Content, Wt. % | Specific Gravity @ 25° C. | Initial Batch Properties | Properties after 1 Week Aging | Properties after 2 Weeks Aging |
|---|---|---|---|---|---|
| Formula Q; using FT815/FT610 + PDM (FL 4520) Combination | 52.50 | 1.2711 | BF (Spindle #91) 2 rpm = 13,400 cps 20 rpm = 3,580 cps; pH = 9.71 @ 25° C. | BF (Spindle #93) 2 rpm = 165,000 cps 20 rpm = 30,450 cps; pH = 9.48 @ 25° C. | BF (Spindle #94) 2 rpm = 261,000 cps 20 rpm = 44,700 cps; pH = 9.31 @ 25° C. |
| Formula R; using FT815/FT610 + PDM (FL 4420) Combination | 52.50 | 1.2636 | BF (Spindle #91) 2 rpm = 20,300 cps 20 rpm = 5,720 cps; pH = 9.83 @ 25° C. | BF (Spindle #94) 2 rpm = 344,000 cps 20 rpm = 58,100 cps; pH = 9.39 @ 25° C. | BF (Spindle #94) 2 rpm = 470,000 cps 20 rpm = 74,600 cps; pH = 9.18 @ 25° C. |

Example 7

The micro-flocculated talc dispersions produced in this example are closely related to those produced in Example 5 except that a portion of the talc pigmentation has been replaced with a 200 mesh, fusion grade calcium stearate (CaSt) pigment called Baerolub S-VSA200. According to the manufacturer, Baerlocher USA, the S-VSA200 CaSt has a reported median particle size of about 21 microns as measured by a Microtrac Particle Size analyzer. About 14.8% by wt. of the SAS-3 talc content was replaced with CaSt pigment while the FlexTalc 610 content was increased slightly by 5.9% by weight. The weight ratio of total talc pigment content (SAS-3+FT610) to CaSt pigment content was therefore 7.55:1 by weight. To better accommodate the use of the CaSt pigment in the micro-flocculated talc dispersion, given the difference in its surface chemistry versus by weight (where the "solid pigments" utilized in this anti-talc formulation are talc, sepiolite, fumed silica and calcium stearate). In comparing the active PDM dosages in the formulation of Table XVI-B (per Formula M) versus those in Table XX-B (per Formula T), one will note the PDM levels on total formulation weight and on total "solid pigments" basis are very similar in magnitude for these two high solids content dispersions. However, in the present talc/CaSt+PDM example, since a portion of the talc pigmentation has been replaced with CaSt pigment, this effectively increases the relative active dosage of PDM on a total talc basis to 0.2225% by weight of dry talc. This increase suggests one might expect to see some differences in the degree of talc particle aggregation in the talc/CaSt+PDM dispersion per Formula T versus the pigment flocculation levels previously seen in the talc+PDM dispersion per Formula M of Example 5.

TABLE XX - A

Process Addition Steps & Formulation for Talc/CaSt + PolyDADMAC Dispersion Using Floquat FL 4520 (Formula T)

| Step # | Raw Material Name | Raw Material Activity | Ingredient Amount, g | % Raw Material in Finished Batch |
|---|---|---|---|---|
| 1 | Soft Neutral Water @ 25° C. | 0.000 | 1695.00 | 46.85% |
| 2 | Dazomet Biocide/BCS 3243 | 0.240 | 2.70 | 0.07% |
| 3 | SNF Floquat FL 4520, 20% active PolyDADMAC solution | 0.200 | 16.80 | 0.46% |
| 4 | SURFYNOL 440 Surfactant, Evonik | 1.000 | 0.40 | 0.01% |
| 5 | PANGEL W, Sepiolite, Tolsa Group | 0.950 | 3.60 | 0.10% |
| 6 | Munzing DEEFO 3010A, Oil Based Defoamer | 1.000 | 5.50 | 0.15% |
| 7 | Valpro 92 SFG, Na Tallowate Soap Powder, Vanguard | 0.920 | 39.00 | 1.08% |
| 8 | ETHAL TDA-5, 5EO Tridecyl Alcohol, HLB = 10.6, Ethox Chemicals | 1.000 | 5.40 | 0.15% |
| 9 | Cimbar Talc SAS-3; Cilas mps = 3 μm | 0.990 | 400.00 | 11.06% |
| 10 | Baerolub S-VSA200 Calcium Stearate, Baerlocher | 1.000 | 50.00 | 1.38% |
| 11 | ValPro 59, Na Cocoate/Na Vegate Soap Flakes, Vanguard | 0.960 | 3.00 | 0.08% |
| 12 | ETHOX 1449, PO/EO Decyl Alcohol Alkoxylate, Ethox Chemicals | 1.000 | 2.00 | 0.06% |
| 13 | ETHAL TDA-5, 5EO Tridecyl Alcohol, HLB = 10.6, Ethox Chemicals | 1.000 | 2.80 | 0.08% |
| 14 | Konasil 200, 200 m2/g fumed silica | 1.000 | 9.00 | 0.25% |
| 15 | Cimbar Talc SAS-3; Cilas mps = 3 μm | 0.990 | 400.00 | 11.06% |
| 16 | Baerolub S-VSA200 Calcium Stearate, Baerlocher | 1.000 | 50.00 | 1.38% |
| 17 | ValPro 59 Na Cocoate/Na Vegate Soap Flakes (Vanguard) | 0.960 | 3.00 | 0.08% |
| 18 | ETHOX 1449, PO/EO Decyl Alcohol Alkoxylate, Ethox Chemicals | 1.000 | 3.00 | 0.08% |
| 19 | ETHAL TDA-5, 5EO Tridecyl Alcohol, HLB = 10.6, Ethox Chemicals | 1.000 | 2.80 | 0.08% |
| 20 | Cimbar Talc SAS-3; Cilas mps = 3 μm | 0.990 | 250.00 | 6.91% |
| 21 | Baerolub S-VSA200 Calcium Stearate, Baerlocher | 1.000 | 100.00 | 2.76% |
| 22 | ValPro 59 Na Cocoate/Na Vegate Soap Flakes (Vanguard) | 0.960 | 9.00 | 0.25% |
| 23 | ETHOX 1449, PO/EO Decyl Alcohol Alkoxylate, Ethox Chemicals | 1.000 | 3.00 | 0.08% |
| 24 | ETHAL TDA-5, 5EO Tridecyl Alcohol, HLB = 10.6, Ethox Chemicals | 1.000 | 10.60 | 0.29% |
| 25 | Cimbar FlexTalc 610; Cilas mps = 1 μm | 0.990 | 150.00 | 4.15% |
| 26 | n-Butyl Stearate (@ 35° C.), Custom Synthesis | 0.990 | 7.20 | 0.20% |
| 27 | ValPro 59 Na Cocoate/Na Vegate Soap Flakes (Vanguard) | 0.960 | 6.00 | 0.17% |
| 28 | ETHAL TDA-5, 5EO Tridecyl Alcohol, HLB = 10.6, Ethox Chemicals | 1.000 | 10.40 | 0.29% |
| 29 | Cimbar FlexTalc 610; Cilas mps = 1 μm | 0.990 | 120.00 | 3.32% |
| 30 | ValPro 59 Na Cocoate/Na Vegate Soap Flakes (Vanguard) | 0.960 | 3.00 | 0.08% |
| 31 | ETHAL TDA-5, 5EO Tridecyl Alcohol, HLB = 10.6, Ethox Chemicals | 1.000 | 12.40 | 0.34% |
| 32 | Cimbar FlexTalc 610; Cilas mps = 1 μm | 0.990 | 90.00 | 2.49% |
| 33 | Cimbar Talc SAS-3; Cilas mps = 3 μm | 0.990 | 100.00 | 2.76% |
| 34 | ValPro 59 Na Cocoate/Na Vegate Soap Flakes (Vanguard) | 0.960 | 3.60 | 0.10% |
| 35 | Glutaraldehyde Biocide, BCS 3502A | 0.5000 | 2.20 | 0.06% |
| 36 | Konasil 200, 200 m2/g fumed silica | 1.000 | 10.00 | 0.28% |
| 37 | Add Defoamer/Surfactants/Xanthan Gum PreBlend Below: | | | |
| a) | PhosFlex 4, Tributylphosphate Defoamer | 1.000 | 7.20 | 0.20% |
| b) | ETHAL TDA-5, 5EO Tridecyl Alcohol, HLB = 10.6, Ethox Chemicals | 1.000 | 13.20 | 0.36% |
| c) | ETHOX 2938, POE Styrenated Phenyl Ether, Ethox Chemicals | 1.000 | 3.00 | 0.08% |
| d) | Xanthan Gum | 1.000 | 7.40 | 0.20% |
| 38 | Munzing DEEFO 3010A, Oil Based Defoamer | 1.000 | 5.50 | 0.15% |
| 39 | Adjust final pH to pH 9.60-9.80 using either 22.5% Potassium Hydroxide or 2-Ethylhexanoic Acid as needed. | | | |
| | Total= | | 3617.7 | 100.0% |

TABLE XX - B

QC Test Properties for Dispersion Formula T

Batch Properties for Talc/CaSt + PDM Dispersion*

| | |
|---|---|
| Initial Brookfield Visc. (Sp #91 & 25° C.), cps | @ 2 rpm = 13,300; @ 20 rpm = 3,070 |
| Specific Gravity (a) 25° C. | 1.1858 |
| pH @ 25° C. | 9.61 |
| Conductivity @ 25° C., mS/cm | 2.39 |
| Calculated NV Solids Content, Wt. % | 52.15 |
| Measured NV Solids Content, Wt. % | 52.25 |
| Total Solid Pigments* Content, Wt. % | 47.47 |
| Active PDM Polymer Dosage on Total Formulation, Wt. % | 0.0929 |
| Active PDM Polymer Dosage Level on Total Solid Pigments Basis, Wt. % | 0.1957 |
| Active PDM Polymer Dosage Level on Total Dry Talc Basis, Wt. % | 0.2225 |
| Wt. % of Active PDM Polymer when Dispersion Concentrate is Subsequently Diluted into Dip Slurry of 4% Total NV Solids Content | 0.0071 |

Note:
*For calculation purposes the "Solid Pigments" in the formula include all the silicate mineral pigments (Talc and Sepiolite), the synthetic Fumed Silica plus the Calcium Stearate.

The high solids talc/CaSt+PDM dispersion per Formula T whose composition is outlined in Table XX-A is further characterized in Table XXI, which provides a testing summary of the inventive dispersion's concentrate properties and its dip slurry performance properties after subsequent dilution to 4% NV solids content. The high solids Formula T dispersion yielded a 2-week aged, Brookfield 2 rpm Viscosity of 146,000 cps which is within the aged viscosity requirements previously defined for these high solids, anti-tack formulations to insure their stability and pumpability. In contrast, the same base formulation of talc and CaSt produced without the addition of any PDM (labeled as Formula S in Table XXI) yielded a moderately higher 2-week aged, Brookfield 2 rpm Viscosity of 169,000 cps. So, in this instance adding some PDM in dispersion Formula T surprisingly decreased the aged viscosity properties of the dispersion.

Also presented in Table XXI are additional experiments whereby equivalent talc/CaSt+PDM dispersion formulations were produced with the exception that their targeted total, % NV solids contents were lower. Like dispersion Formula T, they were also produced using a high-shear, Cowles dispersion process but the original formulation (as detailed in Table XX-A) was merely reduced in total NV solids content by adding additional starting batch water to the recipe. The targeted % NV solids content associated with these additional talc/CaSt+PDM dispersion experiments were about 15%, 10% and 4% by weight and they have been labeled as dispersion Formulas T1, T2 and T3, respectively, in Table XXI. These dispersion batches were characterized and subsequently allowed to age to monitor their viscosity and stability properties which are reported in the concentrate section of Table XXI. As seen in Table XXI these lower solids content dispersion batches were not stable long term with respect to static settling of their pigmentation and they had to be re-agitated prior to converting them into slab dip slurries for application use.

After characterization of the concentrates, portions of the talc/CaSt+PDM based dispersion formulations were diluted under low shear agitation with additional water as needed to bring their final NV solids content to 4.0% for dip slurry application testing. The viscosity and foam properties for each 4.0% dilution slurry are summarized in Table XXI. Furthermore, their respective dip coating performance properties as anti-tack slurries are summarized there. With respect to the anti-tack testing protocol employed this remained the same as in Example 5. Once again, a typical tire tread compound employing a NR/BR polymer blend was utilized in the dip coating and anti-tack testing assessment. As before an ant-tack rating scale of 0 to 6 was utilized to quantify anti-tack performance differences.

TABLE XXI

Talc/CaSt + FL4520 PDM Dispersions - Properties and Dip Slurry Performance (Dispersion Formulas S, T, T1, T2 and T3)

| | | Dispersion Concentrate Properties | | | Dip Slurry Testing Properties of 4% Solids Dilution | | | |
|---|---|---|---|---|---|---|---|---|
| | | | | | Viscosity & Foam | | For Tire Tread Cap | |
| Talc/CaSt + PDM Test Disp.* @ % NV solids target | pH @ 25° C. | Initial BF Visc., cps @ rpm & spindle # | | 2-Week Aged BF Visc., cps @ rpm & spindle # | BF Visc. of 4% Dilution, cps @ rpm & spindle # | Foam Height Properties of 4% Dip Slurry** | Description of Applied Dip Coating & Drying Time | Anti-Tack Rating of Coating: 0 → 6 Scale |
| Formula S; T/C Disp. - no PDM @ 52.5% NV solids; control | 9.87 | BF = 12,100 cps; (2 rpm, Sp#91) | | BF = 169,000 cps; (2 rpm, Sp#93) | BF = 17 cps; (100 rpm, Sp#2) | Initial = 40 mm; 10 min. = 10 mm; 20 min. = 7 mm | Non-uniform, Splotchy Coating; (Drying Time = 1.0 min.) | 3 |
| Formula T; (T/C + PDM) Disp. @ 52.25% NV solids | 9.61 | BF = 13,300 cps; (2 rpm, Sp#91) | | BF = 146,000 cps; (2 rpm, Sp#93) | BF = 18 cps; (100 rpm, Sp#2) | Initial = 25 mm; 10 min. = 3 mm; 20 min. = 3 mm | Heavy, Uniform Continuous Film; (Drying Time = 1.0 min.) | 5 |
| Formula T1; (T/C + PDM) Disp. @ 15.05% NV solids | 9.63 | BF = 1,300 cps; (2 rpm, Sp#91) | | N.A.; batch settled within 1 week | BF = 20 cps; (100 rpm, Sp#2) | Initial = 20 mm; 10 min. = 4 mm; 20 min. = 4 mm | Grainy, Reticulated Coating; (Drying Time = 1.0 min.) | 4 |

TABLE XXI-continued

Talc/CaSt + FL4520 PDM Dispersions - Properties and Dip Slurry Performance (Dispersion Formulas S, T, T1, T2 and T3)

| Talc/CaSt + PDM Test Disp.* @ % NV solids target | pH @ 25° C. | Dispersion Concentrate Properties | | Dip Slurry Testing Properties of 4% Solids Dilution | | | |
|---|---|---|---|---|---|---|---|
| | | | | Viscosity & Foam | | For Tire Tread Cap | |
| | | Initial BF Visc., cps @ rpm & spindle # | 2-Week Aged BF Visc., cps @ rpm & spindle # | BF Visc. of 4% Dilution, cps @ rpm & spindle # | Foam Height Properties of 4% Dip Slurry** | Description of Applied Dip Coating & Drying Time | Anti-Tack Rating of Coating: 0 → 6 Scale |
| Expt. T2; (T/C + PDM) Disp. @ 10.05% NV solids | 9.60 | BF = 900 cps; (2 rpm, Sp#91) | N.A.; batch settled within 3 days | BF = 18 cps; (100 rpm, Sp#2) | Initial = 20 mm; 10 min. = 4 mm; 20 min. = 4 mm | Grainy, Reticulated Coating; (Drying Time = 1.0 min.) | 4 |
| Expt. T3; (T/C + PDM) Disp. @ 4.0% NV solids | 9.63 | BF = 21 cps; (100 rpm, Sp#2) | N.A.; batch settled within 1 day | BF = 21 cps; (100 rpm, Sp#2) | Initial = 23 mm; 10 min. = 4 mm; 20 min. = 4 mm | Moderately Uniform Lighter Coating; (Drying Time = 45 sec.) | 3.5 |

Note:
*The Talc/CaSt + PDM dispersions were all made using the PDM additive at the same active dosage level of 0.1957 wt. % on a total "solid pigments" basis. The "Solid Pigments" in the formula include all the silicate mineral pigments (Talc & Sepiolite), the synthetic Fumed Silica plus the Calcium Stearate. The dispersions were characterized at their targeted NV % solids content and then subsequently diluted to 4% NV solids for evaluation of their dip slurry performance properties.
**Foam height testing was conducted in accordance with the modified testing protocol outlined in Example 5 employing a pair of 1 liter Nalgene PMP beakers.

In reviewing the dip slurry performance data presented in Table XXI, one will note that the inventive talc/CaSt+PDM dispersion per Formula T yielded advantages in dip slurry properties and anti-tack coating performance when slab dip tested at 4% NV solids content. As compared to the base dispersion formulation with no PDM additive (Formula S), the inventive talc/CaSt+PDM dispersion (Formula T) had improved initial foam and dissipation rate foam properties when they were comparatively evaluated at 4% NV solids content. Furthermore, the inventive talc/CaSt+PDM dispersion (Formula T) yielded the most uniform dip coating film and the best anti-tack performance on the tire tread compound when applied as a 4% solids dip slurry. The improvement in anti-tack coating performance with PDM versus without PDM addition (Formula T versus Formula S, respectively) can be attributed to the resultant micro-flocculated particle aggregate structure that is created which is reflected by the mean particle size change shown in Table XXII. The addition of PDM cationic polymer, per the dispersion of Formula T, resulted in a notable increase in mean particle size of 35.3% (as compared to the mean value of dispersion Formula S). While the mechanism of anti-tack coating improvement arising from Talc particle micro-flocculation, as it relates to the Formula T dispersion, was unexpected and is not completely understood, it is believed that the coating performance improvement at least in part is likely related to its more uniform film formation on the rubber substrate and the improved sag resistance of its applied coating film. Improved sag resistance translates to more coating film remaining on the surface of the coated rubber slab rather the waterborne formulation draining off during the dip coating process.

TABLE XXII

Horiba LLS Particle Size Properties for Talc/CaSt + FL4S20 PDM Dispersions (Dispersion Formulas S, T, T1, T2 and T3)

| Test Dispersions* Talc/CaSt + PDM Dispersions @ % NV solids target | Mean Particle Size | | Median D50 Particle Size | | D90 Particle Size Microns | Resulting Particle Description |
|---|---|---|---|---|---|---|
| | Microns | % Increase vs. Control | Microns | % Increase vs. Control | | |
| Formula S; T/C Disp. - no PDM @ 52.5% NV solids; control | 9.759 | — | 8.612 | — | 18.527 | Fully Dispersed |
| Formula T; (T/C + PDM) Disp. @ | 13.204 | 35.3% | 11.184 | 29.9% | 24.971 | Micro-Flocculated |

TABLE XXII-continued

Horiba LLS Particle Size Properties for Talc/CaSt + FL4S20
PDM Dispersions (Dispersion Formulas S, T, T1, T2 and T3)

| Test Dispersions* Talc/CaSt + PDM Dispersions @ % NV solids target | Mean Particle Size | | Median D50 Particle Size | | D90 Particle Size Microns | Resulting Particle Description |
|---|---|---|---|---|---|---|
| | Microns | % Increase vs. Control | Microns | % Increase vs. Control | | |
| 52.25% NV solids | | | | | | |
| Formula T1; (T/C + PDM) Disp. @ 15.0% NV solids | 11.988 | 22.8% | 10.077 | 17.0% | 22.342 | Micro-Flocculated |
| Formula T2; (T/C + PDM) Disp. @ 10.0% NV solids | 11.318 | 16.0% | 9.722 | 12.9% | 20.792 | Micro-Flocculated |
| Formula T3; (T/C + PDM) Disp. @ 4.0% NV solids | 11.171 | 14.5% | 9.361 | 8.7% | 21.173 | Micro-Flocculated |

Note:
*The dispersions were analyzed for their particle size distribution properties using a Horiba LA-300 laser light-scattering particle size analyzer. Each dispersion concentrate was analyzed via the Horiba after their subsequent dilution to 4% NV solids in accordance with their respective dip slurries in Table XXI.

The anti-tack performance benefits of dispersion Formula T should also be contrasted to the performance of the talc/CaSt+PDM dispersion that was produced directly at 4% NV solids content (dispersion Formula T3). The talc/CaSt+PDM dispersion produced directly at 4% solids yielded significantly reduced anti-tack coating performance as compared to the inventive dispersion (Formula T). The slab dip slurry of dispersion Formula T yielded an anti-tack rating of 5 whereas an anti-tack rating value of 3.5 was obtained when the dispersion of Formula T3 was dip coated. However, as shown in Table XXII, the mean particle size increase associated with the Formula T3 dispersion was only 14.5% (as compared to 35.3% for the Formula T dispersion). The complete Horiba LLS particle size distribution curves for the Formula S, Formula T, and the Formula T3 dispersions are overlay plotted in FIG. 4 for comparison. Inspection of FIG. 4 graphically shows the minimal change in overall particle size distribution (versus the no PDM control) when a talc/CaSt+PDM dispersion is produced at a low NV solids content like 4%. While the particle size change for the Formula T3 dispersion does reflect the creation of some micro-flocculation, the smaller increase in mean particle size is apparently insufficient to yield notable improvements in anti-tack performance versus the Formula S control dispersion which contained no PDM. Another contributing factor with respect to the low performance of the Formula T3 dispersion might the uniformity of PDM polymer distribution within the particle dispersion. Producing the talc/CaSt+PDM dispersions directly at low solids content imparts a lot less mix shear to the formulation which can influence the size and structure of the resultant particle aggregates.

Since the anti-tack coating performance of the Formula T3 dispersion is only marginally better than the talc/CaSt dispersion that utilized no PDM (Formula S), there is no incentive for one to consider using a PDM additive if a low solids content, ready to use talc/CaSt based dispersion is to be produced directly. The anti-tack performance data presented in Table XXI also demonstrate that producing talc/CaSt+PDM dispersion concentrates at even 15% and 10% NV solids contents (per Formulas T1 and T2, respectively) which are subsequently diluted to 4% NV solids for dip testing, still caused deleterious effects on the anti-tack coating performance as compared to the inventive dispersion of Formula T. In summary, this test data shows that end-use, anti-tack coating performance is very dependent on the original solids content at which the talc/CaSt+PDM dispersion concentrate was initially produced.

Finally, it should be noted that the main technical motivation for replacing a small portion of the talc pigmentation with a CaSt pigment in the inventive dispersions is to further boost their anti-tack coating performance particularly on butyl rubber compounds. Metallic stearate pigments, such calcium stearate, magnesium stearate and zinc stearate, are known to yield excellent anti-tack properties. Their use as anti-tack additives in the powder compositions previously disclosed in the Oka prior art is, for example, well documented. However, the key to using metallic stearates in the anti-tack formulations of this invention was how best to incorporate them when producing such high solids content dispersions. The notable challenges associated with forming stable, water-borne suspensions of metallic stearates is discussed in the publication of Jin-Bae Lee, et. al. entitled "Anti-Tacking Properties of Zinc Stearate Emulsion for CMB Rubber Sheet Prepared by Heat Treatment Process"; World J. of Textile Engineering and Technology, 5, 2019, pp. 84-90. The stable talc/CaSt+PDM dispersion of Formula T successfully addresses this noted technical challenge. Furthermore, when comparing the anti-tack coating performance of Formula M (the talc+PDM dispersion) to that of formula T (the Talc/CaSt+PDM dispersion) the anti-tack rating on a NR/BR based tire tread compound was improved from 4.5 to 5. The same magnitude of anti-tack performance improvement was seen when comparatively coating butyl inner liner compounds that are utilized in passenger and truck tires. Butyl compounds are frequently difficult to coat and very sticky, so this added anti-tack improvement on butyl rubber is particularly important and expands the overall anti-tack utility of the inventive dispersions.

Example 8

This example is aimed at demonstrating the importance that silicate mineral CEC value has on resultant particle aggregate size when polycationic polymers like PDM are employed to produce mineral particle+PDM dispersions in formulations being targeted for use in anti-tack coatings that are to be applied to uncured rubber compounds. This mineral property is important to understand as anti-tack formulations designed for rubber slab use commonly utilize high CEC materials like smectite clays (particularly bentonite). A good example to demonstrate the effect of mineral CEC value are the high smectite content, anti-tack powders previously disclosed by Oka in EP3434719 A1 and in WO 2019/044831 A1. The Oka anti-tack powder formulations contain at least 10% smectite clay content and the powders are subsequently dispersed into water Substitute Specification (clean copy) 12160-000CP for slab dip application use at solids contents of 0.5-10.0%. A commercial example of an Oka like anti-tack formulation are the family of anti-tack powder products produced by Polymer Solutions Group under the Alkon tradename. The generic composition of a representative Oka-like Alkon product being used in the rubber industry is shown in Table XXIII-A and for discussion purposes has been labeled as the Alkon Control Powder (Formula U).

TABLE XXIII - A

Anti-tack Powder Formulas (with & without PDM)

| Chemical Component | Alkon Control Powder, Formula U, g | Alkon + PDM Powder Formula V, g | Alkon + PDM Powder Formula W, g | Alkon + PDM Powder Formula X, g | Alkon + PDM Powder Formula Y, g | Alkon + PDM Powder Formula Z, g |
|---|---|---|---|---|---|---|
| Na,Ca-Bentonite Clay | 415.0 | 415.0 | 415.0 | 415.0 | 415.0 | 415.0 |
| Moisture (adsorbed water) | 45.0 | 45.0 | 45.0 | 45.0 | 45.0 | 45.0 |
| Metallic Stearate | 310.0 | 310.0 | 310.0 | 310.0 | 310.0 | 310.0 |
| Sodium Carbonate | 20.0 | 20.0 | 20.0 | 20.0 | 20.0 | 20.0 |
| Kaolin Clay | 150.0 | 150.0 | 150.0 | 150.0 | 150.0 | 150.0 |
| 75% active Anionic Surfactant Solution in Propylene Glycol | 20.0 | 20.0 | 20.0 | 20.0 | 20.0 | 20.0 |
| Liquid Nonionic Surfactant Blend of Alcohol Ethoxylates | 20.0 | 20.0 | 20.0 | 20.0 | 20.0 | 20.0 |
| Liquid Anti-Foam Agent (Fatty Ester Based) | 20.0 | 20.0 | 20.0 | 20.0 | 20.0 | 20.0 |
| PolyDADMAC, 92% active Bead Form Powder (Shandong LYBP 002)** | | 1.82 | 3.60 | 5.50 | 7.30 | 9.10 |
| Total = | 1,000.0 g | 1,001.82 g | 1,003.60 g | 1,005.50 g | 1,007.30 g | 1,009.10 g |
| Active PDM Polymer Level in Total Formulation, Wt. % | 0.0 | 0.1671 | 0.3300 | 0.5032 | 0.6667 | 0.8296 |
| Active PDM Polymer Level on Total Solid Pigments* Basis, Wt. % | 0.0 | 0.1914 | 0.3785 | 0.5783 | 0.7675 | 0.9568 |
| Wt. % Conc. of PDM Polymer when Powder is Transformed into Dip Slurry of 2% Total NV Solids Content | 0.0 | 0.0035 | 0.0069 | 0.0105 | 0.0140 | 0.0174 |

Note:
*For calculation purposes, the "solid pigments" in this formulation comprises the sum of the Na,Ca-Bentonite, Metallic Stearate and Kaolin Clay components. They are all categorized herein as pigments because they are particulate materials that are insoluble in water.
**Published typical properties for Shandong, Luyue Chemical's, dry PolyDADMAC Bead product grade LYBP 002 are Solids Content ≥88%, Particle Size 0.15-0.85 mm, Intrinsic Viscosity <1.2 dl/g and a rotary viscosity ≤200 cps at a concentration of 10% in water.

In Table XXIII-A, the Na,Ca-bentonite clay that is used in the various Alkon powder formulations has a CEC value of 22 meq/100 g and the kaolin clay component has a CEC value of 0.4 meq/100 g as determined by the Compulsive Exchange Method of Gillman & Sumpter. The content level of Na,Ca-Bentonite that is employed in the control powder formulation (Formula U) is 41.5% by weight and the kaolin clay component is employed in the control anti-tack powder formulation at a content level of 15.0% by weight. The typical physical properties of the Alkon anti-tack control powder (Formula U) are summarized below in Table XXIII-B.

TABLE XXIII - B

Typical Properties for the Anti-Tack Powder Control (Formula U)

| Property | Value or Characteristic |
|---|---|
| Physical Form (20° C.) | Off-White Powder |
| Non-Volatile Solids, wt. % | 95.5% ± 2.0% |
| pH (3% aqueous dispersion) | 9.5-11.5 |
| Solubility | Dispersible in Water |
| Ash Content (850° C., 4 hours) | 53-58% |

Relative to the five experimental Alkon dip powder formulations outlined in Table XXIII-A, the PolyDADMAC component (Shandong LYBP 002) is a dry Bead form of PDM having a Mw very similar to the PDM solution (Floquat FL 4520) that was used in the talc based, liquid dispersion formulas of Examples 5 and 7. The active PDM polymer dosage level being used in the experimental Alkon powder formulas (Formulas V, W, X, Y and Z) on a total solid pigments basis ranges from 0.1914% to 0.9568% by weight across this series of test powders. Relative to power Formula V, which has an active PDM polymer dosage of 0.1914% by weight on a total "solid pigments" basis, this dosage level is very similar to the corresponding PDM dosage level that was employed on the total solid pigments in the previous talc based dispersion Formulas M and T. The PDM dosage level used in the talc+PDM and talc/CaSt+PDM dispersions per Formulas M and T was 0.1978% and 0.1957% by weight, respectively, on a total "solid pigments" basis whereby those anti-tack dispersion formulations were based on using talc pigmentation having a CEC value of 6.3-6.6 meq/100 g. Given their similarity in PDM Mw and PDM dosage level on a solid pigments basis this enables comparisons of the relative degree of particle aggregation to be made between these various formulations.

While the prior art for high smectite content powder formulations, like the Alkon control powder (Formula U), discusses their potential for end applications use as anti-tacks at dispersed solids contents of 0.5%-10.0% it has been applicant's commercial experience that such anti-tack powders are more commonly used in making slab dip slurries for rubber slabs at NV solids contents of 1.8-2.5% by weight. At appreciably higher concentrations of slab dip slurry (like 4% solids and higher), the amount of anti-tack coating film that is applied to the rubber slab becomes too thick such that drying times for the applied coating film become unacceptable or unwanted residual moisture is left in the applied coating film. Leaving residual moisture trapped in the applied coating then leads to downstream quality issues with blisters commonly being formed in the rubber compound which arise from escaping steam as the anti-tack coated rubber is subsequently molded or extruded. For this reason, all slab dip coating evaluations on powder Formulas U through Z have hereafter been conducted at 2% dip slurry solids. When choosing an appropriate slab dip solids content to employ for a given anti-tack composition and given elastomeric compound that is to be coated, one needs to consider and carefully choose a % solids content that offers the best combination of dip slurry performance properties, which include:

a) stability of the pigment suspension (no hard pack settling);
b) foam properties (initial foam height and foam dissipation rate);
c) drying time of the applied anti-tack coating;
d) coat weight/film thickness as it relates to the anti-tack properties of the applied anti-tack coating and final rubber physical properties;
e) depletion rate of the anti-tack formulation which ultimately translates into a usage cost per square foot of rubber coated; and
f) transparency or opaqueness of the applied anti-tack coating.

The criticality of each of the above dip slurry considerations is hereby discussed with the understanding that the effects arising from some factors are not totally independent of each other and can even be diametrically opposed to one another. The importance of minimizing hard pack settling of pigmentation in the dip slurry tanks from the standpoint of minimizing product loss and reducing maintenance downtimes from cleanouts has been previously discussed. However, it should be noted here that pigment suspension properties can be significantly influenced by the total solids content of the dip slurry. In general, good pigment suspension becomes more challenging as the % NV solids content of the dip slurry is reduced because as the solids content is reduced the viscosity of the dip slurry becomes lower and the overall effectiveness of any associative thickeners or suspension aides is typically reduced. A low foam level in the dip tank system, or at least foam that dissipates quickly, is very desirable from the standpoint of minimizing foam pickup on the rubber slabs. Foam pickup on the dip coated slabs can result, upon drying, in the formation of crusty residues on the coated uncured rubber compound. These crusty residues can result in particulate contaminants that do not get well dispersed back into the finished compound when the anti-tack coated compound is subsequently compression molded or extruded into profiles which can result in imperfections in the finished product. Also, these crusty residues can often contain moisture underneath them and the subsequent evolution of this moisture, during the molding or extrusion process, as escaping steam can result in the formation of blisters. The applied coat weight/film thickness is directly related to some of the other factors. Sufficient dip coating needs to be applied to the rubber slab to achieve a desired level of anti-tack performance. Normally, the greater the coat weight that is applied to the rubber substrate the better the final anti-tack performance will be, but one normally reaches a point where the film thickness becomes so great that the applied coating dries too slowly. In most dip systems, the coated slabs have a defined amount of drying time available on the cooling racks with the assist of blown air. Insufficient drying leaves residual moisture content trapped in the applied coating which frequently translates to downstream quality issues with blisters being formed. A slow drying rate can also cause more back wiping of the coating off the backside of the coated rubber substrate thereby resulting in less uniform coating overage. The more anti-tack coating that is applied to the rubber, per square foot, the greater its depletion rate and the greater the end use application cost will become. Furthermore, the amount of anti-tack coating that is applied to the rubber substrate can affect the transparency or opaqueness of the resultant dried coating film. In some instances, customers want a more transparent coating film so that bar codes stenciled on the rubber can be seen or the compound is non-black and the customer doesn't want the base coloration of the compound to be diluted or obscured with white anti-tack coating. In other instances, where the compound is particularly sticky, a customer may want to see a somewhat opaque coating to ensure the elastomeric compound is being properly coated as a quick visual check to mitigate against any sticking issues. Lastly, the amount of anti-tack coating that is applied to the slab can also impact downstream finished rubber physical properties such as wire coat adhesion, Strebler adhesion, tensile, tear, etc., so using the minimum effective amount of anti-tack coating can be important to guard against causing any deterioration of rubber physical properties.

In Table XXIV, slab dip slurries of 2% NV solids content were produced from the Alkon powder Formulas U and V (which are the control containing no PDM and an experimental version employing a low level of added PDM, respectively). With respect to Formula V, the active dosage of PDM employed in the total powder formulation is 0.1671% by weight which translates to a PDM concentration level of just 0.0035% by weight in its liquid dip slurry of 2% NV solids content. The QC properties and slab dip performance properties for Formulas U and V as dispersions of 2.0% NV solids content were determined and are reported in Table XXIV. These two slab dip slurries had similar dip properties and they yielded equivalent anti-tack coating properties when applied to a NR/BR based tire tread cap compound (both were rated a 5). The anti-tack testing protocol is the same as previously discussed in earlier examples. So, in this instance, where the Alkon control powder (Formula U) and experimental Alkon powder (Formula V) were dispersed at a low, ready-to-use, NV solids content level of 2%, there was no performance advantage or disadvantage realized from adding the cationic polymer PDM as an additive hence one skilled in the art would not be technically motivated to use it. Given the degree of particle aggregation obtained in the 2% solids dispersion of Formula V (as evidenced by the 863% mean particle size increase noted from Horiba LLS particle size analysis; see particle size data summarized in Table XXV), it was somewhat surprising that no significant effects on dip slurry performance (good or bad) were noted. However, additional Horiba particle size and anti-tack coating performance data to be presented below do indicate that higher levels of particle aggregation (versus that observed in the 2% dispersion of Formula V) do have a deleterious effect on resultant dip slurry properties and ani-tack coating performance.

TABLE XXIV

Alkon Powder Dispersions at 2% NV Solids (Dispersion Formulas U and V)

| Alkon Powder Dispersions* @ 2% NV solids target | pH @ 25° C. | Dispersion Properties at 2% NV Solids | | Dip Slurry Testing Properties at 2% NV Solids For Tire Tread Cap | | |
|---|---|---|---|---|---|---|
| | | Initial BF Visc., cps @ rpm & spindle # | 24 Hour Aged BF Visc., cps @ rpm & spindle # | Dip Foam Foam Height Properties of 2% Dip Slurry** | Description of Applied Dip Coating & Drying Time | Anti-Tack Rating of Coating: 0 → 6 Scale |
| 2.0% solids Formula U Powder Disp. - no PDM | 10.28 | BF = 14 cps; (100 rpm, Sp#2) | BF = 15.6 cps; (100 rpm, Sp#2) | Initial = 16 mm; 10 min. = 6 mm 20 min. = 6 mm | Lightly Visible, Uniform Coating (Drying Time = 1.0 min.) | 5 |
| 2.0% solids Formula V Powder Disp. - with PDM | 10.35 | BF = 16.4 cps; (100 rpm, Sp#2) | BF = 20.4 cps; (100 rpm, Sp#2) | Initial = 17 mm; 10 min. = 8 mm; 20 min. = 8 mm | Lightly Visible, Uniform Coating (Drying Time = 1.25 min.) | 5 |

Note:
*The aqueous dispersions were made up directly at 2% NV solids content and subsequently tested as is without further dilution. The Non-Volatile (NV) Solids is defined as the total wt. % of all non-volatile substances in the formulation determined via the use of a halogen lamp based AND Model MF-50 Moisture Analyzer Balance at a temperature setting of 150° C.
**Foam height testing was conducted in accordance with the modified testing protocol outlined in Example 5 employing a pair of 1 liter Nalgene PMP beakers.

When producing low solids content slab dip slurries from anti-tack powder formulations, such as the Oka-like Alkon powders, it is often desirable in actual commercial practice to produce higher solids content master batches of product, which is later transferred to the respective dip tank systems and appropriately diluted down to the desired dip slurry application solids. In the following testing, as summarized in Tables XXV and XXVI, higher solids master batches of the experimental Alkon powder Formula V (which employs a low dosage level of PDM) were initially produced at NV solids content levels of 4.0%, 6.0%, 10.0% and 15.0%. by weight. These higher solids content dispersions of powder Formula V are hereafter designated as dispersion Formulas V1, V2, V3 and V4, respectively, in Table XXV. Solids content levels above 15%, while possible, were not examined because they are more difficult to readily produce via dispersion because of the high viscosity properties imparted to the master batch slurries by the high bentonite clay content. Each of the master batch slurries, per dispersion Formulas V1 through V4, were subsequently diluted back to 2.0% NV solids content and then analyzed for their particle size properties using a Horiba LA-300 particle size analyzer. Their particle size properties versus the particle size properties of the earlier batches of Alkon powder (Formulas U and V that were dispersed directly at 2.0% NV solids content) are summarized in Table XXV for comparison purposes.

In Table XXV the mean, the D50 and D90 particle sizes of each Alkon powder dispersion are reported as well as the relative % increase in the mean and median particle size values as compared to the Alkon powder control dispersion containing no PDM (Formula U). A review of this particle size data reveals some interesting points. First, all the Alkon powder dispersions which contained PDM (even the one dispersed directly at 2% solids content) yielded significant % increases in their mean particle sizes versus the control batch with no PDM. The % increases in mean particle size ranged from 86.3% to 347% as one proceeds through the series of powder Formula dispersions (from V to V4, respectively), which reflects significant degrees of particle aggregation arising from flocculation. The degree of particle aggregation observed with PDM addition, even at a low PDM dosage level, can therefore be classified as either moderately flocculated or macro flocculated mineral particle systems as compared to the micro-flocculated talc based dispersions. This higher degree of particle aggregation is a consequence of the high bentonite clay content as well as the finer particle size and higher CEC value of the bentonite clay component in the Alkon powder anti-tack formulations as compared to the coarser particle size and lower CEC properties of the talc pigmentation that is being used in the anti-tack formulation dispersions per Formula M and Formula T. The complete particle size distribution curves from Horiba LLS analysis for several of the Alkon powder dispersions (namely U, V, V2, V3 and V4) are overlay plotted in FIG. 5 for visual inspection. When comparing these particle size distribution curves, one can readily see the impact of employing a PDM polymer in this bentonite containing formulation as the fine particle material around 0.3 microns in particle diameter (which is the bentonite clay fraction) is consumed and transformed into new particulates (i.e., newly formed particle agglomerates) that are about 10-15 microns in particle diameter. Furthermore, comparison of the particle size distribution curves in FIG. 5 shows that additional increases in particle aggregate size occur as the master batch slurries containing PDM are produced at increasingly higher % NV solids contents. Finally, a comparison of the particle size distribution curves presented in FIG. 4 (for talc/CaSt+PDM dispersions) versus those presented in FIG. 5 (for Alkon+PDM dispersions) graphically show the far greater magnitude of particle agglomeration level being created with PDM addition in the bentonite containing Alkon powder formulation.

TABLE XXV

Horiba LLS Particle Size Properties for Alkon Powder Dispersions (Dispersion Formulas U, V, V1, V2, V3, and V4)

| Test Dispersions* Alkon Disp. at Target % NV Solids Content | Mean Particle Size Microns | % Increase vs. Control | Median D50 Particle Size Microns | % Increase vs. Control | D90 Particle Size Microns | Resulting Particle Description |
|---|---|---|---|---|---|---|
| 2.0% solids Formula U Powder Disp. - no PDM | 4.636 | | 1.790 | | 12.993 | Fully Dispersed |
| 2.0% solids Formula V Powder Disp. - with PDM | 8.638 | 86.3% | 6.028 | 237% | 20.672 | Moderately Flocculated |
| 4.0% solids Formula V1 Powder Disp. - with PDM | 9.824 | 112% | 6.035 | 237% | 24.642 | Moderately Flocculated |
| 6.0% solids Formula V2 Powder Disp. - with PDM | 12.689 | 174% | 6.455 | 261% | 32.779 | Macro Flocculated |
| 10.0% solids Formula V3 Powder Disp. - with PDM | 17.370 | 275% | 9.150 | 411% | 43.853 | Macro Flocculated |
| 15.0% solids Formula V4 Powder Disp. - with PDM | 20.734 | 347% | 16.434 | 818% | 47.383 | Macro Flocculated |

Note:
*The higher solids content master batch dispersions (V1 through V4) were all derived from Alkon powder Formula V. All test dispersions were then subsequently diluted back to 2% NV solids content as needed for Horiba particle size analysis using a Horiba LA-300 LLS unit.

Given the significant increase in particle agglomerate size being created in the master batch dispersion Formulas V3 and V4, which were respectively produced at 10% and 15% NV solids content, the anti-tack dip performance properties of these dispersions were subsequently determined after they were diluted back to 2% NV solids content for slab dip application use. Their dip properties and dip slurry coating performance were compared to those of the Alkon powder dispersion Formulas U and V where 2% solids content dispersions of each were produced directly to yield ready-to-use slab dip slurries. The test results are collectively summarized in Table XXVI. A comparison of their dip slurry viscosities at 2% NV solids content showed that all the dispersions yielded similar Brookfield Viscosity values as measured using Spindle #2 at 100 rpm; however, the dip slurry foaming properties of the more aggregated dispersions (V3 and V4) showed some notable differences in foam dissipation rate. All the test dispersions at 2% solids content yielded about the same initial foam level but the foam associated with the more aggregated dispersions (V3 and V4) was more stable and dissipated very little if any over time. The formation of stable micro-foams can be problematic for dip slurries because it can result in foam pickup on the rubber slabs. As previously discussed, the pickup of foam is not desirable because it can leave undispersed particles in the finished product and/or increase the potential for forming blisters. It was noted that dip coating drying times started to be impacted as the degree of particle aggregation increased but the increase in drying times noted for the dip coatings of V3 and V4 were still manageable. In terms of anti-tack coating performance, the dip slurries derived from dispersion Formulas U and V yield better anti-tack performance when tested on a NR/BR based tire tread cap rubber compound. Both dispersion Formulas yielded an anti-tack rating of 5. In contrast, the more highly aggregated dispersion products (dispersion Formulas V3 and V4) yielded reduced anti-tack performance on the same tire tread cap compound with their anti-tack ratings being 4.5 and 4, respectively. Hence the macro flocculated particle agglomerates achieved in these dispersion experiments reduced their anti-tack coating performance. Their reduction in anti-tack coating performance is not too surprising when one examines the difference in the coating uniformity obtained on the rubber slabs. As noted in Table XXVI, the dip slurries generated from dispersion Formulas V3 and V4 both yielded more grainy, non-uniform coating films. This reduced coating film uniformity is readily seen in the comparative photograph taken of the various dip coated rubber specimens (see FIG. 6). The uniform dip coating provided by dispersion Formula V (coated slab shown on the far left) is in stark contrast to the non-uniform, grainy dip coatings provided by the dispersion Formulas V3 and V4 (see coated slabs pictured in the center and on the far right, respectively).

TABLE XXVI

Dip Slurry Performance of Various Alkon Powder Dispersions (Dispersion Formulas U, V, V3 and V4)

| | Dispersion Concentrate Properties | | | Dip Slurry Testing Properties at 2% Solids Dilution | | | |
|---|---|---|---|---|---|---|---|
| | | | | Viscosity & Foam | | For Tire Tread Cap | |
| Alkon Disp.* @ % NV solids target | pH @ 25° C. | Initial BF Visc., cps @ rpm & spindle # | 24 Hour Aged BF Visc., cps @ rpm & spindle # | BF Visc. Of 2% Dilution, cps @ rpm & spindle # | Foam Height Properties of 2% Dip Slurry** | Description of Applied Dip Coating & Drying Time | Anti-Tack Rating of Coating: 0 → 6 Scale |
| 2.0% solids Formula U Powder Disp. - no PDM | 10.28 | BF = 14 cps; (100 rpm, Sp#2) | BF = 15.6 cps; (100 rpm, Sp#2) | No Dilution Needed; BF = 15.6 cps; (100 rpm, Sp#2) | Initial = 16 mm; 10 min. = 6 mm; 20 min. = 6 mm | Lightly Visible, Uniform Coating (Drying Time = 1.0 min.) | 5 |
| 2.0% solids Formula V Powder Disp. - with PDM | 10.35 | BF = 16.4 cps; (100 rpm, Sp#2) | BF = 20.4 cps; (100 rpm, Sp#2) | No Dilution Needed; BF = 20.4 cps; (100 rpm, Sp#2) | Initial = 17 mm; 10 min. = 8 mm; 20 min. = 8 mm | Lightly Visible, Uniform Coating (Drying Time = 1.25 min.) | 5 |
| 10.0% solids Formula V3 Powder Disp. - with PDM | 10.63 | BF = 220 cps; (100 rpm, Sp#2) | BF = 463 cps; (100 rpm, Sp#3) | Dilution = 10%→2%; BF = 19.6 cps; (100 rpm, Sp#2) | Initial = 16 mm; 10 min. = 16 mm; 20 min. = 15 mm | Non-uniform, Grainy Coating (Drying Time = 1.5 min.) | 4.5 |
| 15.0% solids Formula V4 Powder Disp. - with PDM | 10.58 | BF = 1,496 cps; (100 rpm, Sp#4) | BF = 3,250 cps; (100 rpm, Sp#5) | Dilution = 15%→2%; BF = 17.2 cps; (100 rpm, Sp#2) | Initial = 20 mm; 10 min. = 18 mm; 20 min. = 15 mm | Non-uniform, Grainy Coating (Drying Time = 1.5 min.) | 4 |

Note:
*The Alkon powder dispersions containing the PDM additive were made at their targeted % NV solids content using the same PDM active dosage level of 0.1914 wt. % on a total "solid pigments" basis. This is because the higher solids content master batch dispersions (V3 and V4) were both derived from Alkon powder Formula V. For dip slurry evaluation the higher solids dispersions were subsequently diluted to 2% NV solids content.
**Foam height testing was conducted in accordance with the modified testing protocol outlined in Example 5 employing a pair of 1 liter Nalgene PMP beakers.

In summary, this dip slurry applications data shows that end-use, anti-tack coating performance is very dependent on the solids content at which the original Alkon powder+PDM dispersion is initially produced. The data also shows that high levels of particle aggregation derived from adding PDM to high content levels of bentonite (yielding macro flocculation) are not conducive to producing effective anti-tack formulations hence the commercial ability to produce higher solids, master batch dispersions from such powder products that would ultimately need to be diluted back to final dip slurry application solids is negated. These performance and utility disadvantages are being driven by the combined use of PDM with smectite clays having fine particle size and high CEC value properties in anti-tack formulations that contain a high smectite clay content. Given these disadvantages, there is no motivation for one to utilize a PDM cationic polymer in such formulations. One needs to also keep in mind these end use performance and utility disadvantages are being seen even at very low PDM dosage levels (0.0035% weight concentration in the aqueous dip slurry of 2% NV solids content).

Finally, even in the ideal scenario where the Alkon type powder formulation containing PDM (Formula V) is dispersed directly at low, ready-to-use, solids contents levels (e.g., 2% solids), there is no dip slurry or anti-tack performance benefit obtained so again there is no technical motivation for PDM to be utilized. This lack of utility for PDM in this instance is in stark contrast to the talc based dispersions discussed in Examples 5 and 7 since the coarser particle size and relatively low CEC value of talc is more conducive to yielding micro-flocculated particle systems that can improve anti-tack coating performance. Therefore, one needs to recognize that the addition of a cationic polymer like PDM is not universally useful across all minerals based, anti-tack formulations hence the performance enhancements obtained with Talc and PDM were novel and not obvious.

Example 9

In Example 8, dispersion Formula V (at 2% solids content) was found to provide no performance benefits over the powder control dispersion (Formula U) produced at 2% solids content. The remaining technical question is what happens when the effective concentration of PDM in the 2% solids content dip slurry is incrementally increased above the 0.0035% concentration level employed in the case of dispersion Formula V? To answer this question a series of additional Alkon powders (W through Z) were produced whereby the amount of PDM added to the powder formulation was incrementally increased (see formulary details in Table XXIII-A) but all the powders were subsequently dispersed directly at 2% solids content to eliminate the effect of solids content on aggregate particle size. The active PDM weight % in the total powder formulation increased from 0.1671% to 0.3300% to 0.5032% to 0.6667% to 0.8296% as one proceeds across the Alkon powder series from V to Z, respectively. These PDM levels in powders V to Z respectively translate to PDM weight % concentrations of 0.0035%, 0.0069%, 0.0105%, 0.0140% and 0.0174% when the powders were subsequently dispersed at 2% NV solids contents. Hence, over this test series of 2% solids dip slurries, the weight % concentration of PDM has been increased by a factor of about 5×. The Horiba particle size properties of these Alkon powder dispersions was determined and the mean, D50 and D90 particle size data are reported in Table XXVII. As the PDM weight % concentration was increased over the dispersion series, from Formula V to Formula Z, the increase in mean particle size for the resultant aggregates (relative to the U control dispersion) ranged from 86.3% to 243%, respectively. This notable increase in mean particle size reflects significant levels of particle aggregation being created with all the resultant aggregates fitting the descriptive classifications of being moderately flocculated to macro flocculated particle systems. The increase in mean aggregate particle size at the highest PDM concentration level (per dispersion Formula Z) is on the same order of magnitude as what was observed when Formula V (having a low PDM dosage level) was dispersed at 10% solids content, see Table XXV. This finding indicates that the % solids content of the initial dispersion and increases in the PDM concentration can both generate very high levels of particle aggregation when anti-tack compositions employing high content levels of bentonite clay are involved. As shown in Table XXVIII, the magnitude of the particle aggregation response is so large when high content levels of bentonite clay are utilized in combination with moderate concentration levels of PDM that the resultant dip slurry and anti-tack coating properties of such compositions are irreparably hurt to a significant degree.

TABLE XXVII

Horiba LLS Particle Size Properties for Alkon Powder Dispersions
(Dispersion Formulas U, V, W, X, Y and Z at 2% NV Solids)

| Test Dispersions* Alkon Powder Disp. at | Mean Particle Size | | Median D50 Particle Size | | | |
| --- | --- | --- | --- | --- | --- | --- |
| Target 2% NV Solids Content | Microns | % Increase vs. Control | Microns | % Increase vs. Control | D90 Particle Size Microns | Resulting Particle Description |
| 2.0% solids Formula U Powder Disp. - no PDM | 4.636 | | 1.790 | | 12.993 | Fully Dispersed |
| 2.0% solids Formula V Powder Disp. - with PDM | 8.638 | 86.3% | 6.028 | 237% | 20.672 | Moderately Flocculated |
| 2.0% solids Formula W | 11.712 | 153% | 8.129 | 354% | 28.035 | Macro Flocculated |

TABLE XXVII-continued

Horiba LLS Particle Size Properties for Alkon Powder Dispersions
(Dispersion Formulas U, V, W, X, Y and Z at 2% NV Solids)

| Test Dispersions* Alkon Powder Disp. at Target 2% NV Solids Content | Mean Particle Size Microns | Mean Particle Size % Increase vs. Control | Median D50 Particle Size Microns | Median D50 Particle Size % Increase vs. Control | D90 Particle Size Microns | Resulting Particle Description |
|---|---|---|---|---|---|---|
| Powder Disp. - with PDM 2.0% solids Formula X | 12.911 | 178% | 9.654 | 439% | 29.987 | Macro Flocculated |
| Powder Disp. - with PDM 2.0% solids Formula Y | 14.179 | 206% | 11.166 | 524% | 31.837 | Macro Flocculated |
| Powder Disp. - with PDM 2.0% solids Formula Z | 15.914 | 243% | 12.485 | 597% | 35.392 | Macro Flocculated |
| Powder Disp. - with PDM | | | | | | |

Note:
*All test dispersions were produced directly at 2% NV solids content and subsequently used for Horiba particle size analysis using a Horiba LA-300 LLS unit. Formulary details associated with the various Alkon powders (Formulas U through Z) are provided in TABLE XXIII - A. The active PDM concentrations in the 2% NV solids content dispersions ranged from 0.0 to 0.0174% by weight, respectively.

The dip slurry properties and anti-coating performance properties of the 2% solids dispersion Formulas U through Z are summarized in Table XXVIII. A review of the data there reveals several interesting points. As the PDM concentration level in the 2% solids dispersion increased the resultant viscosity of the dip slurries increased incrementally to a moderate degree. The more interesting effect was on the resultant dip slurry foam properties. The dip slurry foaming properties of the more aggregated 2% dispersions (W through Z) showed some notable differences in foam dissipation rate. All the test dispersions at 2% solids content yielded about the same initial foam level but the foam associated with the more aggregated dispersions (W though Z) was more stable and dissipated very little over time. The formation of stable micro-foams can be problematic for dip slurries because it can result in foam pickup on the rubber slabs. As previously discussed, the pickup of foam is not desirable because it can leave undispersed particles in the finished product and/or increase the potential for forming blisters. Relative to drying times for the various dip coatings, it was observed that the more aggregated 2% dispersions (W though Z) showed notable increases in their drying times. Drying times for these more aggregated dispersions increased on the order of 2 to 3.5 times versus that of the control dip slurry (dispersion Formula U). Such long dip coating drying times can be very problematic. Insufficient drying leaves residual moisture content trapped in the applied dip coating which frequently translates to downstream quality issues with blisters being formed. A slow drying rate can also cause more back wiping of the coating off the backside of the coated rubber substrate thereby resulting in less uniform coating coverage. Under real world commercial use conditions, the dip slurry coatings for the 2% dispersions of Formulas X through Z would be ruled out as non-viable based on their drying characteristics alone. Furthermore, the anti-tack coating performance ratings associated with the dip slurries for dispersion Formulas X, Y and Z were noted to be decreased relative to the control dip slurry (dispersion Formula U). This decrease in anti-tack performance (from 5 down to 4.5 or 4) was observed on both elastomeric compounds that were dip tested (a CVT tire sidewall compound and a NR/BR based tire tread cap compound). Hence the macro flocculated particle agglomerates created in these dispersion experiments reduced their anti-tack coating performance. Their reduction in anti-tack coating performance is not too surprising when one examines the difference in the coating uniformity obtained on the rubber slabs. The dip slurries generated from dispersion Formulas Y and Z both yielded non-uniform coating films that were very streaky and grainy in appearance. This reduced coating film uniformity is readily seen in the comparative photograph taken of the various dip coated rubber specimens for Formulas V, Y & Z (see FIG. 7).

The data presented in this example shows that high levels of particle aggregation are derived from adding increasing amounts of PDM to anti-tack formulations containing high content levels of bentonite (thereby yielding macro flocculation). Such formulations are not conducive to producing effective anti-tack formulations even when low solids dispersions (like 2% solids) are produced directly. The noted dip slurry and anti-tack performance disadvantages are being driven by combing PDM with smectite clays having fine particle size and high CEC value properties hence the smectite clay content must be minimized to limit the amount of particle aggregation that is obtained. Given these disadvantages there is no motivation for one to utilize a PDM cationic polymer in high smectite content anti-tack formulations.

TABLE XXVIII

Dip Slurry Performance of Various Alkon Powder Dispersions
(Dispersion Formulas U, V, W, X, Y and Z)

| | Dispersion Properties at 2% NV Solids | | | Dip Slurry Testing Properties at 2% NV Solids | | | | |
|---|---|---|---|---|---|---|---|---|
| | | | | Dip Foam | For CVT Tire Sidewall | | For Tire Tread Cap | |
| Alkon Disp.* @ 2% NV solids target | pH @ 25° C. | Initial BF Visc., cps @ rpm & spindle # | 24 Hour Aged BF Visc., cps @ rpm & spindle # | Foam Height Properties of 2% Dip Slurry** | Description of Applied Dip Coating & Drying Time | Anti-Tack Rating of Coating 0 → 6 Scale | Description of Applied Dip Coating & Drying Time | Anti-Tack Rating of Coating: 0 → 6 Scale |
| 2.0% solids Formula U Powder Disp. - no PDM | 10.28 | BF = 14 cps; (100 rpm, Sp#2) | BF = 15.6 cps; (100 rpm, Sp#2) | Initial = 16 mm; 10 min. = 6 mm; 20 min. = 6 mm | Lightly Visible, Uniform Coating (Drying Time = 50 sec.) | 5 | Lightly Visible, Uniform Coating (Drying Time = 1 min.) | 5 |
| 2.0% solids Formula V Powder Disp. - with PDM | 10.35 | BF = 16.4 cps; (100 rpm, Sp#2) | BF = 20.4 cps; (100 rpm, Sp#2) | Initial = 17 mm; 10 min. = 8 mm; 20 min. = 8 mm | Lightly Visible, Uniform Coating (Drying Time = 1.0 min.) | 5 | Lightly Visible, Uniform Coating (Drying Time = 1.25 min.) | 5 |
| 2.0% solids Formula W Powder Disp. - with PDM | 10.48 | BF = 22.4 cps; (100 rpm, Sp#2) | BF = 23.6 cps; (100 rpm, Sp#2) | Initial = 15 mm; 10 min. = 13 mm; 20 min. = 12 mm | Lightly Visible, Mostly Uniform Coating (Drying Time = 1.0 min.) | 5 | More Opaque Coating with Some Streaking (Drying Time = 2.25 min.) | 5 |
| 2.0% solids Formula X Powder Disp. - with PDM | 10.50 | BF = 24.4 cps; (100 rpm, Sp#2) | BF = 26.0 cps; (100 rpm, Sp#2) | Initial = 19 mm; 10 min. = 15 mm; 20 min. = 15 mm | Less Uniform Coating with some Visible Streaking (Drying Time = 2.0 min.) | 4.5 | More Opaque Coating with Some Streaking (Drying Time = 3 min.) | 4.5 |
| 2.0% solids Formula Y Powder Disp. - with PDM | 10.45 | BF = 28.4 cps; (100 rpm, Sp#2) | BF = 29.2 cps; (100 rpm, Sp#2) | Initial = 19 mm; 10 min. = 14 mm; 20 min. = 14 mm | Non-uniform, Very Grainy, Streaky Coating (Drying Time = 2.25 min.) | 4.5 | Non-uniform, Very Grainy, Streaky Coating (Drying Time = 3.5 min.) | 4 |
| 2.0% solids Formula Z Powder Disp. - with PDM | 10.49 | BF = 29.2 cps; (100 rpm, Sp#2) | BF = 31.2 cps; (100 rpm, Sp#2) | Initial = 18 mm; 10 min. = 14 mm; 20 min. = 14 mm | Non-uniform, Very Streaky Coating (Drying Time = 2.25 min.) | 4 | Non-uniform, Very Grainy, Streaky Coating (Drying Time = 3.5 min.) | 4 |

Note:
*All the Alkon powder dispersions were produced directly at 2% NV solids content and were subsequently tested at that solids level for their anti-tack dip slurry performance properties. Formulary details associated with the various Alkon powders (Formulas U through Z) are provided in TABLE XXIII - A. The active PDM concentrations in the 2% NV solids content dispersions ranged from 0.0 to 0.0174% by weight, respectively.
**Foam height testing was conducted in accordance with the modified testing protocol outlined in Example 5 employing a pair of 1 liter Nalgene PMP beakers.

As such, an invention has been disclosed in terms of preferred embodiments thereof which fulfills each and every one of the objects of the present invention as set forth above and provides a new and improved anti-tack formulation of high solids content that uses an effective amounts of a fine particle talc, an anti-tack formulation of lower solids content and a method of using the lower solids content formulation in rubber anti-tack applications.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A method of coating an uncured rubber compound to provide anti-tack properties to a surface of the rubber compound comprising:
providing an anti-tack dispersion,
diluting the anti-tack dispersion to a range of 1-10% total solids content;
applying the diluted anti-tack dispersion to the rubber compound; and
allowing the applied diluted anti-tack dispersion to dry into a film on a surface of the rubber compound,
wherein the anti-tack dispersion comprises:
talc particles having a median particle size range of less than 7 microns, the talc particles in an amount ranging from 40% to 72% of the total dispersion weight, the aqueous anti-tack dispersion having a total solids content 45-75% by weight of the anti-tack dispersion, the talc particles dispersed in the aqueous anti-tack dispersion and forming a slurry the anti-tack dispersion further comprising:
a polyquaternary cationic polymer having a molecular weight between about 50,000 to 2,000,000 Daltons in an effective amount to at least prevent hard pack settling of the talc when the anti-tack dispersion is used in a diluted form for coating uncured rubber compound products and/or improving anti-tack coating coverage of the uncured rubber compound products;
one or a combination of the following:
a) one or more nonionic surfactants of intermediate HLB value of 6 to 12 in a total amount ranging from about 0.01-4.0% of the total dispersion weight; and
b) one or more alkali metal, saturated or unsaturated, $C_8$-$C_{20}$ fatty acid soaps in a total amount ranging from about 0.01-3.0% of the total dispersion weight; and
optionally, one or more suspension aids in a total amount of not more than about 2.0% by weight of the dispersion; and
the balance water.

2. The method of claim 1, wherein the applying step comprises a dip tank slurry application or a spraying application.

3. The method of claim 1, wherein the total solid content ranges from 2-6%.

4. A diluted aqueous anti-tack dispersion comprising:
an anti-tack dispersion in concentrated form and including talc particles having a median particle size range of less than 7 microns, the talc particles in an amount ranging from 40% to 72% of the total dispersion weight, the aqueous anti-tack dispersion having a total solids content 45-75% by weight of the anti-tack dispersion, the talc particles dispersed in the aqueous anti-tack dispersion and forming a slurry the anti-tack dispersion in concentrated form further comprising:
a polyquaternary cationic polymer having a molecular weight between about 50,000 to 2,000,000 Daltons in an effective amount to at least prevent hard pack settling of the talc when the anti-tack dispersion is used in a diluted form for coating uncured rubber compound products and/or improving anti-tack coating coverage of the uncured rubber compound products;
one or a combination of the following:
a) one or more nonionic surfactants of intermediate HLB value of 6 to 12 in a total amount ranging from about 0.01-4.0% of the total dispersion weight; and
b) one or more alkali metal, saturated or unsaturated, $C_8$-$C_{20}$ fatty acid soaps in a total amount ranging from about 0.01-3.0% of the total dispersion weight; and
optionally, one or more suspension aids in a total amount of not more than about 2.0% by weight of the dispersion; and
the balance water,
the anti-tack dispersion diluted to form a diluted anti-tack dispersion such that the total solid content for the diluted anti-tack dispersion ranges from about 1 to 10%.

5. The diluted aqueous anti-tack dispersion of claim 4, wherein anti-tack dispersion in concentrated form has one or more of the following viscosities:
an initial 2 rpm static Brookfield Viscosity of 5,000 to 25,000 cps;
a two-week aged 2 rpm static Brookfield Viscosity less than 150,000 cps;
a two-week aged 20 rpm dynamic Brookfield Viscosity less than 25,000 cps;
wherein the initial and aged static and dynamic viscosities are measured using a Brookfield RVDVE heliopath viscometer unit equipped with T-spindles and are run at 2 or 20 rpm and 25 degrees C.

6. The diluted aqueous anti-tack dispersion of claim 5, wherein the talc is substituted with at least one anti-block pigment without changing the one or more viscosities, wherein the at least one anti-block pigment is selected from the group consisting of:
a) an inorganic mineral-based anti-block pigment having a CEC value of 5 meq/100 g or less and in an amount up to about 25% by weight of the total talc weight in the dispersion;
b) an inorganic mineral-based anti-block pigment having a CEC value of more than 5 and less than 15 meq/100 g and in an amount of up to about 15% by weight of the total talc weight in the dispersion;
c) an inorganic mineral-based anti-block pigment having a CEC value of 15 meq/100 g or more and 50 meq/100 g or less and in an amount up to about 5% by weight of the total talc weight in the dispersion;
d) a non-mineral-based anti-block pigment in an amount up to about 25% by weight of the total talc weight in the dispersion;
e) an inorganic metal oxide as the anti-block pigment and in an amount up to about 5% by weight of the total talc weight in the dispersion;
f) insoluble forms of alkali earth metal sulfates and alkali earth metal carbonates as the anti-block pigment and in an amount up to about 25% by weight of the total talc weight in the dispersion; and
g) silicate minerals having a CEC value of more than 50 meq/100 g as the anti-block pigment and in an amount up to about 2% by weight of the total dispersion.

7. The diluted aqueous anti-tack dispersion of claim 6, wherein the anti-block pigment for any of (a-g) is selected from the group consisting of kaolinite, calcined kaolin clays, smectite clay minerals, attapulgite, sepiolite, barytes, nepheline syenite, ground calcium carbonate, precipitated calcium carbonate, dolomite, fine particle micas consisting of muscovite or phlogopite, feldspars, synthetic amorphous silica pigments, alumina trihydrate, hydrotalcite, illite, halloysite·2H$_2$O, microcline and one or more metal stearate pigments.

8. The diluted anti-tack dispersion of claim 4, having a relative sediment volume of at least 35 cm$^3$, the relative sediment volume measured using 1000 ml of a 4% solids diluted form of the anti-tack dispersion in a 1 liter graduated cylinder after 24 hours of settling under static conditions.

9. A diluted aqueous anti-tack dispersion comprising at least one mineral pigment, the at least one mineral pigment including talc particles, the talc particles having a median particle size range of less than 7 microns, the talc particles in an amount ranging from 0.4% to 7.2% of the total dispersion weight, the aqueous anti-tack dispersion having a total solids content 1-10% by weight of the anti-tack dispersion, the talc particles dispersed in the aqueous anti-tack dispersion and forming a slurry, the diluted anti-tack dispersion further comprising:
  a polyquaternary cationic polymer having a molecular weight between about 50,000 to 2,000,000 Daltons in an effective amount to at least prevent hard pack settling of the talc when the anti-tack dispersion is used in a diluted form for coating uncured rubber compound products and/or improving anti-tack coating coverage of the uncured rubber compound products;
  one or a combination of the following:
  a) one or more nonionic surfactants of intermediate HLB value of 6 to 12 in a total amount ranging from about 0.0001-0.4% of the total dispersion weight; and
  b) one or more alkali metal, saturated or unsaturated, C$_8$-C$_{20}$ fatty acid soaps in a total amount ranging from about 0.0001-0.3% of the total dispersion weight; and
  optionally, one or more suspension aids in a total amount of not more than about 0.2% by weight of the dispersion; and
  the balance water.

10. The diluted aqueous anti-tack dispersion of claim 9, wherein the talc is substituted with at least one anti-block pigment, wherein the at least one anti-block pigment is selected from the group consisting of:
  a) an inorganic mineral-based anti-block pigment having a CEC value of 5 meq/100 g or less and in an amount up to about 25% by weight of the total talc weight in the dispersion;
  b) an inorganic mineral-based anti-block pigment having a CEC value of more than 5 and less than 15 meq/100 g and in an amount of up to about 15% by weight of the total talc weight in the dispersion;
  c) an inorganic mineral-based anti-block pigment having a CEC value of 15 meq/100 g or more and 50 meq/100 g or less and in an amount up to about 5% by weight of the total talc weight in the dispersion;
  d) a non-mineral-based anti-block pigment in an amount up to about 25% by weight of the total talc weight in the dispersion;
  e) an inorganic metal oxide as the anti-block pigment and in an amount up to about 5% by weight of the total talc weight in the dispersion;
  f) insoluble forms of alkali earth metal sulfates and alkali earth metal carbonates as the anti-block pigment and in an amount up to about 25% by weight of the total talc weight in the dispersion; and
  g) silicate minerals having a CEC value of more than 50 meq/100 g as the anti-block pigment and in an amount up to about 2% by weight of the total dispersion.

11. The diluted aqueous anti-tack dispersion of claim 10, wherein the anti-block pigment for any of (a-g) is selected from the group consisting of kaolinite, calcined kaolin clays, smectite clay minerals, attapulgite, sepiolite, barytes, nepheline syenite, ground calcium carbonate, precipitated calcium carbonate, dolomite, fine particle micas consisting of muscovite or phlogopite, feldspars, synthetic amorphous silica pigments, alumina trihydrate, hydrotalcite, illite, halloysite·2H$_2$O, microcline, and one or more metal stearate pigments.

12. The diluted aqueous anti-tack dispersion of claim 4, wherein the polyquaternary cationic polymer comprises epichlorohydrin-dimethylamine (Epi-DMA), one or more polyquaterniums, or a combination thereof.

13. The diluted aqueous anti-tack dispersion of claim 12, the polyquaternary cationic polymer comprises polydiallyldimethyl ammonium chloride.

14. The diluted aqueous anti-tack dispersion of claim 9, wherein the polyquaternary cationic polymer comprises epichlorohydrin-dimethylamine (Epi-DMA), one or more polyquaterniums, or a combination thereof.

15. The diluted aqueous anti-tack dispersion of claim 14, wherein the polyquaternary cationic polymer comprises polydiallyldimethyl ammonium chloride.

16. The diluted aqueous anti-tack dispersion of claim 4, wherein the talc is a blend of two differently sized talc particles wherein a median particle size difference between the two differently-sized talc particles is at least two microns.

17. The diluted aqueous anti-tack dispersion of claim 9, wherein the talc is a blend of two differently sized talc particles wherein a median particle size difference between the two differently-sized talc particles is at least two microns.

18. The diluted aqueous anti-tack dispersion of claim 4, wherein the one or more nonionic surfactants comprises ethoxylates of alkylphenols, ethoxylates of 2,4,7,9-tetramethyl 5 decyn-4,7-diol, ethoxylates of linear or branched fatty alcohols having a carbon chain length ranging from C$_6$-C$_{18}$, EO/PO alkoxylates of linear or branched fatty alcohols having a carbon chain length ranging from C$_6$-C$_{18}$, ethylene oxide/propylene oxide block copolymers, ethoxylates of sorbitan esters, ethoxylated fatty acids, ethoxylated castor oils, ethoxylated fatty amines, and PEG esters or diesters of saturated or unsaturated C$_8$ to C$_{20}$ fatty acids.

19. The diluted aqueous anti-tack dispersion of claim 4, wherein one or more alkali metal, saturated or unsaturated, C$_8$-C$_{20}$ fatty acid soaps comprises sodium or potassium soaps of saturated or unsaturated C$_8$-C$_{20}$ fatty acids.

20. The diluted aqueous anti-tack dispersion of claim 9, wherein the one or more nonionic surfactants comprises ethoxylates of alkylphenols, ethoxylates of 2,4,7,9-tetramethyl 5 decyn-4,7-diol, ethoxylates of linear or branched fatty alcohols having a carbon chain length ranging from C$_6$-C$_{18}$, EO/PO alkoxylates of linear or branched fatty alcohols having a carbon chain length ranging from C$_6$-C$_{18}$, ethylene oxide/propylene oxide block copolymers, ethoxylates of sorbitan esters, ethoxylated fatty acids, ethoxylated castor oils, ethoxylated fatty amines, and PEG esters or diesters of saturated or unsaturated C$_8$ to C$_{20}$ fatty acids.

21. The diluted aqueous anti-tack dispersion of claim 9, wherein one or more alkali metal, saturated or unsaturated, C$_8$-C$_{20}$ fatty acid soaps comprises sodium or potassium soaps of saturated or unsaturated C$_8$-C$_{20}$ fatty acids.

22. The diluted aqueous anti-tack dispersion of claim 4, wherein the talc particles have a CEC value between 1.0 and 10 meq/100 g.

23. The diluted aqueous anti-tack dispersion of claim 9, wherein the talc particles have a CEC value between 1.0 and 10 meq/100 g.

24. The diluted anti-tack dispersion of claim 4, wherein the talc particles having a median particle size range of about 0.5 to about 5.0 microns.

25. The diluted anti-tack dispersion of claim 9, wherein the talc particles having a median particle size range of about 0.5 to about 5.0 microns.

26. The diluted anti-tack dispersion of claim 4, wherein the polyquaternary cationic polymer is in an amount ranging from 0.01 to 0.25% by weight of the anti-tack dispersion.

27. The diluted anti-tack dispersion of claim 9, wherein the polyquaternary cationic polymer is in an amount ranging from 0.0001 to 0.025% by weight of the diluted anti-tack dispersion.

28. The diluted anti-tack dispersion of claim 9, having a relative sediment volume of at least 35 cm$^3$, the relative sediment volume measured using 1000 ml of a 4% solids diluted form of the anti-tack dispersion in a 1 liter graduated cylinder after 24 hours of settling under static conditions.

29. The diluted aqueous anti-tack dispersion of claim 4, wherein the one or more nonionic surfactants comprises an ethoxylated styrenated phenyl ether.

30. The diluted aqueous anti-tack dispersion of claim 9, wherein the one or more nonionic surfactants comprises an ethoxylated styrenated phenyl ether.

31. The diluted aqueous anti-tack dispersion of claim 4, wherein the effective amount of the polyquaternary cationic polymer microflocculates particles in the anti-tack dispersion is such that a mean particle size, as measured by laser light scattering particle size analysis, of the diluted aqueous anti-tack dispersion with the effective amount of the polyquaternary cationic polymer increases by about 5 to 60% as compared to a mean particle size of a diluted aqueous anti-tack dispersion particles without the effective amount of the polyquaternary cationic polymer.

32. The diluted aqueous anti-tack dispersion of claim 9, wherein the effective amount of the polyquaternary cationic polymer microflocculates particles in the diluted aqueous anti-tack dispersion is such that a mean particle size, as measured by laser light scattering particle size analysis, of the diluted aqueous anti-tack dispersion with the effective amount of the polyquaternary cationic polymer increases by about 5 to 60% as compared to a mean particle size of a diluted aqueous anti-tack dispersion particles without the effective amount of the polyquaternary cationic polymer.

* * * * *